(12) United States Patent
Kawamura

(10) Patent No.: US 7,212,351 B2
(45) Date of Patent: May 1, 2007

(54) ZOOM OPTICAL SYSTEM AND IMAGE TAKING APPARATUS USING THE SAME

(75) Inventor: Kazuteru Kawamura, Hachioji (JP)

(73) Assignee: Olympus Imaging Corp., Tokyo (JP)

( * ) Notice: Subject to any disclaimer, the term of this patent is extended or adjusted under 35 U.S.C. 154(b) by 0 days.

(21) Appl. No.: 11/411,875

(22) Filed: Apr. 27, 2006

(65) Prior Publication Data

US 2006/0245078 A1    Nov. 2, 2006

(30) Foreign Application Priority Data

Apr. 28, 2005 (JP) ............................ 2005-132564
May 2, 2005 (JP) ............................ 2005-133991

(51) Int. Cl.
*G02B 15/14* (2006.01)

(52) U.S. Cl. ...................... 359/689; 359/680

(58) Field of Classification Search ........ 359/680–683, 359/689, 676
See application file for complete search history.

(56) References Cited

U.S. PATENT DOCUMENTS

| | | | |
|---|---|---|---|
| 5,155,629 A | 10/1992 | Ito et al. ...................... | 359/676 |
| 5,963,377 A | 10/1999 | Okada et al. ............... | 359/686 |
| 5,999,329 A | 12/1999 | Ohtake ....................... | 359/676 |
| 6,317,271 B1* | 11/2001 | Sensui ......................... | 359/686 |
| 2005/0185287 A1* | 8/2005 | Sekita ......................... | 359/689 |

FOREIGN PATENT DOCUMENTS

| | | |
|---|---|---|
| JP | 05-093866 | 4/1993 |
| JP | 09-021950 | 1/1997 |
| JP | 2003-131130 | 5/2003 |
| JP | 2004-240464 | 8/2004 |
| JP | 2004-294910 | 10/2004 |

\* cited by examiner

*Primary Examiner*—Ricky Mack
*Assistant Examiner*—M. Hasan
(74) *Attorney, Agent, or Firm*—Kenyon & Kenyon LLP

(57) ABSTRACT

An image taking optical system which comprises, in order from an object side, a first lens unit having a negative refractive power, a second lens unit having a positive refractive power, and a third lens unit having a negative refractive power, wherein the second lens unit moves toward the object side so that a space between the first lens unit and the second lens unit decreases, and the third lens unit moves so that a space between the second lens unit and the third lens unit changes, in a case where zooming is performed from a wide-angle end to a telephoto end, the first lens unit includes at least one lens, among which there exists only one lens that has a negative refractive power, and the second lens unit includes at least one positive lens and at least one negative lens.

20 Claims, 25 Drawing Sheets

WAVELENGTH (nm)  486.13 —·—
656.27 - - - - -
587.56 ———

WAVELENGTH (nm) 486.13 —·—
656.27 -----
587.56 ———

WAVELENGTH(nm)  486.13 —·—·—
656.27 --------
587.56 ————

WAVELENGTH (nm)  486.13 —·—
656.27 -------
587.56 ———

WAVELENGTH (nm)   486.13 —·—
                  656.27 -------
                  587.56 ———

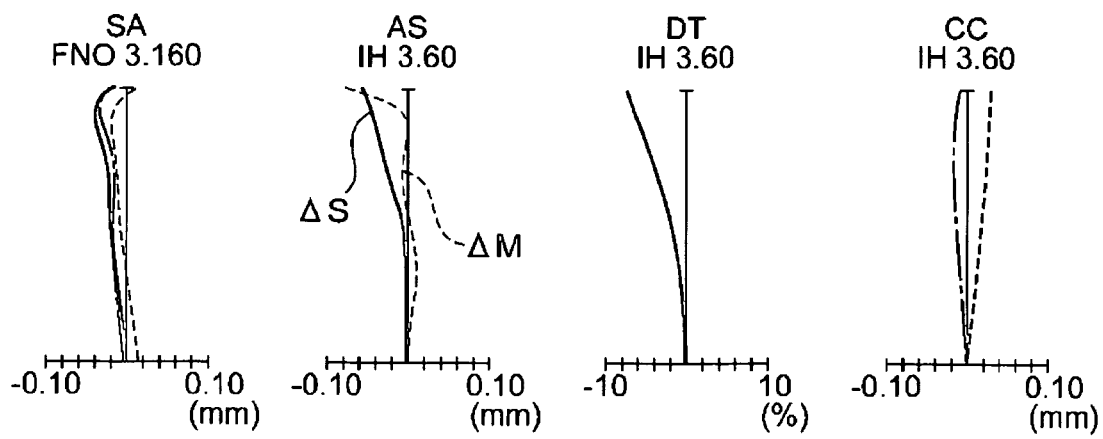
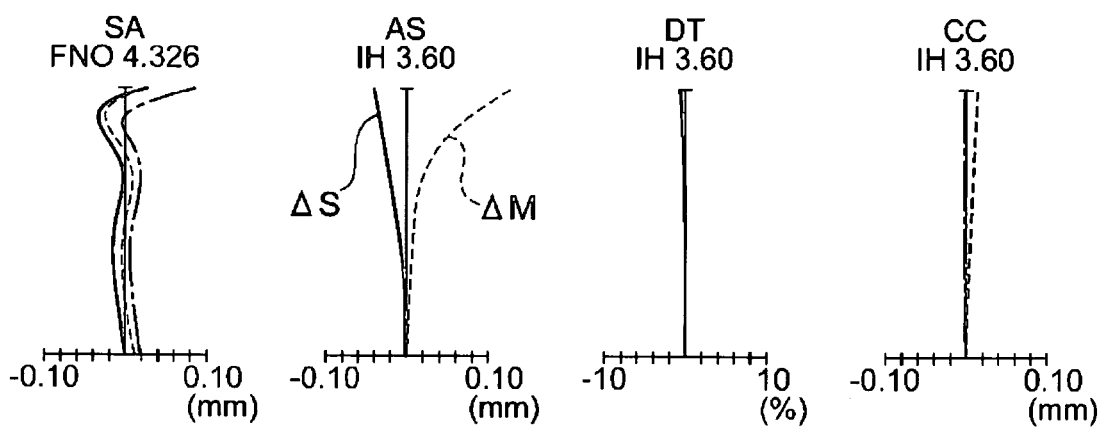
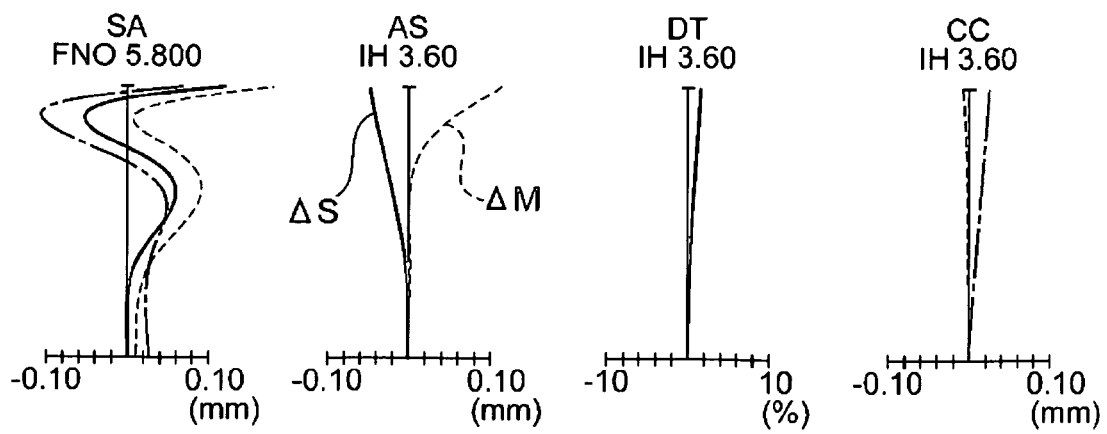

WAVELENGTH (nm) 486.13 —·—
656.27 -------
587.56 ———

ZOOM OPTICAL SYSTEM AND IMAGE TAKING APPARATUS USING THE SAME

CROSS REFERENCE TO RELATED APPLICATIONS

This application claims benefit 35 U.S.C. §119 of Japanese patent applications of No. 2005-132,564, filed in Japan on Apr. 28, 2005 and No. 2005-133,991, filed in Japan on May 2, 2005, the contents of which are incorporated herein by reference.

BACKGROUND OF THE INVENTION

1. Field of the Invention

The present invention relates to a zoom optical system and an image taking apparatus using that optical system.

2. Description of the Related Art

In recent years, in a camera such as a digital camera including an image taking optical system having an electronic image sensor, miniaturization and improvement of definition have proceeded. There is an increasing demand for a cellular phone on which such camera is mounted. Accordingly, there is also a demand for miniaturization and high function of the image taking optical system for use in such camera. In such image taking optical system, a combination of optical elements is devised in order to reduce the whole length of the optical system and an outer diameter of a lens.

As zoom lenses for achieving the miniaturization, there are: a zoom lens (e.g., Japanese Patent Application Laid-Open No. 4-242709) of a two-unit type including a first lens unit having a negative refractive power and a second lens unit having a positive refractive power; a zoom lens (e.g., Japanese Patent Application Laid-Open No. 9-21950) of a three-unit type including a first lens unit having a negative refractive power, a second lens unit having a positive refractive power, and a third lens unit having a positive refractive power; a zoom lens (e.g., Japanese Patent Application Laid-Open Nos. 5-93866 and 2004-294910) of a three-unit type including a first lens unit having a negative refractive power, a second lens unit having a positive refractive power, and a third lens unit having a negative refractive power; a zoom lens (e.g., Japanese Patent Application Laid-Open Nos. 9-179026, 11-109230, 2004-131130, and 2004-240464) of a four-unit type constituted by disposing a field lens unit having a positive refractive power in a basic three-unit type including a first lens unit having a negative refractive power, a second lens unit having a positive refractive power, and a third lens unit having a negative refractive power and the like.

In the zoom lens described in Japanese Patent Application Laid-Open No. 4-242709, the two-unit type is adopted which includes the first lens unit having the negative refractive power, and the second lens unit having the positive refractive power. The zoom lens has a zooming ratio of about three, the whole length of the optical system is 10.3 times a maximum image height, and the system is thus comparatively small-sized.

In the zoom lens described in Japanese Patent Application Laid-Open No. 9-21950, the three-unit type is adopted which includes the first lens unit having the negative refractive power, the second lens unit having the positive refractive power, and the third lens unit having the positive refractive power.

In the zoom lens described in Japanese Patent Application Laid-Open No. 5-93866 and in a dual focal length lens described in Japanese Patent Application Laid-Open No. 2004-294910, the three-unit type is adopted which includes the first lens unit having the negative refractive power, the second lens unit having the positive refractive power, and the third lens unit having the negative refractive power. Since this type can impart a comparatively intense zooming function to the third lens unit as compared with the zoom lens described in Japanese Patent Application Laid-Open No. 9-21950, the type is very effective for reduction of the whole length of the optical system and reduction of the lens outer diameter.

In the zooming optical system described in Japanese Patent Application Laid-Open No. 9-179026, the image taking optical system for video cameras described in Japanese Patent Application Laid-Open No. 11-109230, the zoom lens described in Japanese Patent Application Laid-Open No. 2004-131130, and the optical system described in Japanese Patent Application Laid-Open No. 2004-240464, the four-unit type is adopted which includes a field lens unit having a positive refractive power in addition to the basic three-unit type that includes the first lens unit having the negative refractive power, the second lens unit having the positive refractive power, and the third lens unit having the negative refractive power.

SUMMARY OF THE INVENTION

In an aspect of the present invention, there is provided an image taking optical system comprising, in order from an object side, a first lens unit having a negative refractive power, a second lens unit having a positive refractive power, and a third lens unit having a negative refractive power, wherein the second lens unit moves toward the object side so that a space between the first lens unit and the second lens unit decreases, and the third lens unit moves so that a space between the second lens unit and the third lens unit changes, in a case where zooming is performed from a wide-angle end to a telephoto end, the first lens unit includes at least one lens, among which there exists only one lens that has a negative refractive power, and the second lens unit includes at least one positive lens and at least one negative lens, the image taking optical system satisfying the following conditions (1), (2), and (3):

$$4.0 \leq W\_L/(\tan\omega \times FL) \leq 12.0 \quad (1);$$

$$1.7 \leq |\Delta D12|/(\tan\omega \times FL) \leq 4.6 \quad (2); \text{ and}$$

$$52.0 \leq PAVd \quad (3),$$

wherein W_L denotes the whole length of the image taking optical system in the wide-angle end, ω denotes a half field angle of the image taking optical system at a time when the image taking optical system is in an arbitrary state, FL denotes a focal length of the image taking optical system in the arbitrary state, ΔD12 denotes a change amount of the space between the first lens unit and the second lens unit during the zooming from the wide-angle end to the telephoto end, and PAVd denotes the Abbe number of the positive lens (all positive lenses in a case where a plurality of positive lenses exist) of the second lens unit. Here, the whole length of the image taking optical system means a length to an image forming surface from a lens surface closest to the object side in the first lens unit of the image taking optical system.

Moreover, in another aspect of the present invention, there is provided an image taking apparatus comprising: a zoom lens system including a movable lens unit on whose image side a positive lens and an image sensor unit are disposed in order from an object side, wherein the positive lens and the image sensor unit are brought into a sealed structure via a member constituting the image taking apparatus, and a lens unit having a negative refractive power is disposed on the object side of the positive lens with an air space between the lens unit and the positive lens.

BRIEF DESCRIPTION OF THE DRAWINGS

The present invention will become more fully understood from the detailed description given below and the accompanying drawings, which are given by way of illustration only and thus are not limitative of the present invention, wherein:

FIG. 1A is a diagram showing a state in the wide-angle end, FIG. 1B is a diagram showing a state along the intermediate focal length, and FIG. 1C is a diagram showing a state in the telephoto end;

FIG. 2A is a diagram showing a state in the wide-angle end, FIG. 2B is a diagram showing a state along the intermediate focal length, and FIG. 2C is a diagram showing a state in the telephoto end;

FIG. 3A is a diagram showing a state in the wide-angle end, FIG. 3B is a diagram showing a state along the intermediate focal length, and FIG. 3C is a diagram showing a state in the telephoto end;

FIG. 4A is a diagram showing a state in the wide-angle end, FIG. 4B is a diagram showing a state along the intermediate focal length, and FIG. 4C is a diagram showing a state in the telephoto end;

FIG. 5A is a diagram showing a state in the wide-angle end, FIG. 5B is a diagram showing a state along the intermediate focal length, and FIG. 5C is a diagram showing a state in the telephoto end;

FIG. 6A is a diagram showing a state in the wide-angle end, FIG. 6B is a diagram showing a state along the intermediate focal length, and FIG. 6C is a diagram showing a state in the telephoto end;

FIG. 7A is a diagram showing a state in the wide-angle end, FIG. 7B is a diagram showing a state along the intermediate focal length, and FIG. 7C is a diagram showing a state in the telephoto end;

FIG. 8A is a diagram showing a state in the wide-angle end, FIG. 8B is a diagram showing a state along the intermediate focal length, and FIG. 8C is a diagram showing a state in the telephoto end;

FIG. 9A is a diagram showing a state in the wide-angle end, FIG. 9B is a diagram showing a state along the intermediate focal length, and FIG. 9C is a diagram showing a state in the telephoto end;

FIG. 10A is a diagram showing a state in the wide-angle end, FIG. 10B is a diagram showing a state along the intermediate focal length, and FIG. 10C is a diagram showing a state in the telephoto end;

FIG. 11A is a diagram showing a state in the wide-angle end, FIG. 11B is a diagram showing a state along the intermediate focal length, and FIG. 11C is a diagram showing a state in the telephoto end;

FIG. 12A is a diagram showing a state in the wide-angle end, FIG. 12B is a diagram showing a state along the intermediate focal length, and FIG. 12C is a diagram showing a state in the telephoto end;

FIG. 13A is a diagram showing a state in the wide-angle end, FIG. 13B is a diagram showing a state along the intermediate focal length, and FIG. 13C is a diagram showing a state in the telephoto end;

FIG. 14A is a diagram showing a state in the wide-angle end, FIG. 14B is a diagram showing a state along the intermediate focal length, and FIG. 14C is a diagram showing a state in the telephoto end;

FIG. 15A is a diagram showing a state in the wide-angle end, FIG. 15B is a diagram showing a state along the intermediate focal length, and FIG. 15C is a diagram showing a state in the telephoto end;

FIG. 16A is a diagram showing a state in the wide-angle end, FIG. 16B is a diagram showing a state along the intermediate focal length, and FIG. 16C is a diagram showing a state in the telephoto end;

FIG. 17A is a diagram showing a state in the wide-angle end, FIG. 17B is a diagram showing a state along the intermediate focal length, and FIG. 17C is a diagram showing a state in the telephoto end;

FIGS. 18A to 18C are aberration diagrams of Example 9, FIG. 18A is a diagram showing a state in the wide-angle end, FIG. 18B is a diagram showing a state along the intermediate focal length, and FIG. 18C is a diagram showing a state in the telephoto end;

FIG. 24A is a diagram showing a state in the wide-angle end, FIG. 24B is a diagram showing a state along the intermediate focal length, and FIG. 24C is a diagram showing a state in the telephoto end;

FIG. 25A is a diagram showing a state in the wide-angle end, FIG. 25B is a diagram showing a state along the intermediate focal length, and FIG. 25C is a diagram showing a state in the telephoto end;

DETAILED DESCRIPTION OF THE EMBODIMENTS

Figure 1A:
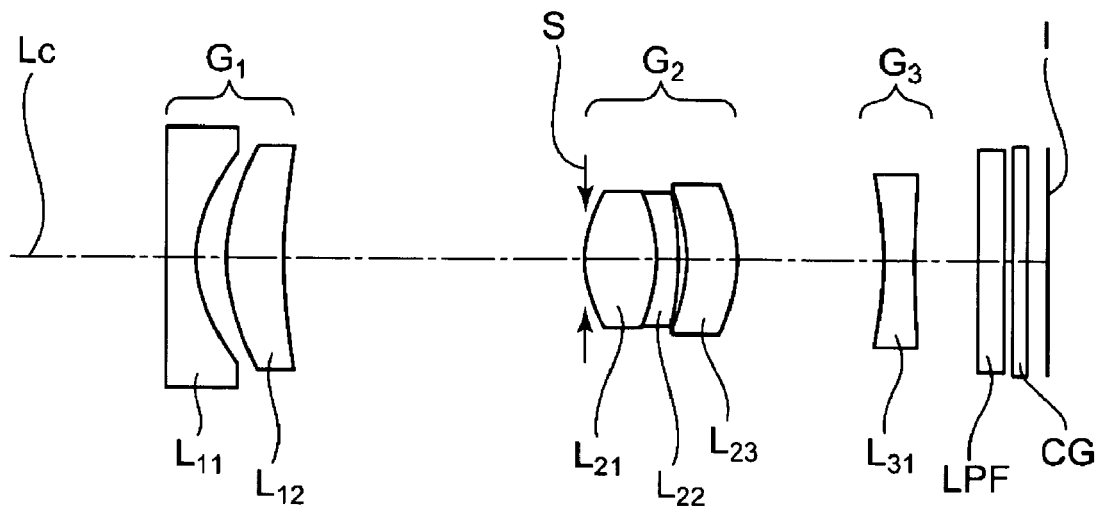
FIGS. 1A to 1C are sectional views along a plane including an optical axis of Example 1 of the present invention.

As described above, the image taking optical system of the present invention includes, in order from an object side, a first lens unit having a negative refractive power, a second lens unit having a positive refractive power, and a third lens unit having a negative refractive power. Furthermore, in a case where zooming is performed from a wide-angle end to a telephoto end, the second lens unit moves toward the object side so that a space between the first lens unit and the second lens unit decreases, and the third lens unit moves so that a space between the second lens unit and the third lens unit changes.

According to such constitution, it is possible to minimize an incident ray height while reducing the whole length of the optical system, and an incidence angle of the ray upon an image forming surface can be reduced with respect to a normal to the image forming surface. Therefore, in a case where an electronic image sensor is used, an influence of shading by the image sensor can be reduced. When the third lens unit having the negative refractive power is disposed with a space from the second lens unit, and constituted to be movable with respect to the second lens unit during the zooming, a zooming function can be imparted to the third lens unit. Accordingly, even when a zooming ratio in excess of 2.5 is secured, it is possible to minimize an outer diameter of the first lens unit while reducing the whole length of the system. Furthermore, a half field angle in the wide-angle end can be increased. Especially, when the following condition (12) is satisfied, the half field angle in the wide-angle end can be set to 28° or more.

Moreover, the image taking optical system of the present invention satisfies the following condition (1):

$$4.0 \leq W\_L/(\tan\omega \times FL) \leq 12.0 \qquad (1),$$

wherein W_L denotes the whole length of the image taking optical system in the wide-angle end, ω denotes a half field angle of the image taking optical system at a time when the system is in an arbitrary state, and FL denotes the focal length of the image taking optical system in the arbitrary state. Here, the whole length of the image taking optical system means the length to the image forming surface from the lens surface closest to the object side in the first lens unit of the image taking optical system.

The condition (1) is a condition for reducing the whole length of the optical system, and keeping, at an appropriate value, an emission angle of a ray emitted from the optical system toward the image forming surface to obtain an excellent image. Below the lower limit of the condition (1), the whole length of the optical system becomes excessively small. Therefore, it becomes difficult to minimize the incidence angle of the ray emitted from the optical system upon the image forming surface with respect to the normal to the image forming surface. As a result, although miniaturization can be achieved, any excellent image cannot be obtained under the influence of shading. Above the upper limit of the condition (1), the whole length of the optical system becomes excessively large. Therefore, the miniaturization cannot be achieved.

Furthermore, the image taking optical system of the present invention satisfies the following condition (2):

$$1.7 \leq |\Delta D12|/(\tan\omega \times FL) \leq 4.6 \qquad (2),$$

wherein ΔD12 denotes a change amount of the space between the first lens unit and the second lens unit during the zooming from the wide-angle end to the telephoto end.

When the condition (2) is satisfied, it is possible to secure a zooming ratio in excess of 2.5 without strengthening the refractive powers of the first and second lens units, enhancing the zooming function of the third lens unit, or hindering the reduction of the whole length of the optical system. Furthermore, an excellent performance can be obtained while reducing the whole length of the optical system. Below the lower limit of the condition (2), the refractive powers of the first and second lens units need to be strengthened, and the zooming function of the third lens unit needs to be enhanced in order to obtain a zooming ratio of 2.5 or more. In a case where the refractive powers of the first and second lens units are strengthened, when a desired zooming ratio is obtained, the refractive powers become excessively strong. Therefore, it is difficult to maintain an excellent performance over the whole zooming range. In a case where the zooming function of the third lens unit is enhanced, when the third lens unit includes two lenses at most, aberration changes by the zooming cannot be suppressed. This eventually increases a sum of thicknesses of the lenses constituting the third lens unit and the spaces between the lenses. Therefore, the whole length of the optical system or the whole length of the lens barrel when collapsed cannot be reduced. Above the upper limit of the condition (2), a high zooming ratio can be easily obtained, but it becomes difficult to reduce the whole length of the optical system. Furthermore, in a case where, for example, an aperture stop which moves integrally with the second lens unit is disposed on the object side of the second lens unit, the entrance pupil is positioned excessively close to the image forming surface as viewed from the surface closest to the object side in the first lens unit. This eventually increases the outer diameter of the first lens unit required for allowing an off-axial ray to pass through the center of the entrance pupil, and the miniaturization of the lens diameter cannot be achieved.

Here, when only one negative lens is disposed among the lenses constituting the first lens unit, the total thickness of the first lens unit can be reduced. As a result, it is possible to reduce the whole length of the optical system or the whole length of the lens barrel when collapsed, and it is further possible to reduce the outer diameter of the first lens unit.

Moreover, the second lens unit includes at least one positive lens and at least one negative lens. In addition, the unit satisfies the following condition (3):

$$52.0 \leq PAVd \qquad (3),$$

wherein PAVd denotes the Abbe number of the positive lens of the second lens unit.

In a case where the condition (3) is satisfied, even when the number of the lenses of the second lens unit is small, it is possible to effectively correct an axial chromatic aberration and a chromatic aberration of magnification during the zooming. Therefore, even when the zooming ratio is 2.5 or more, a satisfactory performance can be obtained in the whole magnification range. It is to be noted that in a case where the second lens unit has a plurality of positive lenses, all of the positive lenses preferably satisfy this condition (3).

According to the above-described constitution, even when the zooming ratio is 2.5 or more, and the half field angle in the wide-angle end is 28° or more, it is possible to obtain the image taking optical system having a satisfactory performance while reducing the whole length of the optical system, the whole length of the lens barrel, and the outer diameter of the lens.

Furthermore, there will be described preferable constitutions of details in embodying the above-described image taking optical system of the present invention.

A lens unit having a positive refractive power may be additionally disposed on the image side of the third lens unit. Accordingly, the ray diverging from the third lens unit having a negative refractive power is brought close to parallelism with respect to an optical axis, and this can be a measure for reducing the influence of shading. However, in consideration of the reduction of the whole length of the optical system or the whole length of the lens barrel at a time when the lens barrel is collapsed, the image taking optical system is preferably constituted of: three lens units including, in order from the object side, a lens unit having a negative refractive power, a lens unit having a positive refractive power, and a lens unit having a negative refractive power; or four lens units including, in order from the object side, a lens unit having a negative refractive power, a lens unit having a positive refractive power, a lens unit having a negative refractive power, and a lens unit having a positive refractive power.

When upper-limit values and/or lower-limit values of the above conditions (1) and (2) are changed as follows, the above-described effect can further be improved:

$$5.5 \leq W\_L/(\tan\omega \times FL) \leq 10.5 \qquad (1'); \text{ and}$$

$$2.2 \leq |\Delta D12|/(\tan\omega \times FL) \leq 4.6 \qquad (2').$$

Moreover, the following condition (4) is preferably satisfied:

$$0.45 \leq D23W/(\tan\omega \times FL) \leq 3.0 \qquad (4),$$

wherein D23W denotes the length from the lens surface closest to the image side in the second lens unit to the lens surface closest to the object side in the third lens unit in the wide-angle end.

In a case where the condition (4) is satisfied, even when the third lens unit includes two lenses at most, it is possible to obtain a satisfactory aberration correcting effect and a zooming function by the third lens unit. Below the lower limit of the condition (4), it becomes difficult to correct the aberration in the wide-angle end, and it also becomes difficult to secure a half field angle of 28° or more in the wide-angle end. A sufficient amount of movement of the third lens unit relative to the second lens unit is not easily secured, and it becomes difficult to maintain the performance in an intermediate focal length state or the telephoto end. Above then upper limit of the condition (4), in a case where an angle of the ray emitted from the third lens unit is reduced as a measure against the shading, the refractive power of the third lens unit becomes excessively weak. Therefore, the zooming function of the third lens unit is not easily obtained. As a result, it becomes difficult to reduce the whole length of the optical system.

It is to be noted that when the above condition (4) is set as follows, and the following condition is satisfied, the above effect can further be improved:

$$0.7 \leq D23W/(\tan\omega \times FL) \leq 2.5 \qquad (41).$$

Moreover, the following condition (5) is preferably satisfied:

$$0.38 \leq (f2/fw) \times (\tan\omega \times FL/fw) \leq 0.95 \qquad (5),$$

wherein f2 denotes the focal length of the second lens unit, and fw denotes the focal length of the image taking optical system in the wide-angle end.

When the condition (5) is satisfied, it is possible to obtain a small-sized optical system having a satisfactory performance while securing the zooming ratio and the half field angle of 28° or more in the wide-angle end. Below the lower limit of the condition (5), in a case where a zooming ratio of 2.5 or more is secured while maintaining the performance in the whole zooming range, the refractive power of the second lens unit having a large zooming function needs to be further strengthened. Therefore, it becomes difficult to secure both of the half field angle of 28° or more in the wide-angle end and the satisfactory performance. Above the upper limit of the condition (5), the refractive power of the second lens unit weakens. To secure a zooming ratio of 2.5 or more and the half field angle of 28° or more in the wide-angle end while maintaining the performance in the whole zooming range, the movement of the second lens unit needs to be increased. Therefore, a space for moving the second lens unit needs to be enlarged, and the whole length of the optical system easily increases.

It is to be noted that when the above condition (5) is set as follows, and the following condition is satisfied, the performance can further be held satisfactorily:

$$0.45 \leq (f2/fw) \times (\tan\omega \times FL/fw) \leq 0.85 \qquad (5').$$

Moreover, the following condition (6) is preferably satisfied:

$$2.7 \leq W\_L/fw \leq 10.0 \qquad (6).$$

When the condition (6) is satisfied, it is possible to achieve enlargement of the field angle and reduction of the whole length of the optical system. It is also possible to keep, at an appropriate angle, the incidence angle of the ray upon the image forming surface with respect to the normal to the image forming surface, and a satisfactory image can be obtained. Below the lower limit of the condition (6), in a case where the half field angle of 28° or more is secured in the wide-angle end, this excessively increases the incidence angle of the ray upon the image forming surface with respect to the normal to the image forming surface. Therefore, any satisfactory image cannot be obtained owing to the shading. Above the upper limit of the condition (6), in a case where the half field angle of 28° or more in the wide-angle end is secured, the whole length of the optical system in the wide-angle end becomes excessively large. Therefore, the miniaturization cannot be achieved.

Furthermore, the following condition (7) is preferably satisfied:

$$3.7 \leq |\Delta D12/\Delta D23| \qquad (7),$$

wherein $\Delta D12$ denotes a change amount of the space between the first lens unit and the second lens unit during the zooming from the wide-angle end to the telephoto end, and $\Delta D23$ denotes a change amount of the space between the second lens unit and the third lens unit during the zooming from the wide-angle end to the telephoto end.

In a case where the condition (7) is satisfied, even when the third lens unit is constituted of two lenses at most, the satisfactory performance can be secured in the whole zooming range. Below the lower limit of the condition (7), a positional change of the third lens unit relative to the second lens unit becomes excessively large. Therefore, when the third lens unit includes two lenses at most, it becomes difficult to keep the aberration to be excellent in the whole zooming range. When the third lens unit is constituted of three or more lenses, the change in the performance due to the zooming can be suppressed. However, in this case, the total thickness of the third lens unit increases, and it becomes difficult to reduce the whole length of the optical system or the whole length of the lens barrel when collapsed.

Furthermore, the first lens unit is preferably constituted of two lenses including a negative lens and a positive lens in order from the object side. According to this constitution, even when the zooming ratio exceeds 2.5, the changes of the axial chromatic aberration and the chromatic aberration of magnification due to the zooming can be satisfactorily corrected with less lenses.

At this time, the following condition (8) is further preferably satisfied:

$$0.6 \leq G1\Sigma d/(\tan\omega \times FL) \leq 1.3 \quad (8),$$

wherein G1Σd denotes a length from the lens surface closest to the object side to the lens surface closest to the image side in the first lens unit.

When the condition (8) is satisfied, it is possible to satisfactorily correct the aberration change while reducing the whole length of the optical system. Below the lower limit of the condition (8), a degree of freedom for correcting the aberration, that is, a thickness or a radius of curvature of the lens is restricted. Therefore, in a case where the zooming ratio exceeds 2.5, it is difficult to keep off-axial aberrations to be satisfactory in the whole zooming range. Above the upper limit of the condition (8), it becomes difficult to reduce the whole length of the optical system or the whole length of the lens barrel when collapsed. The lens outer diameter of the first lens unit increases, and the miniaturization cannot be achieved.

Furthermore, the second lens unit includes one negative lens and at least one positive lens. Additionally, at least one of the positive lenses preferably satisfies the following condition (9):

$$75.0 \leq PVd \quad (9),$$

wherein PVd denotes the Abbe number of the positive lens of the second lens unit. In a case where there exists a plurality of positive lenses, at least one positive lens preferably satisfies this condition.

When the second lens unit having a large zooming function is constituted in this manner, the change of the axial chromatic aberration mainly due to the zooming can be held satisfactorily.

At this time, the following condition (10) is further preferably satisfied:

$$45.0 \leq PVd - NVd \quad (10),$$

wherein PVd denotes the Abbe number of the positive lens of the second lens unit, and NVd denotes the Abbe number of the negative lens of the second lens unit. In a case where there exists a plurality of positive lenses, at least one positive lens preferably satisfies this condition.

When the condition (10) is satisfied, the change of the axial chromatic aberration by the zooming can be satisfactorily suppressed, and the performance can further be enhanced.

Furthermore, in order from the object side, the first lens unit is preferably constituted of two lenses including a positive lens and a negative lens, the second lens unit is constituted of three lenses including a positive lens, a negative lens, and a positive lens, or two lenses including a positive lens and a negative lens, and the third lens unit is constituted of one negative lens only.

According to such constitution, the total thickness of the respective lens units can be reduced, and it is possible to secure a more satisfactory performance while further reducing the whole length of the lens barrel when collapsed. When aspherical surfaces are used in the surface closest to the object side and the surface closest to the image side in the second lens unit, the second lens unit can be constituted of two lenses including a positive lens and a negative lens in order from the object side. In this case, it is possible to further reduce the whole length of the lens barrel when collapsed. The image taking optical system may be constituted so that any lens unit having the refractive power is not disposed on the image-surface side of the third lens unit, that is, the system is constituted of only three units including the first lens unit having a negative refractive power, the second lens unit having a positive refractive power, and the third lens unit having a negative refractive power. According to such constitution, the whole length of the optical system or the whole length of the lens barrel when collapsed can further be reduced.

In addition, the first lens unit is preferably moved during the zooming so that the whole length of the optical system is minimized in a state between the wide-angle end and the telephoto end.

According to such constitution, it is possible to increase a change amount due to the zooming of the space between the first lens unit and the second lens unit, and the aberrations of the first and second lens units can be efficiently corrected. That is, the first lens unit can be effectively provided with an effect of correcting curvature of field in the intermediate portion of the zooming range. Therefore, it becomes easy to further reduce the whole length of the optical system.

Moreover, the following condition (11-1) is preferably satisfied, $$7.0\% \leq |DTW\_\times 1.0| \quad (11\text{-}1),$$

wherein DTW_×1.0 denotes a value indicated in % of distortion in a maximum image height position in the wide-angle end at a time when the optical system is focused on an infinite object.

According to the constitution which satisfies the condition (11-1), that is, a constitution which generates a certain degree of distortion, it is possible to reduce burden of the distortion correction imposed on the first lens unit, especially burden in the wide-angle end. Therefore, a degree of freedom in aberration correction can be largely increased in the first lens unit in which the largest distortion is generated in the wide-angle end. In consequence, it is possible to reduce the total thickness of the first lens unit, and it is further possible to reduce the whole length of the optical system or the whole length of the lens barrel when collapsed.

It is to be noted that even when the distortion of the taken image is corrected using electric processing after the image taking, a satisfactory image can be obtained. In this case, it is preferable to satisfy the following conditions (11-2), (11-3), and (11-4):

$$3.5\% \leq |DTW\_x0.7| \leq 15.0\% \tag{11-2}$$

$$7.0\% \leq |DTW\_x1.0| \leq 25.0\% \tag{11-3; and}$$

$$|DTW| \leq 15.0\% \tag{11-4},$$

wherein DTW_x0.7 denotes a value indicated in % of the distortion in a position corresponding to a height 0.7 time the maximum image height in the wide-angle end at a time when the optical system is focused on an infinite object, and ΔDTW denotes a difference between the values indicated in % of the distortion in positions corresponding to heights 0.7 time and 1.0 time the maximum image height in the wide-angle end at a time when the optical system is focused on the infinite object. Here, assuming that Y'0 is a paraxial image height and Y' is an actual image height, the value indicated in % of the distortion is represented by the following:

$$\text{distortion} = [(Y'-Y'0)/Y'0] \times 100 \quad (\%).$$

Below the lower limit of each of the conditions (11-2) and (11-3), that is, in a case where the distortion is excessively small, the burden of the distortion correction imposed on the lens system increase. Therefore, a function of correcting the distortion needs to be improved in the first lens unit. As a result, it becomes difficult to reduce the total thickness of the first lens unit. When the upper limits of the conditions (11-2) and (11-3) are exceeded, and the distortion is corrected by the electric processing of the image, resolution remarkably drops, and a satisfactory image cannot be obtained. To prevent the drop of the resolution due to the electric correction, the condition (11-4) is preferably satisfied.

Furthermore, the third lens unit is preferably moved on the optical axis to thereby perform focusing.

Since it is possible to reduce the diameter of the third lens unit in the image taking optical system of the present invention, the system can be miniaturized and lightened. Therefore, when the third lens unit is moved to thereby perform the focusing in the embodiment of the present invention, it becomes easy to miniaturize a driving actuator, and the lens barrel can be miniaturized.

At this time, when the condition (4) is further satisfied, it is possible to secure an appropriate space between the second lens unit and the third lens unit, and it is possible to secure a sufficient allowance for focusing movement required for covering a manufacturing fluctuation. When the above condition (7) is satisfied, the aberration change by the focusing can be suppressed, and a satisfactory performance can be secured even in the shortest object distance.

It is to be noted that when the following condition (12) is satisfied, the half field angle in the wide-angle end can be set to 28° or more:

$$0.53 \leq \tan\omega \times FL/fw \tag{12}.$$

Moreover, the image taking optical system can be constituted of only three lens units including the first, second, and third lens units.

Alternatively, the image taking optical system may be constituted of four lens units by adding, on the image side of the third lens unit, a fourth lens unit having a positive refractive power and fixed (immobile) during the zooming. In this case, as the fourth lens unit, there may be disposed one positive-refractive-power field lens which is fixed in the vicinity of an image sensor during the zooming, and the object side of a package of the image sensor may be sealed with the field lens and a frame. In this case, an optical low pass filter may be omitted.

According to such constitution, it is possible to set the incidence angle upon the image forming surface to an appropriate angle by the field lens even while reducing the whole length of the optical system, and the image can be prevented from being degraded by the shading. An image sensor such as a CCD is generally provided with cover glass. However, the cover glass is disposed close to the image forming surface. Therefore, in a case where dust sticks to the cover glass, even micro dust is reflected in the image. To prevent this, in general, the image sensor is sealed with the low pass filter. According to the above-described constitution, this low pass filter is replaced with a lens having an effect of the field lens, whereby a measure can be taken against the dust. In addition, the diameter of an effective light flux in each lens unit can be reduced, and the optical system can be miniaturized.

Furthermore, when the optical system is constituted so as to satisfy the following condition, it is possible to effectively prevent the dust from being reflected in the image while miniaturizing the system:

$$0.6 \leq DL/(\tan\omega \times FL) \leq 1.5 \tag{13},$$

wherein DL denotes a length from the object-side surface of the field lens to the image forming surface, ω denotes a half field angle of the image taking optical system in an arbitrary state thereof, and FL denotes a focal length of the image taking optical system in the arbitrary state.

Next, there will be described numerical examples of the present invention. In data tables of the respective examples, RDY denotes a radius of curvature of each lens surface; THI denotes a thickness of each lens or a space between lenses; Nd denotes a refractive index at the d-line; Vd denotes the Abbe number of each lens at the d-line (587.56 nm); K denotes a conical coefficient; A4, A6, A8, and A10 denote aspherical coefficients; f denotes the focal length of the image taking optical system; Fno denotes the F number; 2ω denotes the whole field angle; and D1, D2, and D3 denote variable spaces.

Moreover, a shape of each aspherical surface is represented by the following equation by use of each aspherical coefficient. It is assumed that the optical axis is set as the Z-axis, and the Y-axis is set to be perpendicular to the optical axis.

$$Z=(y^2/r)/[1+\{1-(1+K)(y/r)^2\}^{1/2}]+A4 \cdot y^4+A6 \cdot y^6+A8 \cdot y^8 A10 \cdot y^{10}.$$

It is to be noted that among the aspherical coefficients, for example, a value of A4 of an aspherical surface 2 of Numerical Example 1 is −4.9566e−4, but this may be indicated as $-4.9566 \times 10^{-4}$. The former format is indicated in the present numerical data.

EXAMPLE 1

Figure 1B:
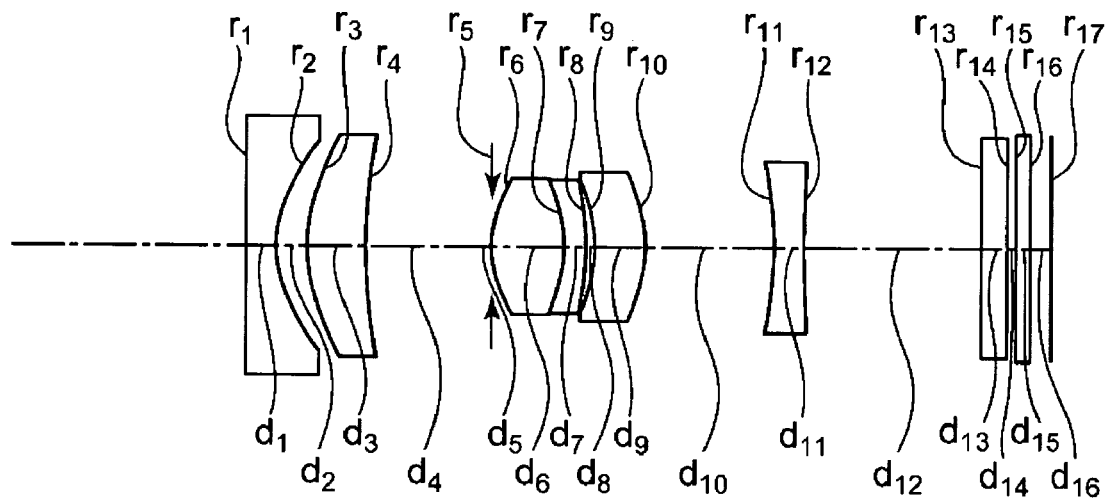
Figure 1C:
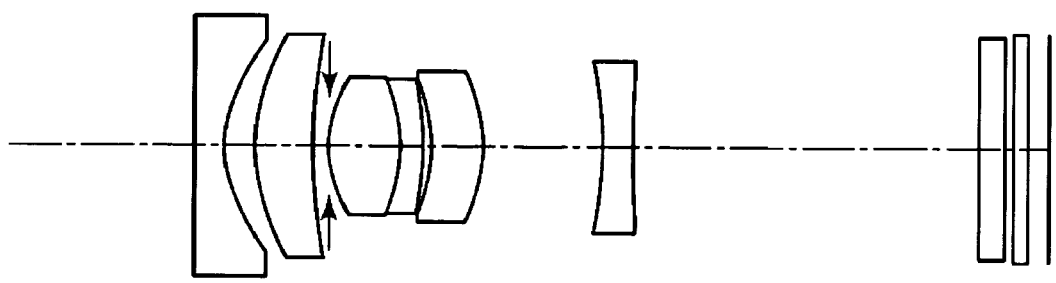
Figure 2A:
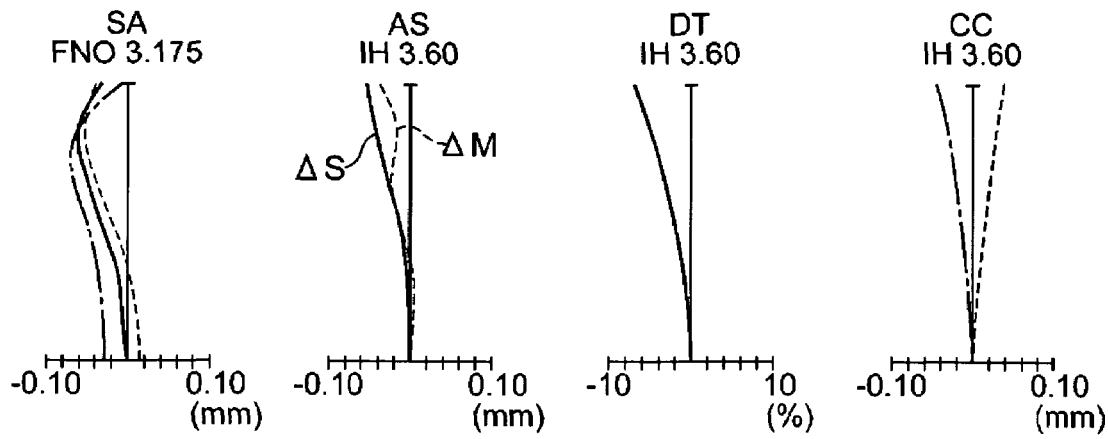
FIGS. 2A to 2C are aberration diagrams of Example 1.
Figure 2B:
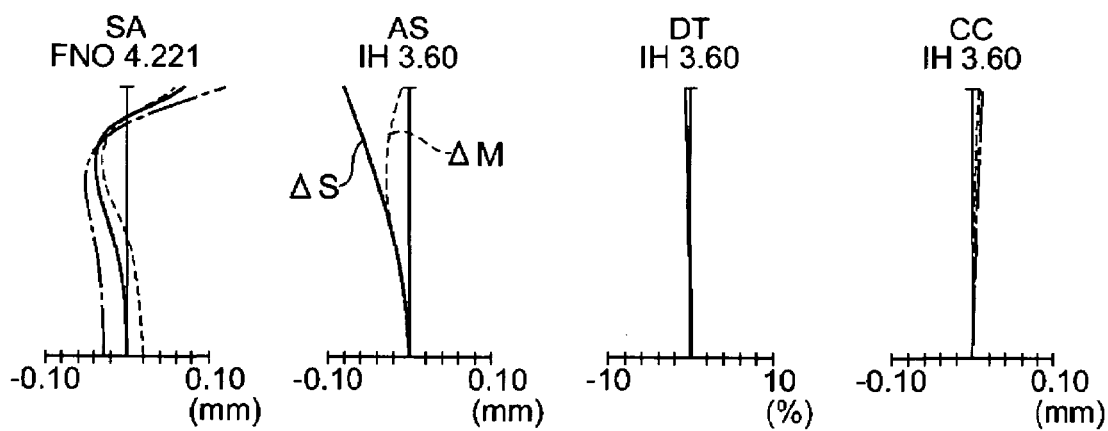
Figure 2C:
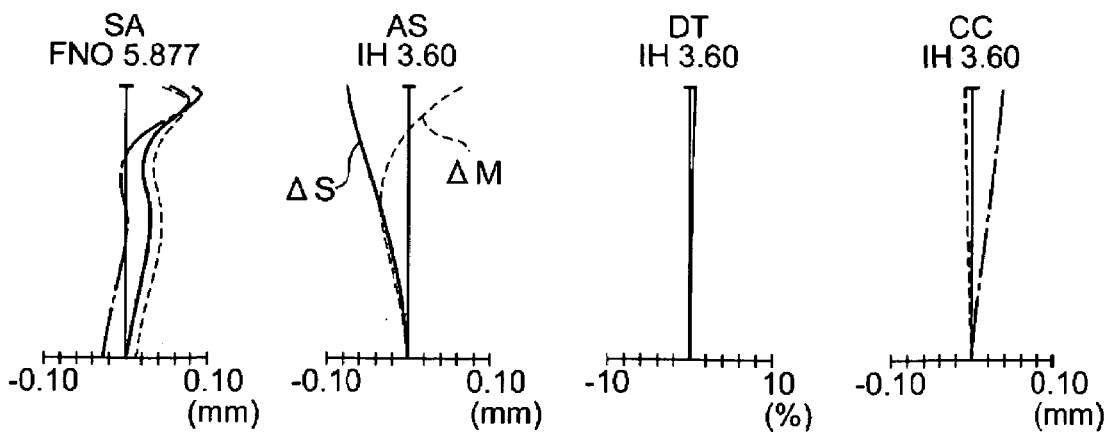

FIGS. 1A to 1C are sectional views along a plane including an optical axis of Example 1. FIG. 1A shows a state in the wide-angle end, FIG. 1B shows a state in an intermediate focal length, and FIG. 1C shows a state in the telephoto end, respectively. FIGS. 2A to 2C are aberration diagrams showing spherical aberration SA, astigmatism AS, distortion DT, and chromatic aberration CC of magnification at a time when the optical system is focused on an infinite object in Example 1. FIG. 2A shows a state in the wide-angle end, FIG. 2B shows a state in the intermediate focal length, and FIG. 2C shows a state in the telephoto end.

As shown in FIGS. 1A to 1C, the image taking optical system of Example 1 includes: a first lens unit G1 having a negative refractive power; an aperture stop S; a second lens unit G2 having a positive refractive power; a third lens unit G3 having a negative refractive power; a filter LPF such as an optical low pass filter; and cover glass CG of an electronic image sensor such as a CCD. In the drawings, I denotes an image receiving surface (image forming surface of the image taking optical system) of the CCD.

The first lens unit G1 includes: a negative meniscus lens L11 whose image-side surface is an aspherical surface and which directs its convex surface on an object side; and a positive meniscus lens L12 which directs its convex surface on the object side. The second lens unit G2 includes, in order from the object side, a cemented lens of a double-convex positive lens L21 and a negative meniscus lens L22 which directs its convex surface on an image side, and a positive meniscus lens L23 whose surfaces are both aspherical surfaces and which directs its convex surface on the image side. The third lens unit G3 includes an only double-concave negative lens L31 whose object-side surface is an aspherical surface.

When zooming is performed from the wide-angle end to the telephoto end, along the optical axis Lc, the first lens unit G1 once moves toward the image side, and thereafter moves toward the object side, the second lens unit G2 moves so as to come close to the first lens unit G1, and the third lens unit G3 moves toward the object side.

Next, there will be described numerical data of the lenses constituting the image taking optical system of Example 1.

TABLE 1

| Surface number | RDY | THI | Nd | Vd |
|---|---|---|---|---|
| 1 | 227.039 | 1.000 | 1.80610 | 40.92 |
| 2* | 4.449 | 0.983 | | |
| 3 | 6.357 | 1.900 | 1.78470 | 26.29 |
| 4 | 20.328 | D1 | | |
| 5 (Aperture Stop) | ∞ | 0.000 | | |
| 6 | 4.254 | 2.300 | 1.49700 | 81.54 |
| 7 | −5.098 | 0.700 | 1.90366 | 31.31 |
| 8 | −9.394 | 0.255 | | |
| 9* | −4.810 | 1.636 | 1.51633 | 64.14 |
| 10* | −4.129 | D2 | | |
| 11* | −10.807 | 1.000 | 1.69350 | 53.21 |
| 12 | 49.892 | D3 | | |
| 13 | ∞ | 0.860 | 1.53996 | 59.45 |
| 14 | ∞ | 0.270 | | |
| 15 | ∞ | 0.500 | 1.51633 | 64.14 |
| 16 | ∞ | 0.690 | | |
| 17 (Image surface) | ∞ | | | |

*: Aspherical surface

TABLE 2

Aspherical Coefficients

| Surface number | RDY | K | A4 | A6 | A8 | A10 |
|---|---|---|---|---|---|---|
| 2 | 4.449 | 0.0000 | −4.9566e−4 | −5.5162e−5 | 2.5320e−6 | −2.2245e−7 |
| 9 | −4.810 | 0.0000 | −9.2682e−4 | 4.1323e−4 | 1.6390e−5 | 0 |
| 10 | −4.129 | 0.0000 | 2.4314e−4 | 3.1309e−4 | 2.2427e−5 | 4.9752e−7 |
| 11 | −10.807 | −0.9470 | 2.4674e−6 | 9.4532e−5 | 1.0943e−5 | −5.3118e−7 |

TABLE 3

Zoom Data

| | Wide-angle end | Intermediate focal length | Telephoto end |
|---|---|---|---|
| F | 6.421 | 10.987 | 18.623 |
| Fno | 3.175 | 4.221 | 5.877 |
| 2ω(°) | 62.3 | 36.6 | 21.8 |
| D1 | 9.598 | 4.011 | 0.495 |
| D2 | 4.742 | 4.168 | 3.877 |
| D3 | 2.007 | 5.736 | 11.223 |

EXAMPLE 2

Figure 3A:
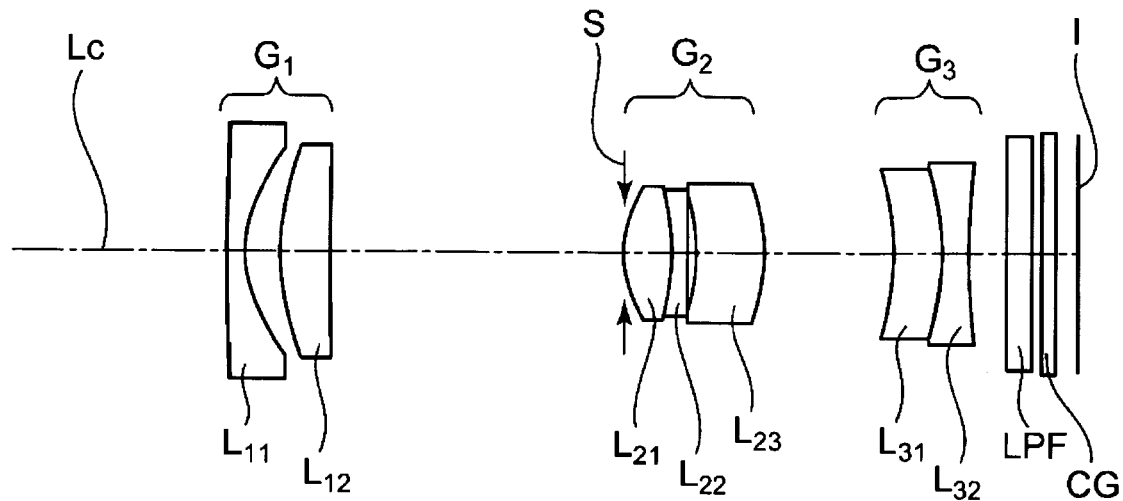
FIGS. 3A to 3C are sectional views along a plane including an optical axis in Example 2 of the present invention.
Figure 3B:
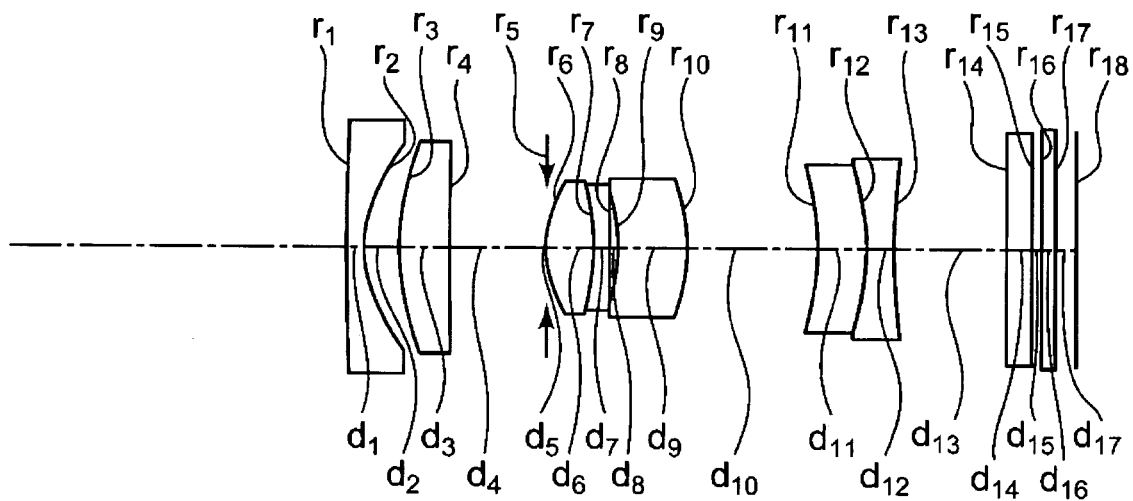
Figure 3C:
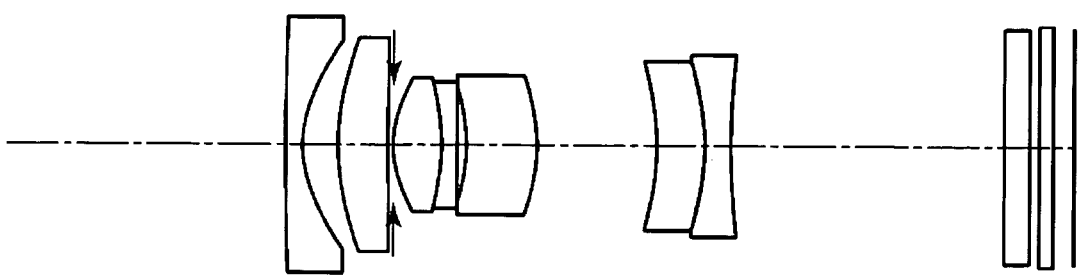
Figure 4A:
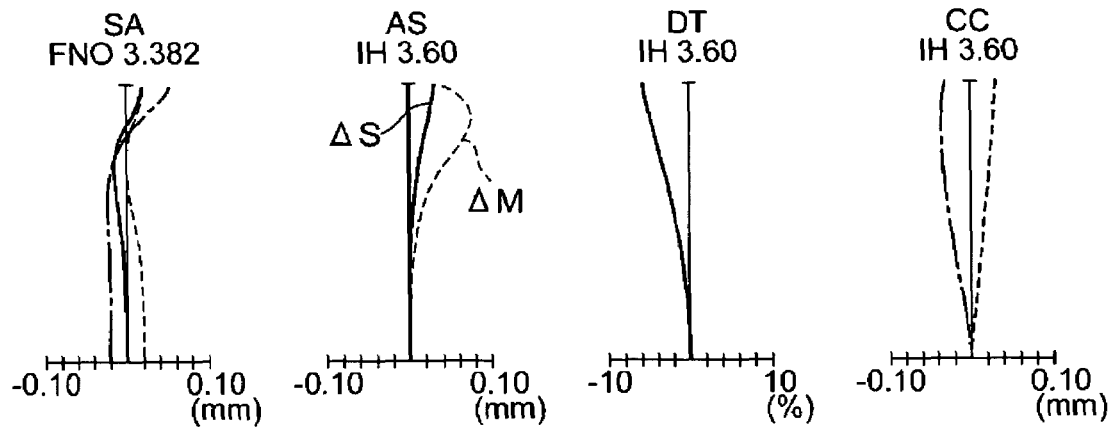
FIGS. 4A to 4C are aberration diagrams of Example 2.
Figure 4B:
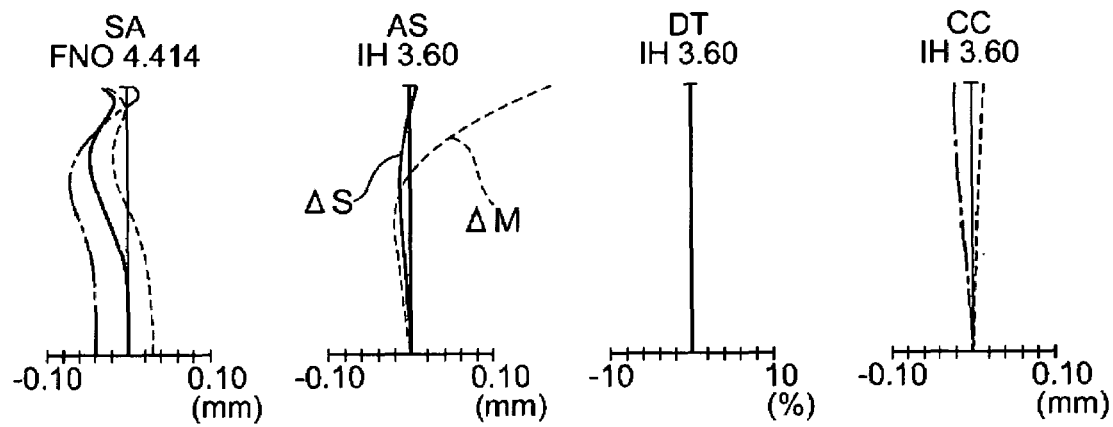
Figure 4C:
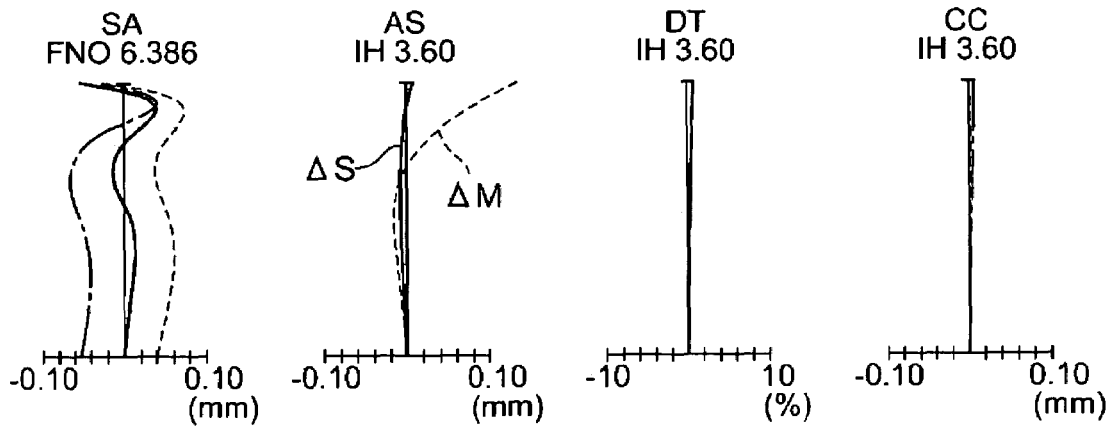

FIGS. 3A to 3C are sectional views along a plane including an optical axis in Example 2. FIG. 3A shows a state in the wide-angle end, FIG. 3B shows a state in the intermediate focal length, and FIG. 3C shows a state in the telephoto end, respectively. FIGS. 4A to 4C are aberration diagrams showing spherical aberration SA, astigmatism AS, distortion DT, and chromatic aberration CC of magnification at a time when optical system is focused on an infinite object in Example 2. FIG. 4A shows a state in the wide-angle end, FIG. 4B shows a state in the intermediate focal length, and FIG. 4C shows a state in the telephoto end.

As shown in FIGS. 3A to 3C, the image taking optical system of Example 2 includes: a first lens unit G1 having a negative refractive power; an aperture stop S; a second lens unit G2 having a positive refractive power; a third lens unit G3 having a negative refractive power; a filter LPF such as an optical low pass filter; and cover glass CG of an electronic image sensor such as a CCD. In the drawings, I denotes an image receiving surface (image forming surface of the image taking optical system) of the CCD.

The first lens unit G1 includes: a negative meniscus lens L11 which directs its convex surface on an object side; and a positive meniscus lens L12 whose image-side surface is an aspherical surface and which directs its convex surface on the object side. The second lens unit G2 includes, in order from the object side, a cemented lens of a double-convex positive lens L21 and a double-concave negative lens L22, and a positive meniscus lens L23 whose surfaces are both aspherical surfaces and which directs its convex surface on the image side. The third lens unit G3 is constituted of a cemented lens including, in order: a positive meniscus lens L31 whose object-side surface is an aspherical surface and which directs its convex surface on the image side; and a double-concave negative lens L32.

When zooming is performed from the wide-angle end to the telephoto end, along the optical axis Lc, the first lens unit G1 once moves toward the image side, and thereafter moves toward the object side, the second lens unit G2 moves so as to come close to the first lens unit G1, and the third lens unit G3 moves toward the object side.

Next, there will be described numerical data of the lenses constituting the image taking optical system of Example 2.

TABLE 4

| Surface number | RDY | THI | Nd | Vd |
|---|---|---|---|---|
| 1 | 57.730 | 0.600 | 1.83481 | 42.71 |
| 2 | 4.622 | 1.111 | | |
| 3 | 8.641 | 1.500 | 1.80518 | 25.42 |
| 4* | 39.110 | D1 | | |
| 5 (Aperture stop) | ∞ | 0.000 | | |
| 6 | 3.458 | 1.500 | 1.52249 | 59.84 |
| 7 | −8.009 | 0.550 | 1.78470 | 26.29 |
| 8 | 161.908 | 0.216 | | |
| 9* | −8.729 | 2.169 | 1.58313 | 59.38 |
| 10* | −4.823 | D2 | | |
| 11* | −7.616 | 1.500 | 1.80518 | 25.42 |
| 12 | −6.745 | 0.800 | 1.71700 | 47.92 |
| 13 | 29.092 | D3 | | |
| 14 | ∞ | 0.860 | 1.53996 | 59.45 |
| 15 | ∞ | 0.270 | | |
| 16 | ∞ | 0.500 | 1.51633 | 64.14 |
| 17 | ∞ | 0.670 | | |
| 18 (Image forming surface) | ∞ | | | |

*: Aspherical surface

TABLE 5

Aspherical Coefficients

| Surface number | RDY | K | A4 | A6 | A8 | A10 |
|---|---|---|---|---|---|---|
| 4 | 39.110 | 0.0000 | −5.9530e−4 | −2.9044e−5 | 1.3306e−6 | −1.3015e−7 |
| 9 | −8.729 | 0.0000 | −3.3861e−3 | 3.7892e−4 | 3.7139e−5 | 0 |
| 10 | −4.823 | 0.0000 | 2.3875e−3 | 3.1323e−4 | 7.1820e−5 | −2.8424e−6 |
| 11 | −7.616 | −4.6840 | −1.3270e−3 | −9.3731e−5 | 5.0609e−6 | 0 |

TABLE 6

Zoom Data

| | Wide-angle end | Intermediate focal length | Telephoto end |
|---|---|---|---|
| F | 6.319 | 10.979 | 18.769 |
| Fno | 3.382 | 4.414 | 6.386 |
| 2ω(°) | 62.3 | 36.2 | 21.5 |
| D1 | 9.251 | 3.116 | 0.237 |
| D2 | 3.962 | 4.130 | 3.859 |
| D3 | 1.167 | 3.494 | 8.484 |

EXAMPLE 3

Figure 5A:
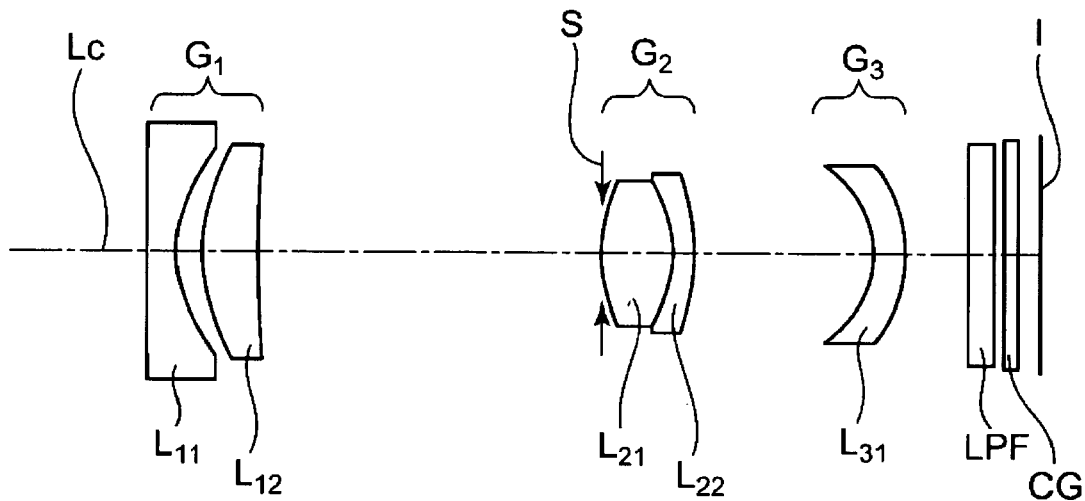
FIGS. 5A to 5C are sectional views along a plane including an optical axis in Example 3 of the present invention.
Figure 5B:
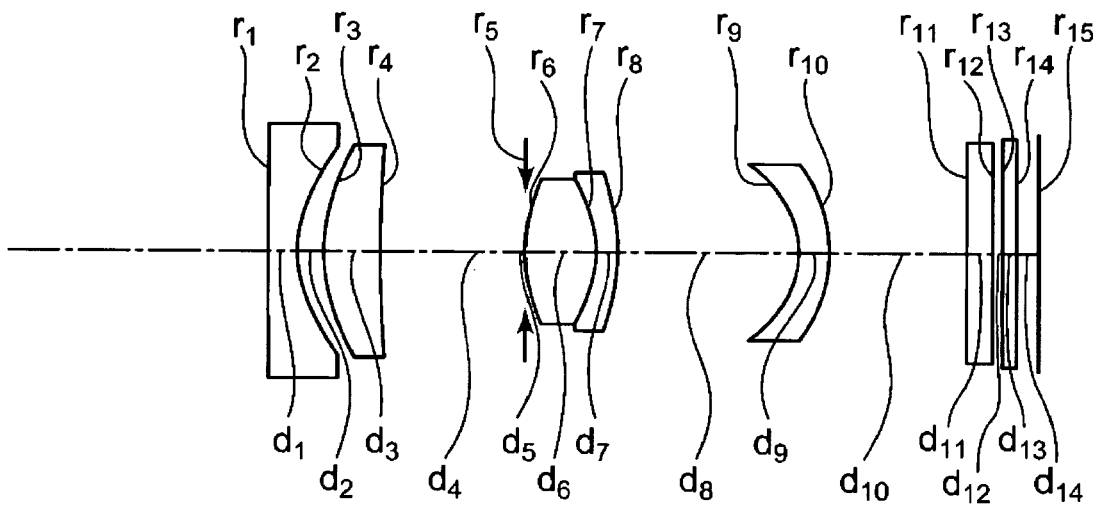
Figure 5C:
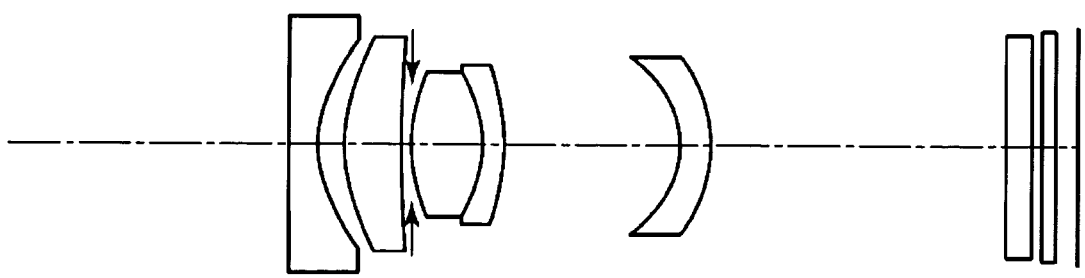
Figure 6A:
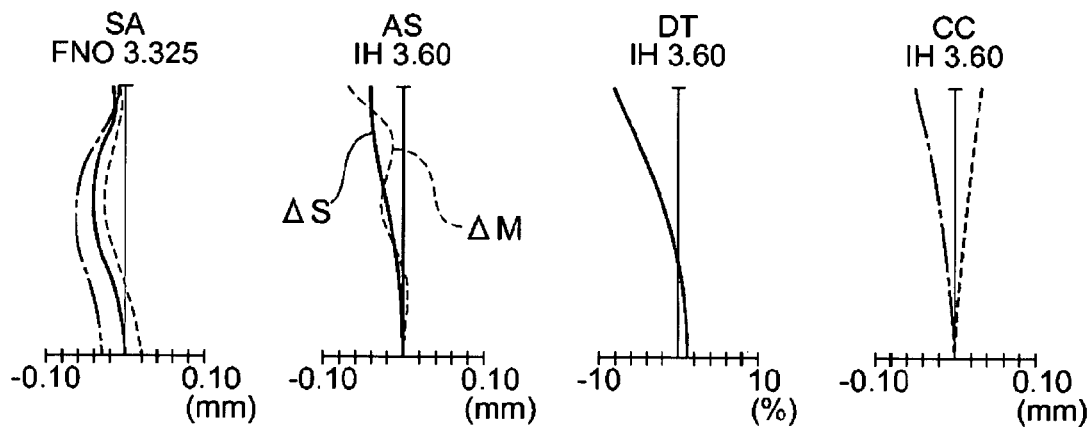
FIGS. 6A to 6C are aberration diagrams of Example 3.
Figure 6B:
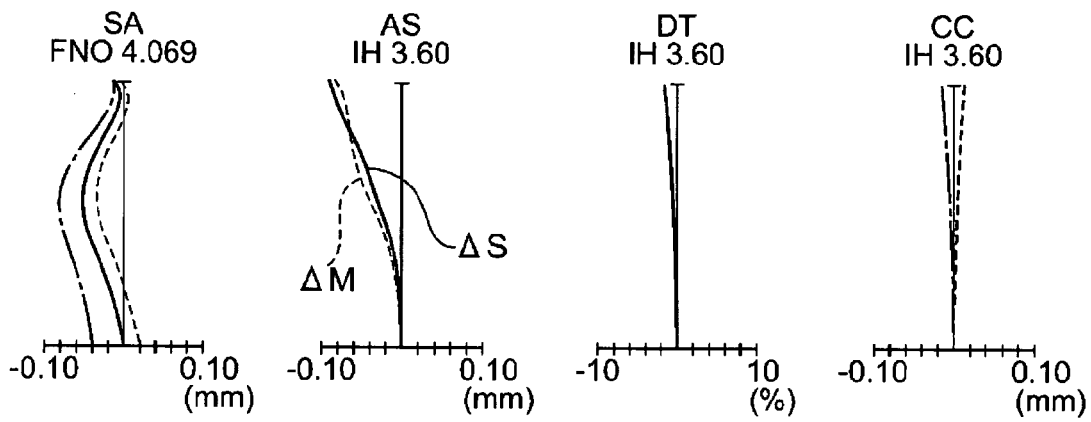
Figure 6C:
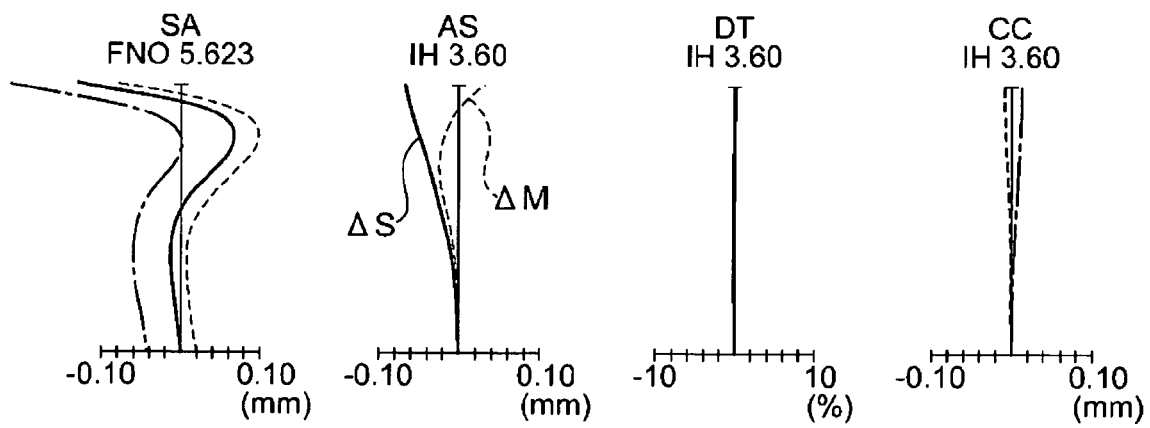

FIGS. 5A to 5C are sectional views along a plane including an optical axis in Example 3. FIG. 5A shows a state in the wide-angle end, FIG. 5B shows a state in the intermediate focal length, and FIG. 5C shows a state in the telephoto end, respectively. FIGS. 6A to 6C are aberration diagrams showing spherical aberration SA, astigmatism AS, distortion DT, and chromatic aberration CC of magnification at a time when optical system is focused on an infinite object in Example 3. FIG. 6A shows a state in the wide-angle end, FIG. 6B shows a state in the intermediate focal length, and FIG. 6C shows a state in the telephoto end.

As shown in FIGS. 5A to 5C, the image taking optical system of Example 3 includes: a first lens unit G1 having a negative refractive power; an aperture stop S; a second lens unit G2 having a positive refractive power; a third lens unit G3 having a negative refractive power; a filter LPF such as an optical low pass filter; and cover glass CG of an electronic image sensor such as a CCD. In the drawings, I denotes an image receiving surface (image forming surface) of the image taking optical system) of the CCD.

The first lens unit G1 includes: a negative meniscus lens L11 whose image-side surface is an aspherical surface and which directs its convex surface on an object side; and a positive meniscus lens L12 which directs its convex surface on the object side. The second lens unit G2 includes, in order from the object side, a cemented lens of a double-convex positive lens L21 whose object-side surface is an aspherical surface and a negative meniscus lens L22 which directs its convex surface on the image side. The third lens unit G3 includes an only negative meniscus lens L31 whose object-side surface is an aspherical surface and which directs its convex surface on the image side.

When zooming is performed from the wide-angle end to the telephoto end, along the optical axis Lc, the first lens unit G1 once moves toward the image side, and thereafter moves toward the object side, the second lens unit G2 moves so as to come close to the first lens unit G1, and the third lens unit G3 moves toward the object side.

Next, there will be described numerical data of the lenses constituting the image taking optical system of Example 3.

TABLE 7

| Surface number | RDY | THI | Nd | Vd |
|---|---|---|---|---|
| 1 | −1509.343 | 1.000 | 1.80610 | 40.92 |
| 2* | 4.505 | 0.814 | | |
| 3 | 6.136 | 1.900 | 1.75520 | 27.51 |
| 4 | 23.672 | D1 | | |
| 5 (Aperture stop) | ∞ | 0.000 | | |
| 6* | 5.020 | 2.300 | 1.49700 | 81.54 |
| 7 | −4.305 | 0.700 | 1.90366 | 31.31 |
| 8 | −6.592 | D2 | | |
| 9* | −3.141 | 1.000 | 1.69350 | 53.21 |
| 10 | −4.676 | D3 | | |
| 11 | ∞ | 0.860 | 1.53996 | 59.45 |
| 12 | ∞ | 0.270 | | |
| 13 | ∞ | 0.500 | 1.51633 | 64.14 |
| 14 | ∞ | 0.680 | | |
| 15 (Image forming surface) | ∞ | | | |

*: Aspherical surface

TABLE 8

Aspherical Coefficients

| Surface number | RDY | K | A4 | A6 | A8 | A10 |
|---|---|---|---|---|---|---|
| 2 | 4.505 | 0.0000 | −4.1673e−4 | −4.5309e−5 | 2.0852e−6 | −1.9520e−7 |
| 6 | 5.020 | 0.0000 | −7.8656e−4 | −9.4142e−5 | 1.0613e−5 | −3.0000e−7 |
| 9 | −3.141 | −0.9738 | −4.2198e−3 | −1.5162e−4 | −6.3744e−5 | 5.7360e−6 |

TABLE 9

Zoom Data

|  | Wide-angle end | Intermediate focal length | Telephoto end |
|---|---|---|---|
| F | 6.464 | 10.398 | 18.420 |
| Fno | 3.325 | 4.069 | 5.623 |
| 2ω(°) | 63.1 | 38.7 | 22.0 |
| D1 | 11.236 | 4.782 | 0.225 |
| D2 | 5.859 | 5.907 | 5.871 |
| D3 | 2.143 | 4.576 | 9.755 |

EXAMPLE 4

Figure 7A:
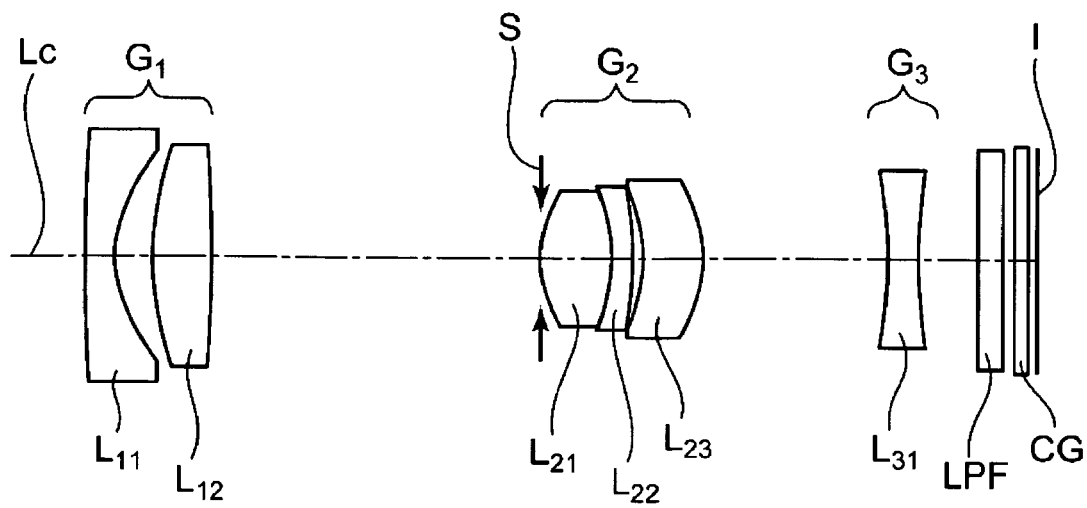
FIGS. 7A to 7C are sectional views along a plane including an optical axis in Example 4 of the present invention.
Figure 7B:
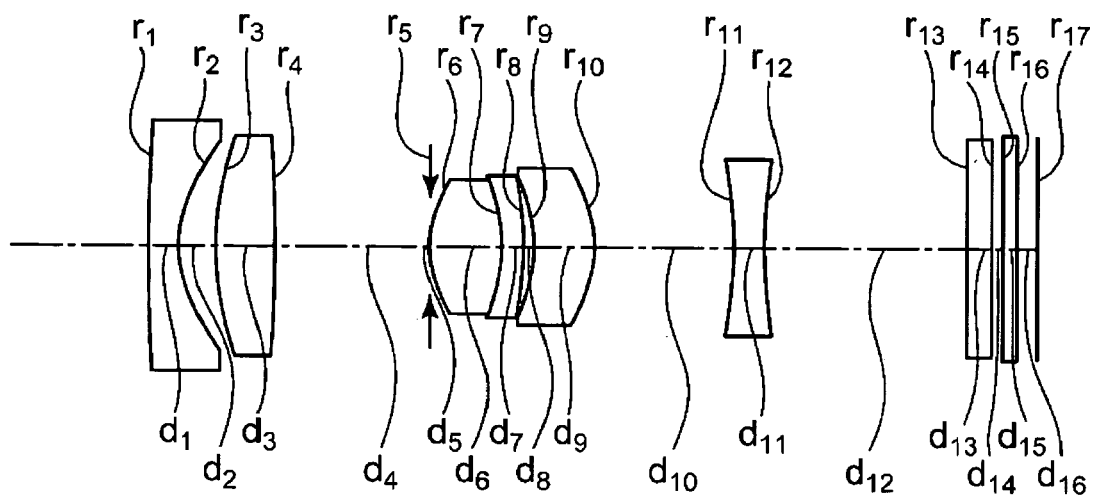
Figure 7C:
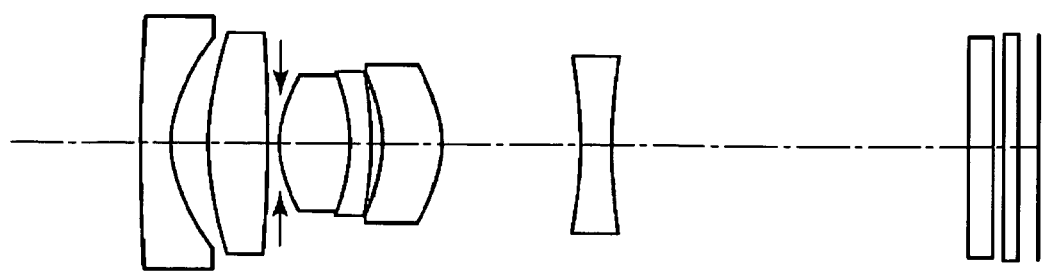
Figure 8A:
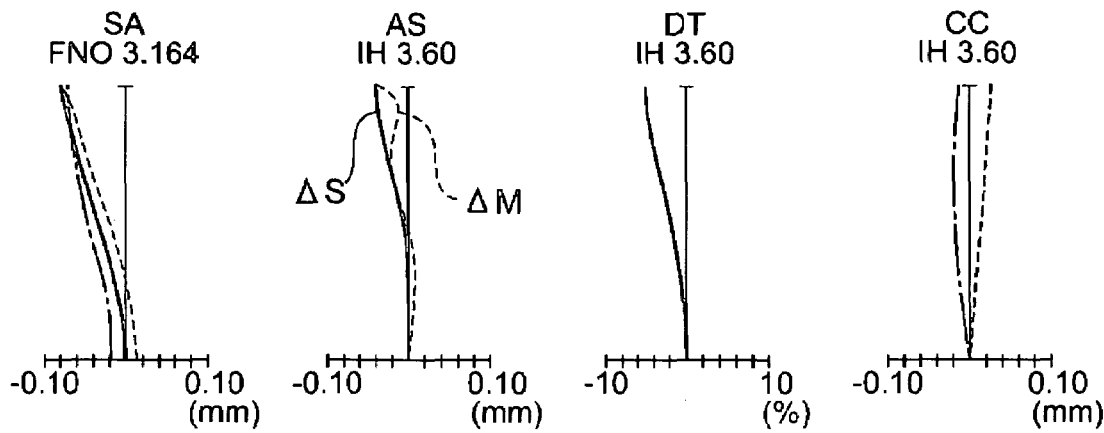
FIGS. 8A to 8C are aberration diagrams of Example 4.
Figure 8B:
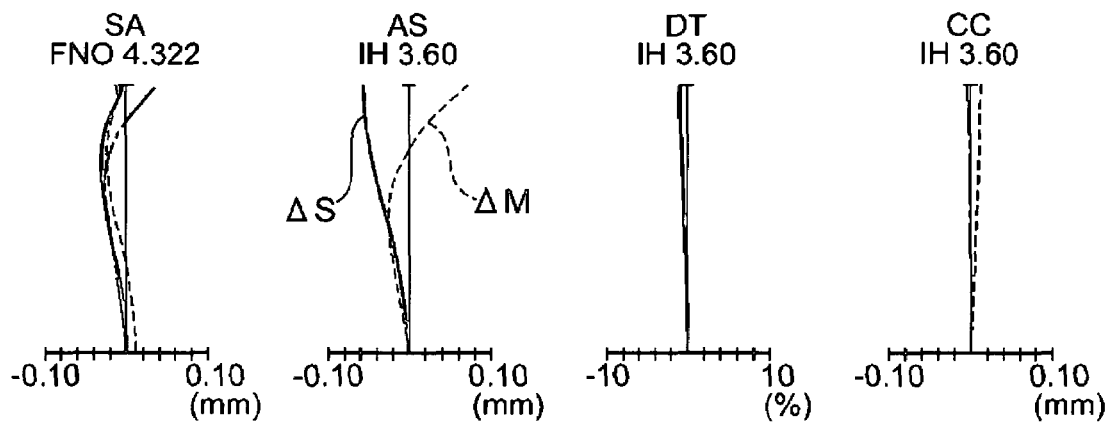
Figure 8C:
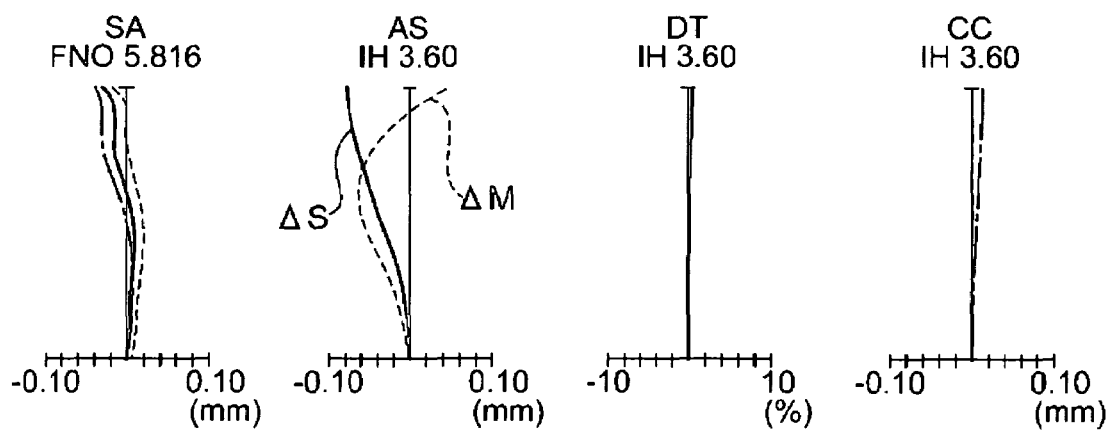

FIGS. 7A to 7C are sectional views along a plane including an optical axis in Example 4. FIG. 7A shows a state in the wide-angle end, FIG. 7B shows a state in the intermediate focal length, and FIG. 7C shows a state in the telephoto end, respectively. FIGS. 8A to 8C are aberration diagrams showing spherical aberration SA, astigmatism AS, distortion DT, and chromatic aberration CC of magnification at a time when optical system is focused on an infinite object in Example 4. FIG. 8A shows a state in the wide-angle end, FIG. 8B shows a state in the intermediate focal length, and FIG. 8C shows a state in the telephoto end.

As shown in FIGS. 7A to 7C, the image taking optical system of Example 4 includes: a first lens unit G1 having a negative refractive power; an aperture stop S; a second lens unit G2 having a positive refractive power; a third lens-unit G3 having a negative refractive power; a filter LPF such as an optical low pass filter; and cover glass CG of an electronic image sensor such as a CCD. In the drawings, I denotes an image receiving surface (image forming surface of the image taking optical system) of the CCD.

The first lens unit G1 includes: a negative meniscus lens L11 which directs its convex surface on an object side; and a double-convex positive lens L12 whose image-side surface is an aspherical surface. The second lens unit G2 includes, in order from the object side, a cemented lens of a double-convex positive lens L21 and a negative meniscus lens L22 which directs its convex surface on the image side, and a positive meniscus lens L23 whose surfaces are both aspherical surfaces and which directs its convex surface on the image side. The third lens unit G3 includes an only double-concave negative lens L31 whose object-side surface is an aspherical surface.

When zooming is performed from the wide-angle end to the telephoto end, along the optical axis Lc, the first lens unit G1 once moves toward the image side, and thereafter moves toward the object side, the second lens unit G2 moves so as to come close to the first lens unit G1, and the third lens unit G3 moves toward the object side.

Next, there will be described numerical data of the lenses constituting the image taking optical system of Example 4.

TABLE 10

| Surface number | RDY | THI | Nd | Vd |
|---|---|---|---|---|
| 1 | 73.661 | 1.000 | 1.88300 | 40.76 |
| 2 | 5.028 | 1.169 |  |  |
| 3 | 11.374 | 1.900 | 1.79491 | 25.63 |
| 4* | −150.535 | D1 |  |  |
| 5 (Aperture stop) | ∞ | 0.000 |  |  |
| 6 | 4.830 | 2.300 | 1.49700 | 81.54 |
| 7 | −6.741 | 0.700 | 1.90366 | 31.31 |
| 8 | −15.751 | 0.347 |  |  |
| 9* | −6.192 | 1.953 | 1.49700 | 81.54 |
| 10* | −4.358 | D2 |  |  |
| 11* | −17.517 | 1.000 | 1.52542 | 55.78 |
| 12 | 14.588 | D3 |  |  |
| 13 | ∞ | 0.860 | 1.53996 | 59.45 |
| 14 | ∞ | 0.270 |  |  |
| 15 | ∞ | 0.500 | 1.51633 | 64.14 |
| 16 | ∞ | 0.700 |  |  |
| 17 (Image forming surface) | ∞ |  |  |  |

*: Aspherical surface

TABLE 11

Aspherical Coefficients

| Surface number | RDY | K | A4 | A6 | A8 | A10 |
|---|---|---|---|---|---|---|
| 4 | −150.535 | 0.0000 | −5.3086e−4 | −3.2502e−5 | 2.0814e−6 | −1.2613e−7 |
| 9 | −6.192 | 0.0000 | −1.4389e−3 | 9.2876e−5 | 1.9238e−5 | 0 |
| 10 | −4.358 | 0.0000 | 1.7222e−3 | 1.0830e−4 | 1.1592e−5 | 3.9738e−7 |
| 11 | −17.517 | −3.4344 | 1.6615e−4 | −1.5432e−4 | 2.3481e−5 | −2.2777e−6 |

TABLE 12

Zoom Data

|  | Wide-angle end | Intermediate focal length | Telephoto end |
|---|---|---|---|
| F | 6.456 | 10.964 | 18.550 |
| Fno | 3.164 | 4.322 | 5.816 |

TABLE 12-continued

Zoom Data

| | Wide-angle end | Intermediate focal length | Telephoto end |
|---|---|---|---|
| 2ω(°) | 61.0 | 36.7 | 21.9 |
| D1 | 10.658 | 5.129 | 0.441 |
| D2 | 5.941 | 4.441 | 4.483 |
| D3 | 1.574 | 6.635 | 11.599 |

EXAMPLE 5

Figure 9A:
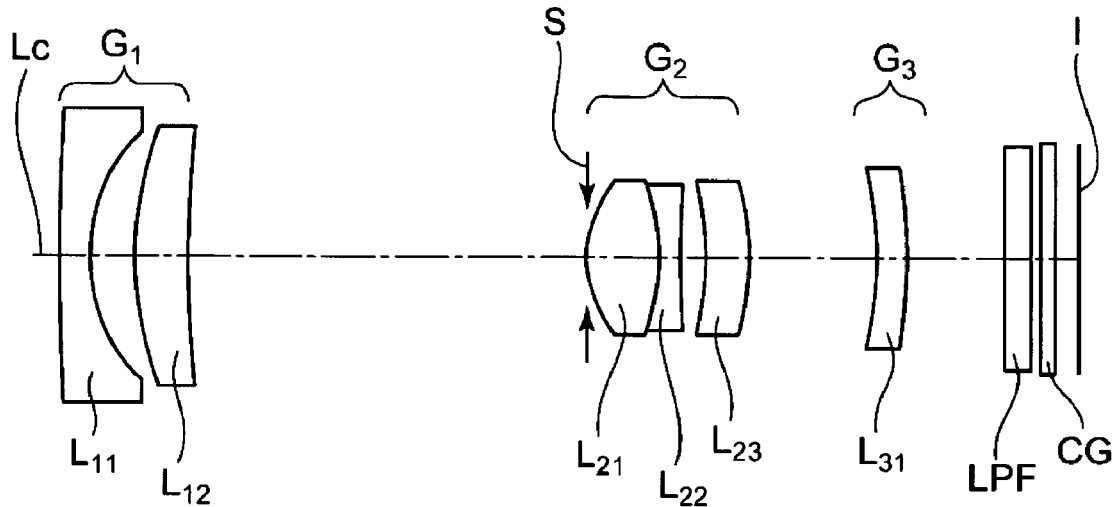
FIGS. 9A to 9C are sectional views along a plane including an optical axis in Example 5 of the present invention.
Figure 9B:
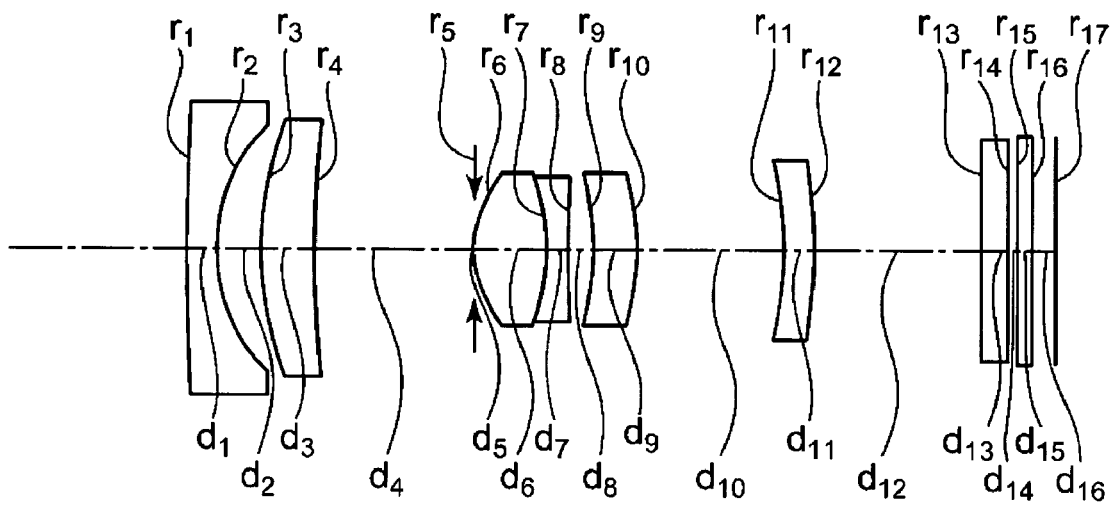
Figure 9C:
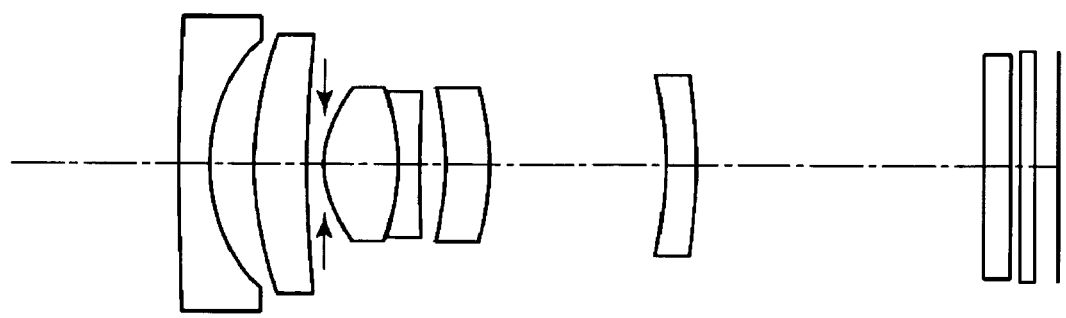
Figure 10A:
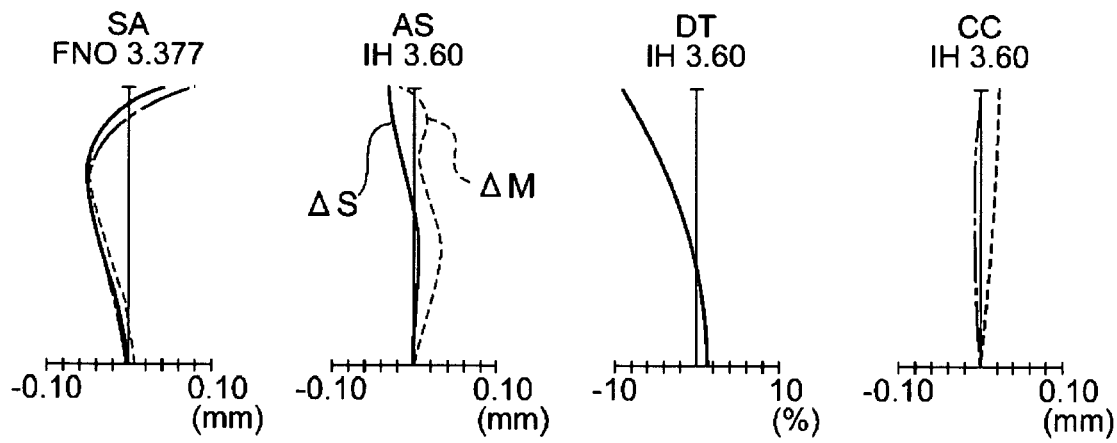
FIGS. 10A to 10C are aberration diagrams of Example 5.
Figure 10B:
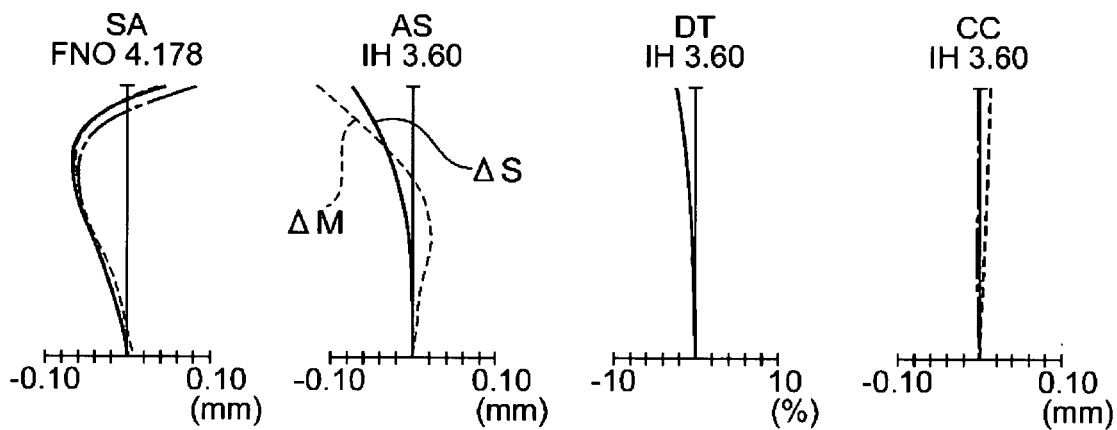
Figure 10C:
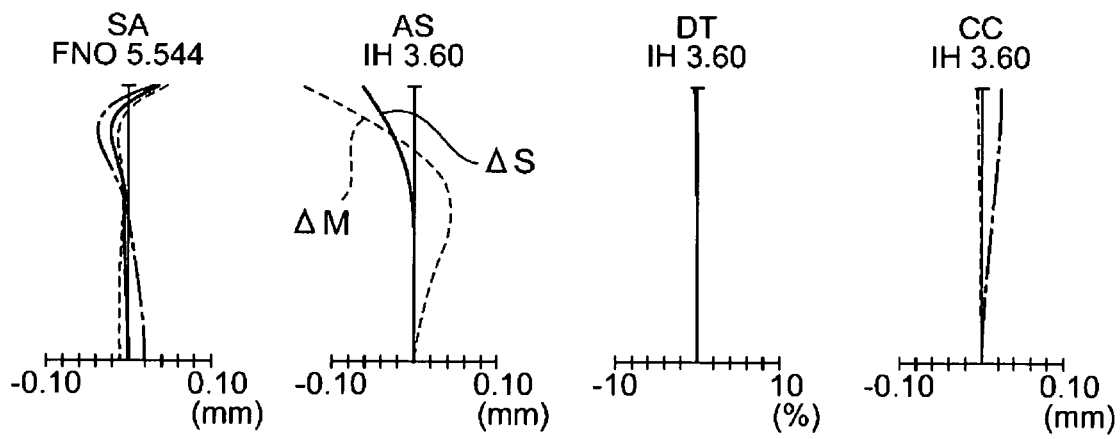

FIGS. 9A to 9C are sectional views along a plane including an optical axis in Example 5. FIG. 9A shows a state in the wide-angle end, FIG. 9B shows a state in the intermediate focal length, and FIG. 9C shows a state in the telephoto end, respectively. FIGS. 10A to 10C are aberration diagrams showing spherical aberration SA, astigmatism AS, distortion DT, and chromatic aberration CC of magnification at a time when optical system is focused on an infinite object in Example 5. FIG. 10A shows a state in the wide-angle end, FIG. 10B shows a state in the intermediate focal length, and FIG. 10C shows a state in the telephoto end.

As shown in FIGS. 9A to 9C, the imege taking optical system of Example 5 includes: a first lens unit G1 having a negative refractive power; an aperture stop S; a second lens unit G2 having a positive refractive power; a third lens unit G3 having a negative refractive power; a filter LPF such as an optical low pass filter; and cover glass CG of an electronic image sensor such as a CCD. In the drawings, I denotes an image receiving surface (image forming surface) of the image taking optical system of the CCD.

The first lens unit G1 includes: a negative meniscus lens L11 which directs its convex surface on an object side; and a positive meniscus lens L12 whose image-side surface is an aspherical surface and which directs its convex surface on the object side. It is to be noted that the positive meniscus lens L21 is a high-refractive-index lens having a refractive index of 2.0 or more. The second lens unit G2 includes, in order from the object side, a cemented lens of a double-convex positive lens L21 and a double-concave negative lens L22, and a positive meniscus lens L23 whose surfaces are both aspherical surfaces and which directs its convex surface on the image side. The third lens unit G3 includes an only negative meniscus lens L31 whose object-side surface is an aspherical surface and which directs its convex surface on the image side.

When zooming is performed from the wide-angle end to the telephoto end, along the optical axis Lc, the first lens unit G1 once moves toward the image side, and thereafter moves toward the object side, the second lens unit G2 moves so as to come close to the first lens unit G1, and the third lens unit G3 moves toward the object side.

Next, there will be described numerical data of the lenses constituting the image taking optical system of Example 5.

TABLE 13

| Surface number | RDY | THI | Nd | Vd |
|---|---|---|---|---|
| 1 | 77.437 | 1.000 | 18.3400 | 37.16 |
| 2 | 5.478 | 1.372 | | |
| 3 | 9.585 | 1.700 | 2.00170 | 20.60 |
| 4* | 19.862 | D1 | | |
| 5 (Aperture stop) | ∞ | 0.000 | | |
| 6 | 3.916 | 2.300 | 1.49700 | 81.54 |
| 7 | −7.139 | 0.700 | 1.59270 | 35.31 |
| 8 | 45.016 | 0.792 | | |
| 9* | −12.798 | 1.424 | 1.49700 | 81.54 |
| 10* | −7.946 | D2 | | |
| 11* | −9.048 | 1.000 | 1.69350 | 53.21 |
| 12 | −16.344 | D3 | | |
| 13 | ∞ | 0.860 | 1.53996 | 59.45 |
| 14 | ∞ | 0.270 | | |
| 15 | ∞ | 0.500 | 1.51633 | 64.14 |
| 16 | ∞ | 0.710 | | |
| 17 (Image forming surface) | ∞ | | | |

*: Aspherical surface

TABLE 14

Aspherical Coefficients

| Surface number | RDY | K | A4 | A6 | A8 | A10 |
|---|---|---|---|---|---|---|
| 4 | 19.862 | 0.0000 | −2.1914e−4 | −1.4058e−5 | 596192e−7 | −2.7906e−8 |
| 9 | −12.798 | 0.0000 | −4.1691e−3 | −6.6339e−5 | 5.1839e−5 | 0 |
| 10 | −7.946 | 0.0000 | 1.1644e−4 | 2.1552e−4 | 2.1585e−5 | 5.5954e−6 |
| 11 | −9.048 | −25.9881 | −4.4825e−3 | 6.5559e−4 | −7.7810e−5 | 4.9252e−6 |

TABLE 15

Zoom Data

| | Wide-angle end | Intermediate focal length | Telephoto end |
|---|---|---|---|
| F | 6.452 | 10.915 | 18.491 |
| Fno | 3.377 | 4.178 | 5.544 |
| 2ω(°) | 64.1 | 37.4 | 22.1 |
| D1 | 12.786 | 5.123 | 0.583 |
| D2 | 4.161 | 4.741 | 5.582 |
| D3 | 2.984 | 5.301 | 9.240 |

EXAMPLE 6

Figure 11A:
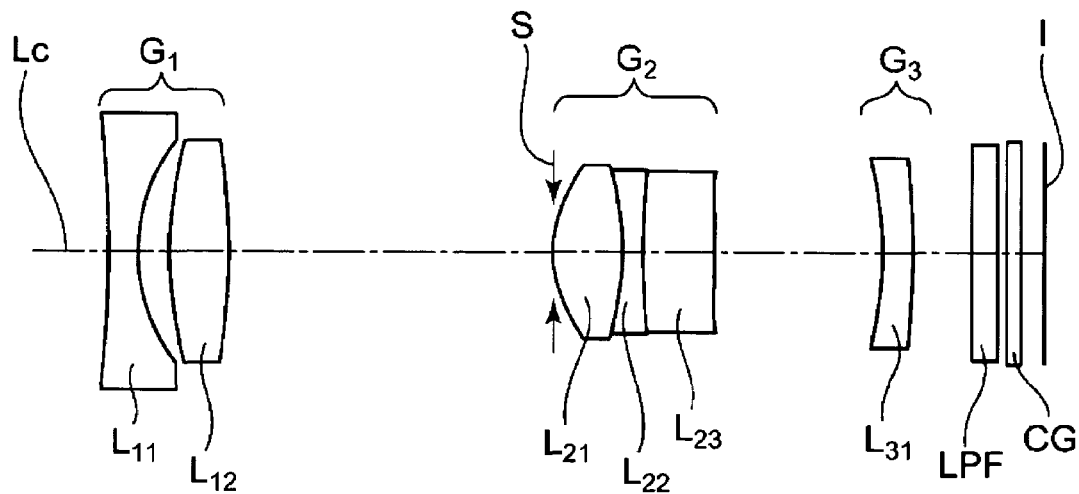
FIGS. 11A to 11C are sectional views along a plane including an optical axis in Example 6 of the present invention.
Figure 11B:
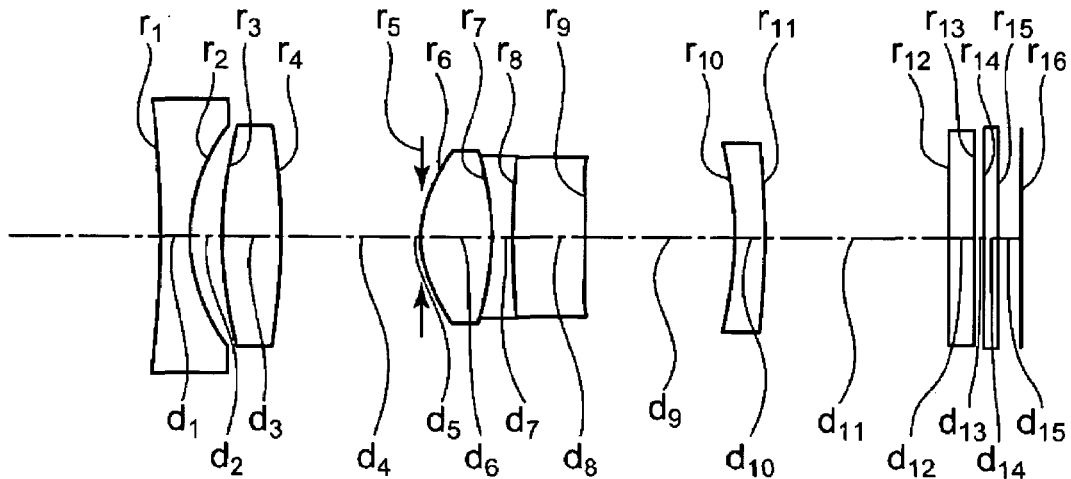
Figure 11C:
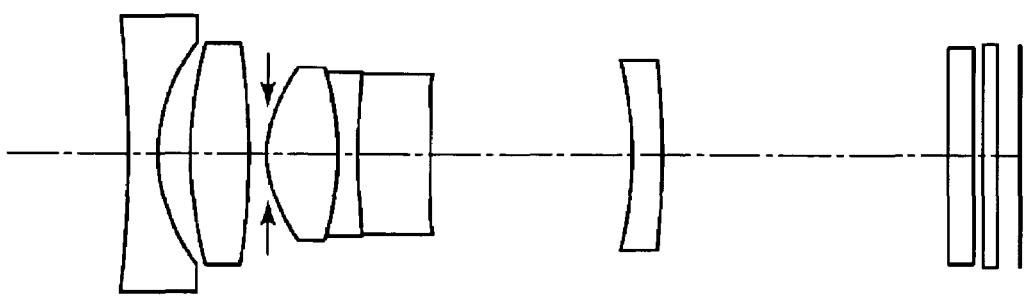
Figure 12A:
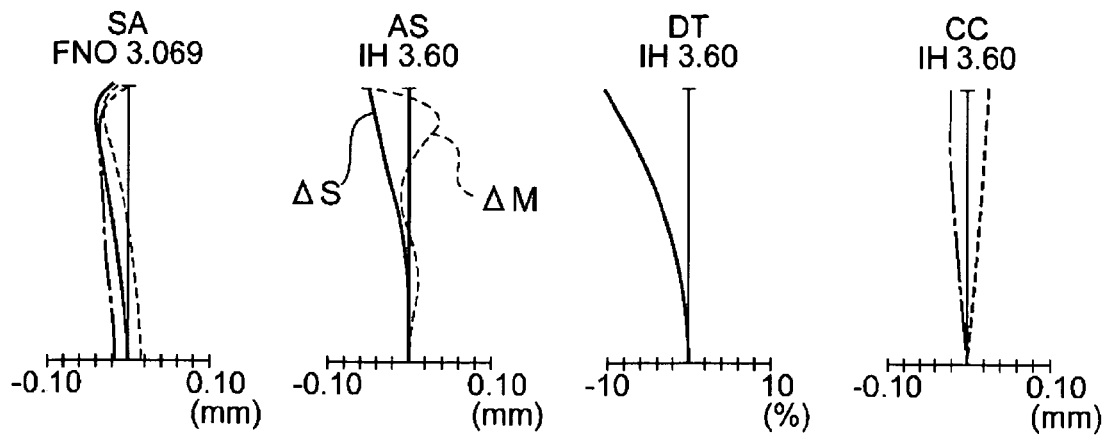
FIGS. 12A to 12C are aberration diagrams of Example 6.
Figure 12B:
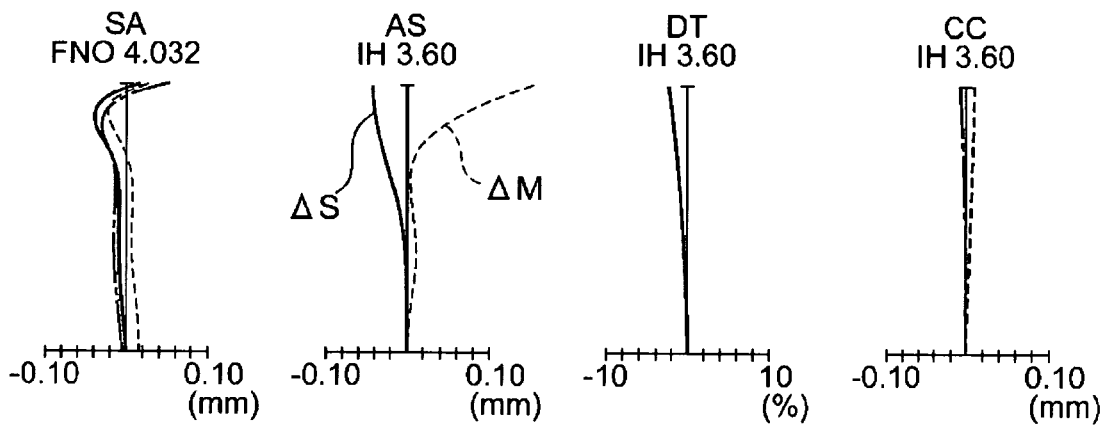
Figure 12C:
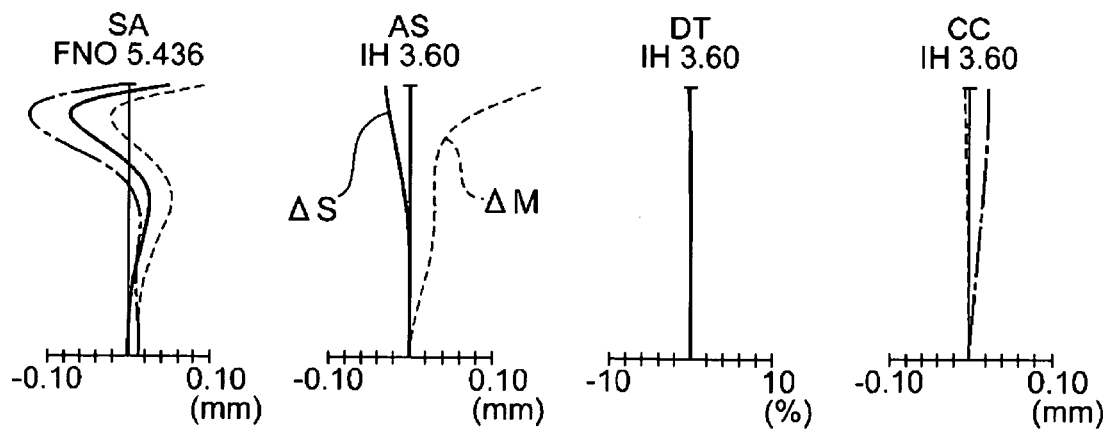

FIGS. 11A to 11C are sectional views along a plane including an optical axis in Example 6. FIG. 11A shows a state in the wide-angle end, FIG. 11B shows a state in the intermediate focal length, and FIG. 11C shows a state in the telephoto end, respectively. FIGS. 12A to 12C are aberration diagrams showing spherical aberration SA, astigmatism AS, distortion DT, and chromatic aberration CC of magnification at a time when optical system is focused on an infinite object in Example 6. FIG. 12A shows a state in the wide-angle end, FIG. 12B shows a state in the intermediate focal length, and FIG. 12C shows a state in the telephoto end.

As shown in FIGS. 11A to 11C, the image taking optical system of Example 6 includes: a first lens unit G1 having a negative refractive power; an aperture stop S; a second lens unit G2 having a positive refractive power; a third lens unit G3 having a negative refractive power; a filter LPF such as an optical low pass filter; and cover glass CG of an electronic image sensor such as a CCD. In the drawings, I denotes an image receiving surface (image forming surface of the image taking optical system) of the CCD.

The first lens unit G1 includes: a double-concave negative lens L11; and a double-convex positive lens L12 whose image-side surface is an aspherical surface. The second lens unit G2 includes, in order from the object side, a cemented lens of: a double-convex positive lens L21 whose object-side surface is an aspherical surface; a double-concave negative lens L22; and a positive lens L23 whose image-side surface is an aspherical surface and which has a double-convex shape in the vicinity of the optical axis. The third lens unit G3 includes an only negative meniscus lens L31 whose object-side surface is an aspherical surface and which directs its convex surface on the image side. It is to be noted that the aspherical surface of the positive lens L23 of the second lens unit G2 is formed so that a divergent function is intensified ranging from the center to the peripheral portion of the lens.

When zooming is performed from the wide-angle end to the telephoto end, along the optical axis Lc, the first lens unit G1 once moves toward the image side, and thereafter moves toward the object side, the second lens unit G2 moves so as to come close to the first lens unit G1, and the third lens unit G3 moves toward the object side.

Next, there will be described numerical data of the lenses constituting the image taking optical system of Example 6.

TABLE 16

| Surface number | RDY | THI | Nd | Vd |
|---|---|---|---|---|
| 1 | −33.263 | 1.000 | 1.88300 | 40.76 |
| 2 | 5.599 | 1.045 | | |
| 3 | 14.498 | 1.900 | 1.79491 | 25.63 |
| 4* | −33.379 | D1 | | |
| 5 (Aperture stop) | ∞ | 0.000 | | |
| 6* | 4.252 | 2.300 | 1.58913 | 61.14 |
| 7 | −11.529 | 0.700 | 1.90366 | 31.31 |
| 8 | 19.276 | 2.400 | 1.49700 | 81.54 |
| 9* | −17.629 | D2 | | |
| 10* | −11.470 | 1.000 | 1.69350 | 53.21 |
| 11 | −27.549 | D3 | | |
| 12 | ∞ | 0.860 | 1.53996 | 59.45 |
| 13 | ∞ | 0.270 | | |
| 14 | ∞ | 0.500 | 1.51633 | 64.14 |
| 15 | ∞ | 0.680 | | |
| 16 (Image forming surface) | ∞ | | | |

*: Aspherical surface

TABLE 17

Aspherical Coefficients

| Surface number | RDY | K | A4 | A6 | A8 | A10 |
|---|---|---|---|---|---|---|
| 4 | −33.379 | 0.0000 | −4.9940e−4 | −2.5928e−5 | 1.7005e−6 | −1.0924e−7 |
| 6 | 4.252 | 0.0000 | −2.9274e−4 | 9.8595e−6 | 5.8581e−7 | 0 |
| 9 | −17.629 | 0.0000 | 3.4083e−3 | 3.1904e−4 | −3.6228e−5 | 7.8849e−6 |
| 10 | −11.470 | −9.0000 | −8.7688e−4 | 1.2335e−4 | −3.0872e−5 | 2.5343e−6 |

TABLE 18

Zoom Data

| | Wide-angle end | Intermediate focal length | Telephoto end |
|---|---|---|---|
| F | 6.421 | 10.981 | 18.472 |
| Fno | 3.069 | 4.032 | 5.436 |
| 2ω(°) | 64.4 | 37.2 | 22.1 |
| D1 | 10.672 | 4.621 | 0.610 |
| D2 | 5.505 | 5.064 | 6.622 |
| D3 | 1.936 | 5.938 | 9.405 |

EXAMPLE 7

Figure 13A:
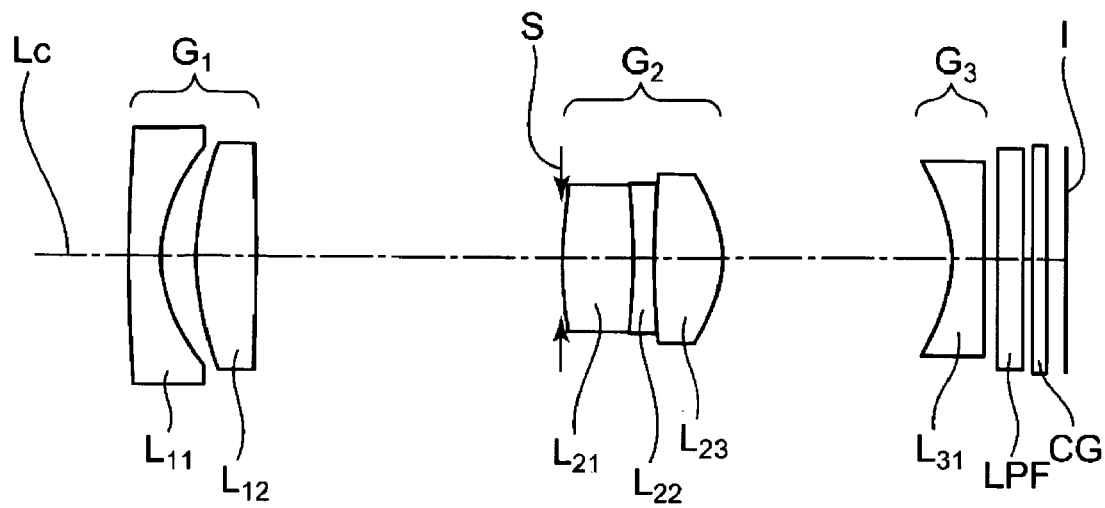
FIGS. 13A to 13C are sectional views along a plane including an optical axis in Example 7 of the present invention.
Figure 13B:
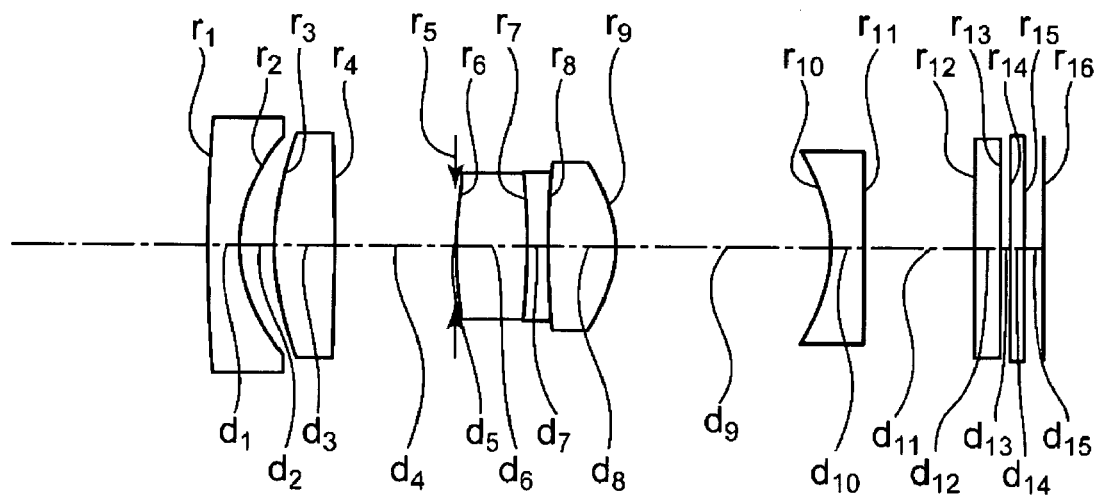
Figure 13C:
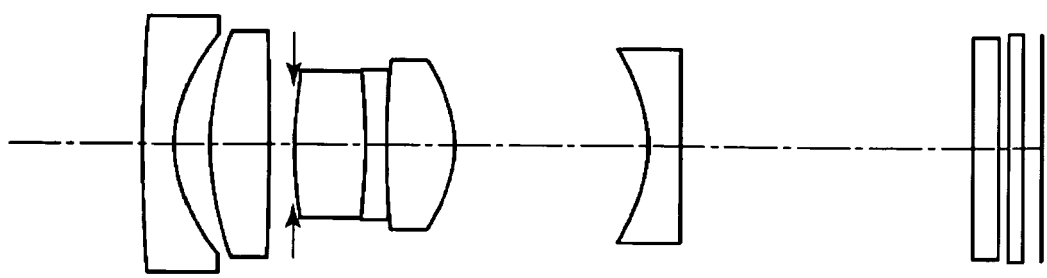
Figure 14A:
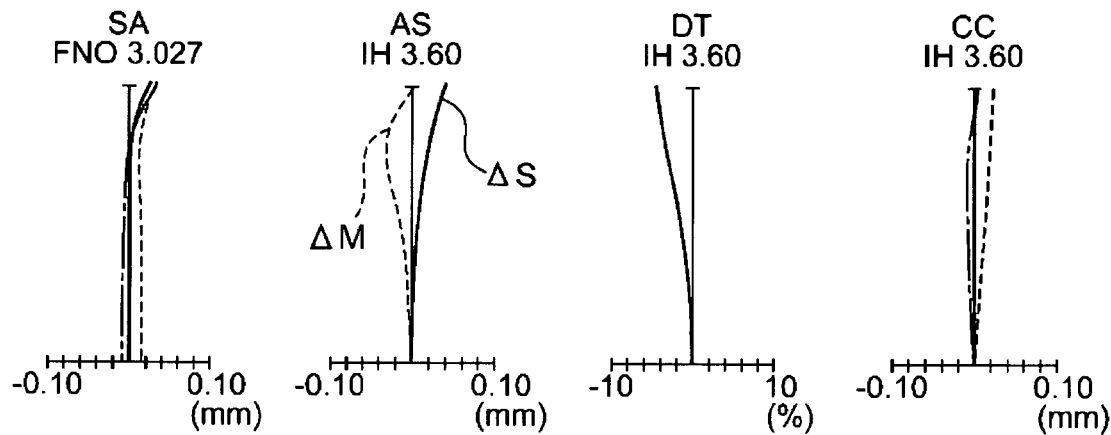
FIGS. 14A to 14C are aberration diagrams of Example 7.
Figure 14B:
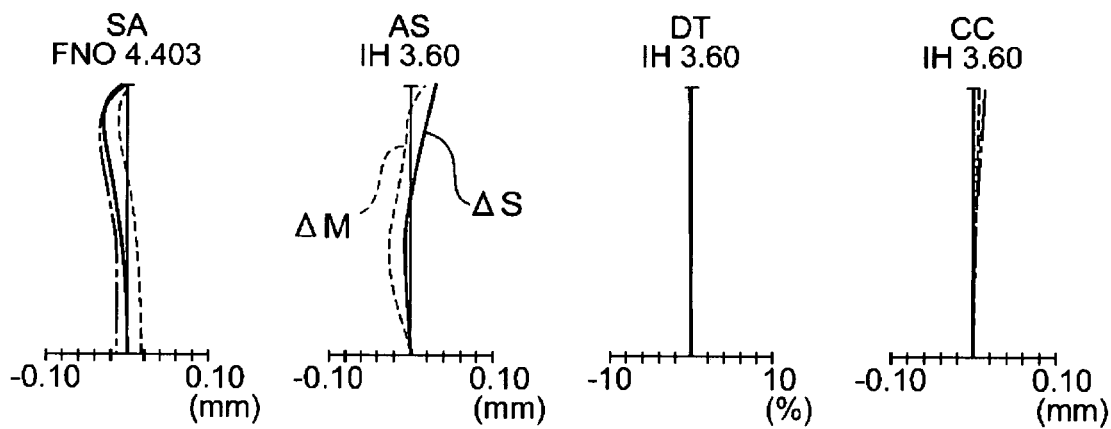
Figure 14C:
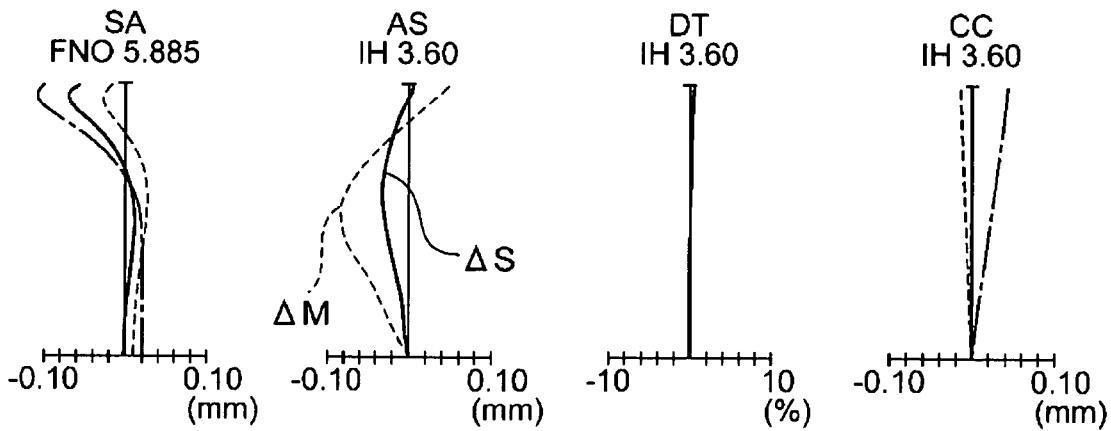

FIGS. 13A to 13C are sectional views along a plane including an optical axis in Example 7. FIG. 13A shows a state in the wide-angle end, FIG. 13B shows a state in the intermediate focal length, and FIG. 13C shows a state in the telephoto end, respectively. FIGS. 14A to 14C are aberration diagrams showing spherical aberration SA, astigmatism AS, distortion DT, and chromatic aberration CC of magnification at a time when optical system is focused on an infinite object in Example 7. FIG. 14A shows a state in the wide-angle end, FIG. 14B shows a state in the intermediate focal length, and FIG. 14C shows a state in the telephoto end.

As shown in FIGS. 13A to 13C, the image taking optical system of Example 7 includes: a first lens unit G1 having a negative refractive power; an aperture stop S; a second lens unit G2 having a positive refractive power; a third lens unit G3 having a negative refractive power; a filter LPF such as an optical low pass filter; and cover glass CG of an electronic image sensor such as a CCD. In the drawings, I denotes an image receiving surface (image forming surface of the image taking optical system) of the CCD.

The first lens unit G1 includes: a negative meniscus lens L11 which directs its convex surface on the object side; and a positive meniscus lens L12 whose image-side surface is an aspherical surface and which directs its convex surface on the object side. The second lens unit G2 includes, in order from the object side, a cemented lens of: a double-convex positive lens L21 having an aspherical surface on the object side; a double-concave negative lens L22; and a double-convex positive lens L23 having an aspherical surface on the image side. The third lens unit G3 includes an only double-concave negative lens L31 whose object-side surface is an aspherical surface.

When zooming is performed from the wide-angle end to the telephoto end, along the optical axis Lc, the first lens unit G1 once moves toward the image side, and thereafter moves toward the object side, the second lens unit G2 moves so as to come close to the first lens unit G1, and the third lens unit G3 moves toward the object side.

Next, there will be described numerical data of the lenses constituting the image taking optical system of Example 7.

TABLE 19

| Surface number | RDY | THI | Nd | Vd |
|---|---|---|---|---|
| 1 | 40.542 | 1.000 | 1.88300 | 40.76 |
| 2 | 4.735 | 1.204 | | |
| 3 | 9.223 | 1.900 | 1.79491 | 25.63 |
| 4* | 68.819 | D1 | | |
| 5 (Aperture stop) | ∞ | 0.000 | | |
| 6* | 10.713 | 2.300 | 1.60738 | 56.81 |
| 7 | −18.391 | 0.700 | 1.80518 | 25.42 |
| 8 | 28.012 | 2.263 | 1.49700 | 81.54 |
| 9* | −4.673 | D2 | | |
| 10* | −5.423 | 1.000 | 1.51633 | 64.14 |
| 11 | 471.117 | D3 | | |
| 12 | ∞ | 0.860 | 1.53996 | 59.45 |
| 13 | ∞ | 0.270 | | |
| 14 | ∞ | 0.500 | 1.51633 | 64.14 |
| 15 | ∞ | 0.680 | | |
| 16 (Image forming surface) | ∞ | | | |

*: Aspherical surface

TABLE 20

Aspherical Coefficients

| Surface number | RDY | K | A4 | A6 | A8 | A10 |
|---|---|---|---|---|---|---|
| 4 | 68.819 | 0.0000 | −6.4913e−4 | −1.9359e−5 | 3.0300e−7 | −6.0365e−8 |
| 6 | 10.713 | 0.0000 | −1.8351e−3 | −4.6465e−5 | −9.0296e−6 | 0 |
| 9 | −4.673 | 0.0000 | 3.1401e−4 | 9.6298e−6 | −6.4092e−6 | 4.6545e−7 |
| 10 | −5.423 | −12.3438 | −9.5794e−3 | 1.0572e−3 | −1.0738e−4 | 3.8669e−6 |

TABLE 21

Zoom Data

| | Wide-angle end | Intermediate focal length | Telephoto end |
|---|---|---|---|
| F | 6.378 | 10.937 | 18.684 |
| Fno | 3.027 | 4.043 | 5.885 |
| 2ω(°) | 61.5 | 36.5 | 21.7 |
| D1 | 9.870 | 3.902 | 0.725 |
| D2 | 7.294 | 6.919 | 6.287 |
| D3 | 0.463 | 3.559 | 9.344 |

EXAMPLE 8

Figure 15A:
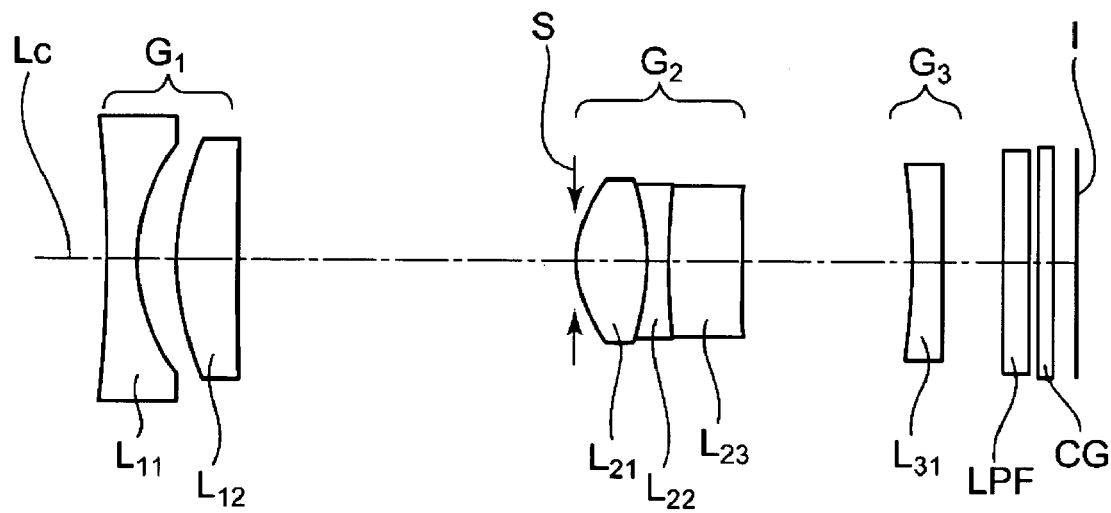
FIGS. 15A to 15C are sectional views along a plane including an optical axis in Example 8 of the present invention.
Figure 15B:
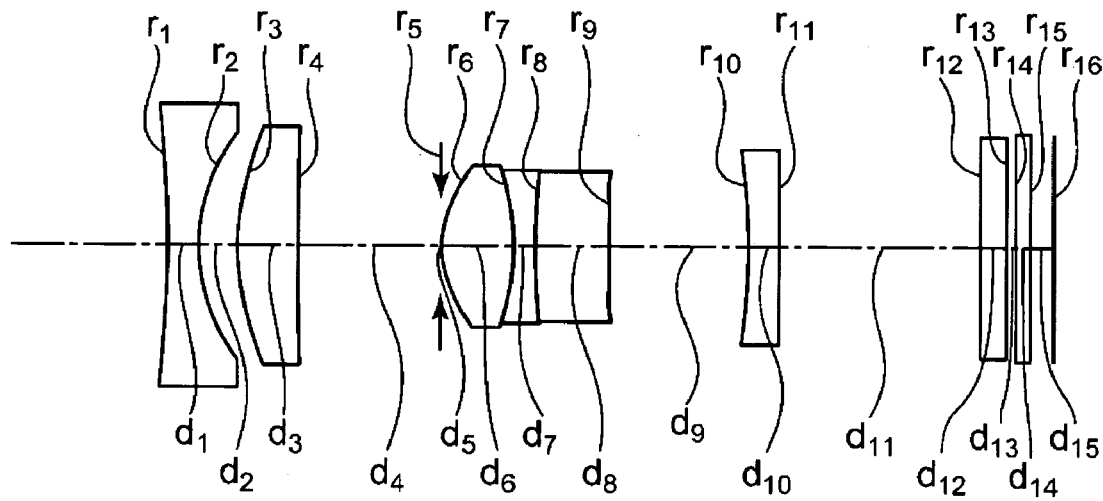
Figure 15C:
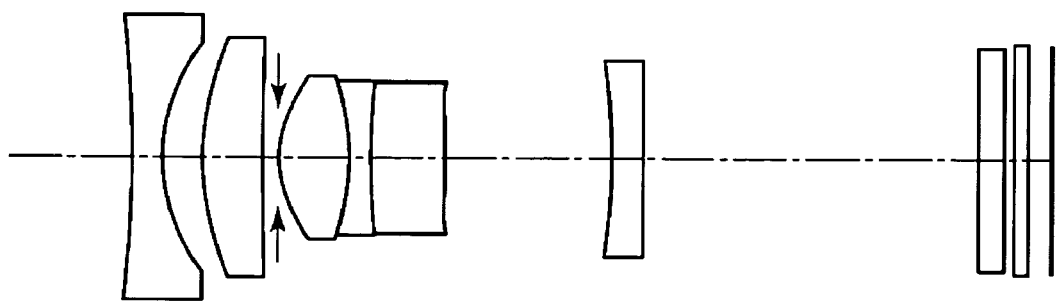
Figure 16A:
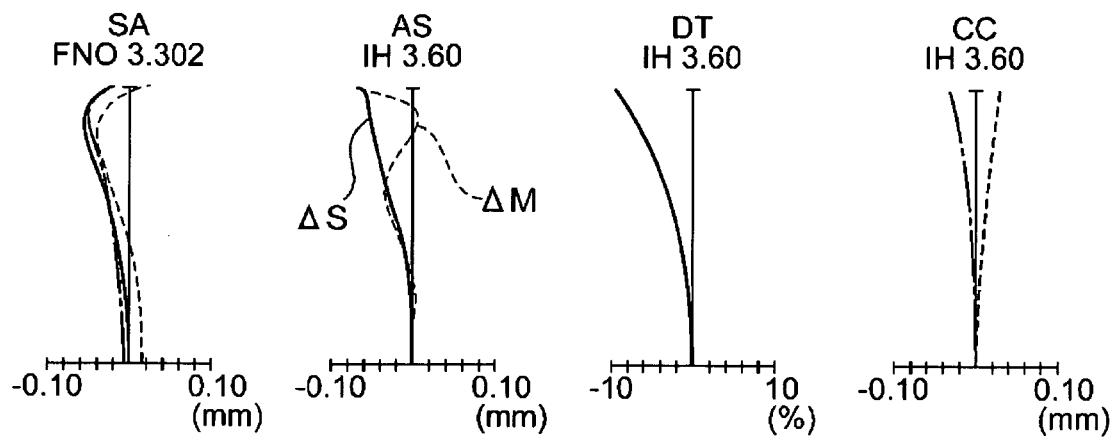
FIGS. 16A to 16C are aberration diagrams of Example 8.
Figure 16B:
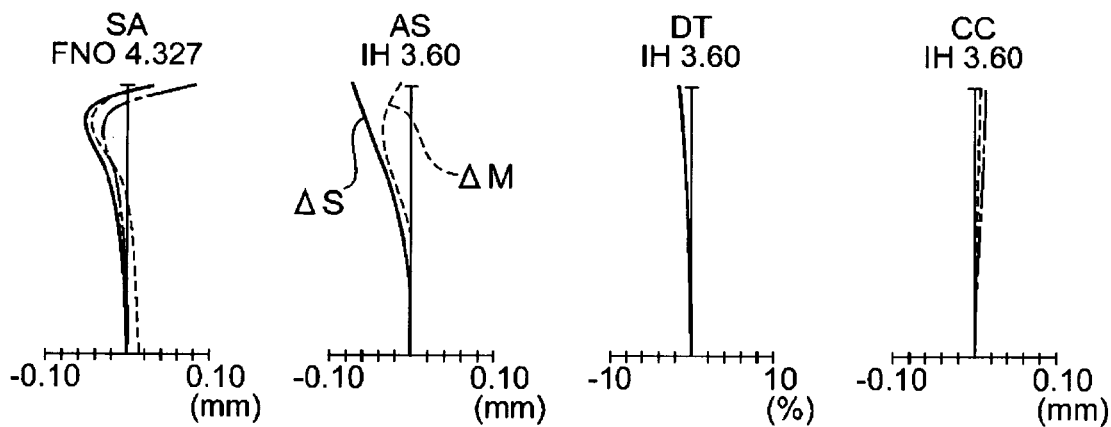
Figure 16C:
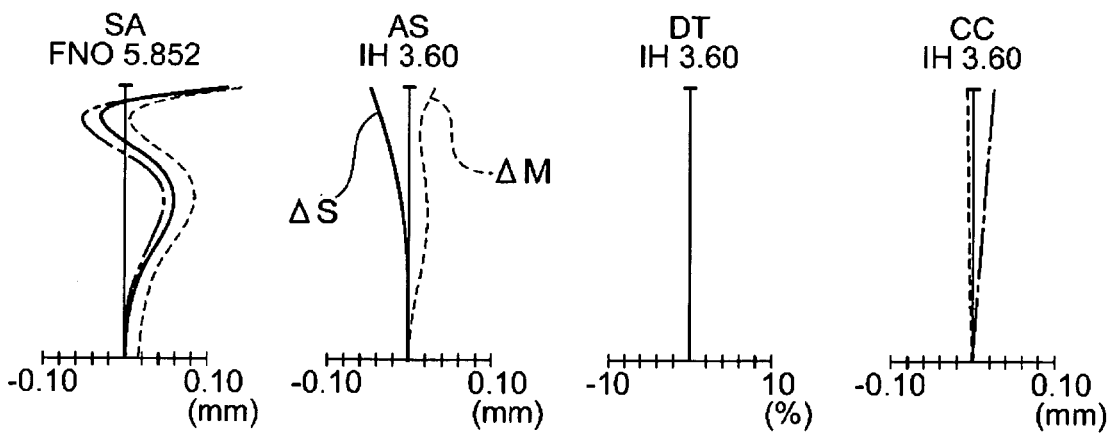

FIGS. 15A to 15C are sectional views along a plane including an optical axis in Example 8. FIG. 15A shows a state in the wide-angle end, FIG. 15B shows a state in the intermediate focal length, and FIG. 15C shows a state in the telephoto end, respectively. FIGS. 16A to 16C are aberration diagrams showing spherical aberration SA, astigmatism AS, distortion DT, and chromatic aberration CC of magnification at a time when optical system is focused on an infinite object in Example 6. FIG. 16A shows a state in the wide-angle end, FIG. 16B shows a state in the intermediate focal length, and FIG. 16C shows a state in the telephoto end.

As shown in FIGS. 15A to 15C, the image taking optical system of Example 8 includes: a first lens unit G1 having a negative refractive power; an aperture stop S; a second lens unit G2 having a positive refractive power; a third lens unit G3 having a negative refractive power; a filter LPF such as an optical low pass filter; and cover glass CG of an electronic image sensor such as a CCD. In the drawings, I denotes an image receiving surface (image forming surface of the image taking optical system) of the CCD.

The first lens unit G1 includes: a double-concave negative lens L11 having an aspherical surface on an image side; and a positive meniscus lens L12 which directs its convex surface on an object side. The second lens unit G2 includes, in order from the object side, a cemented lens of: a double-convex positive lens L21 whose object-side surface is an aspherical surface; a double-concave negative lens L22; and a positive lens L23 having an aspherical surface on the image side and having a double-convex shape in the vicinity of the optical axis. The third lens unit G3 includes an only negative meniscus lens L31 whose object-side surface is an aspherical surface and which directs its concave surface on the image side. It is to be noted that the aspherical surface of the positive lens L23 of the second lens unit G2 is formed so as to intensify a divergent function ranging from the center to the peripheral portion of the lens.

In the picture taking optical system of the present embodiment constituted as described above, when zooming is performed from the wide-angle end to the telephoto end, along the optical axis Lc, the first lens unit G1 once moves toward the image side, and thereafter moves toward the object side, the second lens unit G2 moves so as to come close to the first lens unit G1, and the third lens unit G3 moves toward the object side.

Next, there will be described numerical data of the lenses constituting the image taking optical system of Example 8.

TABLE 22

| Surface number | RDY | THI | Nd | Vd |
|---|---|---|---|---|
| 1 | −32.124 | 1.000 | 1.80610 | 40.92 |
| 2* | 5.093 | 1.276 | | |
| 3 | 9.074 | 1.900 | 1.80518 | 25.42 |
| 4 | 101.120 | D1 | | |
| 5 (Aperture stop) | ∞ | 0.000 | | |
| 6* | 4.169 | 2.300 | 1.58913 | 61.14 |
| 7 | −8.891 | 0.700 | 1.90366 | 31.31 |
| 8 | 25.399 | 2.400 | 1.49700 | 81.54 |
| 9* | −20.234 | D2 | | |
| 10* | −20.714 | 1.000 | 1.69350 | 53.21 |
| 11 | −128.281 | D3 | | |
| 12 | ∞ | 0.860 | 1.53996 | 59.45 |
| 13 | ∞ | 0.270 | | |
| 14 | ∞ | 0.500 | 1.51633 | 64.14 |
| 15 | ∞ | 0.690 | | |
| 16 (Image forming surface) | ∞ | | | |

*: Aspherical surface

TABLE 23

Aspherical Coefficients

| Surface Number | RDY | K | A4 | A6 | A8 | A10 |
|---|---|---|---|---|---|---|
| 2 | 5.093 | 0.0000 | −6.9963e−4 | −3.8289e−5 | 1.6845e−6 | −9.9045e−8 |
| 6 | 4.169 | 0.0000 | −1.8911e−4 | 2.5782e−5 | −2.6040e−7 | 0 |
| 9 | −20.234 | 0.0000 | 3.7473e−3 | 3.9515e−4 | −5.7133e−5 | 1.3231e−5 |
| 10 | −20.714 | −8.6949 | −2.3460e−4 | 7.2885e−5 | −1.8393e−5 | 1.7472e−6 |

TABLE 24

Zoom Data

| | Wide-angle end | Intermediate focal length | Telephoto end |
|---|---|---|---|
| F | 6.421 | 10.973 | 18.471 |
| Fno | 3.302 | 4.327 | 5.852 |
| 2ω(°) | 63.8 | 37.0 | 22.1 |
| D1 | 10.803 | 4.592 | 0.550 |
| D2 | 5.397 | 4.411 | 5.324 |
| D3 | 1.987 | 6.555 | 10.921 |

In another aspect of the present invention, there may be provided an image taking apparatus comprising: a zoom lens system including a movable lens unit on whose image side a positive lens and an image sensor unit are disposed in order from an object side, wherein the positive lens and the image sensor unit are brought into a sealed structure via a member constituting the image taking apparatus, and a lens unit having a negative refractive power is disposed on the object side of the positive lens with an air space between the lens unit and the positive lens.

Since the positive lens and the image sensor unit are brought into the sealed structure, a foreign matter such as dust is prevented from being attached to an image sensor, and an image quality can be prevented from being degraded by the dust reflected in the image sensor. In addition, since the lens unit having the negative refractive power is disposed just on the object side of the positive lens, a height of a ray emitted from a negative lens unit to the object side can be reduced. As a result, it is possible to reduce an outer diameter of an optical system.

Here, the "sealed structure" means a structure in which any foreign matter having a size of about $\phi 0.02$ (mm) or more does not enter the optical system between the positive lens and the image sensor unit. This sealed structure may be formed by one member constituting the image taking apparatus, or by a plurality of combined members.

In an embodiment of the present invention, the positive lens preferably has a function of an optical low pass filter and/or a function of an infrared cut filter.

According to such constitution, it is possible to omit the low pass filter or the infrared cut filter disposed right before the image sensor, and miniaturization of the image taking apparatus can be realized. Rays allowed to diverge from a negative lens unit is focused on the positive lens, and it is possible to reduce an incidence angle of the ray with respect to a normal to an image forming surface in a case where the ray falls on the image forming surface. Therefore, an influence of shading can be reduced.

In the embodiment of the present invention, the lens unit having the negative refractive power preferably satisfies the following condition (14):

$$0.6 \leq DL/IH \leq 1.5 \tag{14},$$

wherein DL denotes a length between an object-side surface of the field lens and the image forming surface, and IH denotes a maximum image height. The height can be represented by IH=tanω×FL in the wide-angle end of the zoom lens system by use of the before-mentioned symbols.

The condition (14) defines a length between the object-side surface of the positive lens disposed on the object side of the image sensor unit and the image forming surface. Above the upper limit of the condition (14), the whole length of the optical system increases, and the apparatus is unfavorably enlarged. Below the lower limit of the condition (14), a foreign matter is unfavorably reflected in the image sensor in a case where a foreign matter such as dust sticks to the object-side surface of the positive lens disposed on the object side of the image sensor unit.

The lens unit having the negative refractive power is preferably included in the movable lens unit.

When the lens unit having the negative refractive power is constituted to be movable, a zooming effect can be improved, and an aberration, especially astigmatism can be satisfactorily corrected by the negative lens unit and the positive lens in each zoom state.

Moreover, the positive lens preferably satisfies the following condition (15):

$$-3.7 \leq (R1+R2)/(R1-R2) \leq -0.3 \tag{15},$$

wherein R1 denotes a radius of curvature of the object-side surface of the positive lens, and R2 denotes a radius of curvature of the image-side surface of the positive lens.

The condition (15) defines a lens shape of the positive lens. Above the upper limit of the condition (15), an incidence angle difference increases owing to an image height difference between the rays falling on the image side surface of the positive lens. Therefore, in a case where the image side surface of the positive lens is coated with a wavelength band restricting coating such as an IR cut coating, a uniform wavelength cut characteristic cannot be obtained in the whole image forming surface. Below the lower limit of the condition (15), a curvature of the object-side surface of the positive lens becomes excessively intense, and it is therefore difficult to correct miscellaneous aberrations with the positive lens alone. The incidence angle upon the image forming surface cannot be sufficiently reduced, the influence of shading is easily produced, and it becomes difficult to secure a performance.

It is to be noted that in a case where the condition (15) is modified as follows, and satisfied, the performance can be held more satisfactorily:

$$-1.5 \leq (R1+R2)/(R1-R2) \leq -0.7 \tag{15'}.$$

The movable lens unit includes in order from the object side, a first lens unit having a negative refractive power, a second lens unit having a positive refractive power, and a third lens unit having a negative refractive power, and the positive lens is preferably disposed on the image side of the third lens unit with the air space between the positive lens and the lens unit.

Such three-unit type is generally considered to be advantageous for realizing the miniaturization. Since the negative lens unit is disposed right on the object side of the positive lens, the ray is gradually bent by the negative, positive, negative, and positive refractive powers arranged in this order. Therefore, it is possible to reduce variances in a marginal ray angle in each lens unit, and it is possible to realize the miniaturization in the outer diameter of the optical system.

Moreover, an outer shape of the above-described positive lens is preferably rectangular. The positive lens disposed in the vicinity of the image sensor unit can be formed into such shape to thereby easily form the positive lens and the image sensor unit into the sealed structure.

Furthermore, this positive lens is preferably made of plastic. Cost and weight can be reduced using the plastic lens. Since plastic has a larger degree of freedom in molding than glass, plastic can be formed into a desired shape if necessary, and a degree of freedom in design can be increased.

Furthermore, in a case where the positive lens is made of plastic, the image taking apparatus is preferably provided with an aperture stop, and the aperture stop, the positive lens, and the image sensor unit are preferably integrally attached to members constituting the image taking apparatus.

According to such constitution, dust can be prevented from being introduced into the vicinity of the image forming surface. Moreover, in a case where shaky hand movement is generated, an integrated part is simultaneously vibrated, and it is possible to easily correct and prevent the shaky hand movement by the image sensor. Since the integrated part can be simultaneously moved in an optical-axis direction, focusing can be easily performed.

In addition, when the positive lens is made of plastic, a planar contact portion capable of contacting a field stop is preferably formed in a lens peripheral portion of the positive lens. Since such contact portion is disposed in the lens peripheral portion of the plastic lens having a large degree of freedom in molding, it is possible to dispose the field stop easily.

Moreover, at least a part of the positive lens is preferably brought into contact with at least a part of the image sensor unit. According to such constitution, the sealed structure can be easily formed, and sealability can further be improved.

Furthermore, when the positive lens is made of plastic, a contact surface is preferably formed in an outer region of an effective diameter of the positive lens, and the positive lens preferably comes into contact with the image sensor unit via the contact surface.

In a case where the plastic lens having a large degree of freedom in molding is provided with the contact surface which comes into contact with the image sensor unit, the cost and the weight can be reduced. In addition, the sealed structure can be formed easily, and the sealability can further be improved.

Moreover, the image-side surface of the positive lens is preferably coated with the wavelength band restricting coating. As the wavelength band restricting coating, there is usable, for example, a film having a function of restricting a wavelength band or the like.

According to such constitution, the wavelength band can be restricted as desired without attaching any foreign matter such as the dust to the wavelength band restricting coating.

Furthermore, the positive lens is preferably a plano-convex positive lens which directs its convex surface on the object side.

In a case where the plano-convex positive lens whose image-side surface has a planar shape is used in the positive lens, the image-side surface of the positive lens can be easily coated with a wavelength band restricting coating such as the IR cut coating. The ray easily falls on the image-side surface of the positive lens, that is, the surface coated with the IR cut coating at an angle which is substantially parallel to an optical axis, and it is possible to obtain a uniform wavelength cut characteristic in the whole image forming surface.

Furthermore, in a case where the movable lens unit includes three lens units, and the positive lens is disposed on the image side of the third lens unit with the air space between the positive lens and the lens unit, when zooming is performed from a wide-angle end to a telephoto end, the second lens unit preferably moves toward the object side so as to decrease a space between the first lens unit and the second lens unit. The third lens unit moves so as to change a space between the second lens unit and the third lens unit. The lenses constituting the first lens unit include only one negative lens, that is, among the lens or lenses included in the first lens unit, there exists only one lens that has a negative refractive power. The second lens unit has at least one positive lens and at least one negative lens.

As described above, when the second lens unit is moved toward the object side so that the space between the first lens unit and the second lens unit decreases in a case where the zooming is performed from the wide-angle end to the telephoto end, an incident ray height is reduced while reducing the whole length of the optical system. The incidence angle of the ray falling on the image forming surface with respect to the normal to the image forming surface is reduced, and it is possible to reduce the influence of the shading by the electronic image sensor in a case where the image sensor is used. Since the third lens unit having the negative power is disposed with a space from the second lens unit, and constituted to be movable with respect to the second lens unit during the zooming, the third lens unit can be provided with a zooming function. Accordingly, even when a zooming ratio in excess of 2.5 is secured, it is possible to reduce the outer diameter of the first lens unit while reducing the whole length of the optical system. Furthermore, a half field angle in the wide-angle end can be enlarged. Especially, when the above condition (12) is satisfied, the half field angle in the wide-angle end can be set to 28° or more.

Moreover, preferably in the image taking optical system including the movable lens unit and the positive lens, when the zooming is performed from the wide-angle end to the telephoto end, the second lens unit moves toward the object side so that the space between the first lens unit and the second lens unit decreases, and the third lens unit moves so that the space between the second lens unit and the third lens unit changes. Among the lens or lenses included in the first lens unit, there is only one lens that has a negative refractive power, and the second lens unit preferably has at least one positive lens and at least one negative lens. Furthermore, the following conditions (1a), (2a), and (3) are preferably satisfied:

$$4.0 \leq W\_L/IH \leq 12.0 \tag{1a}$$

$$1.7 \leq |\Delta D12|/IH \leq 4.6 \tag{2a; and}$$

$$52.0 \leq PAVd \tag{3},$$

wherein W_L denotes the whole length of the image taking optical system in the wide-angle end, IH denotes a maximum image height, $\Delta D12$ denotes a change amount of the space between the first lens unit and the second lens unit during the zooming from the wide-angle end to the telephoto end, and PAVd denotes the Abbe number of the positive lens of the second lens unit. Since a relation of IH=tanω×FL is established in the wide-angle end as described above, the conditions (1a) and (2a) mean that the above conditions (1) and (2) should be satisfied in the wide-angle end. Since the conditions (1a) and (2a) have technical meanings similar to those of the conditions (1) and (2), description thereof is not repeated here. The condition (3) has been described above.

It is to be noted that when the above conditions (1a) and (2a) are modified as follows, and satisfied, the above-described effect can further be improved:

$$5.5 \leq W\_L/IH \leq 10.5 \qquad (1a'); \text{ and}$$

$$2.2 \leq |\Delta D12|/IH \leq 4.6 \qquad (2a').$$

Moreover, in a case where the movable lens unit include three lens units, and the positive lens is disposed on the image side of the third lens unit via the air space, the following condition (4a) is preferably satisfied:

$$0.45 \leq D23W/IH \leq 3.0 \qquad (4a),$$

wherein D23W denotes a space between the second lens unit and the third lens unit in the wide-angle end and IH denotes the maximum image height.

The condition (4a) has a meaning similar to that of the above-described condition (4).

It is to be noted that when the above condition (4a) is modified as follows, and satisfied, the above-described effect can further be improved:

$$0.7 \leq D23W/IH \leq 2.5 \qquad (4a').$$

Moreover, when the movable lens unit includes three lens units, and the positive lens is disposed on the image side of the third lens unit via the air space, the following condition (5a) is preferably satisfied:

$$0.38 \leq (f2/fw) \times (IH/fw) \leq 0.95 \qquad (5a),$$

wherein f2 denotes a focal length of the second lens unit, fw denotes a focal length of the whole optical system in the wide-angle end and IH denotes the maximum image height.

The condition (5a) has a meaning similar to that of the above-described condition (5).

It is to be noted that when the above condition (5a) is modified as follows, and satisfied, the above-described effect can further be improved:

$$0.45 \leq (f2/fw) \times (IH/fw) \leq 0.85 \qquad (5a').$$

Furthermore, when the movable lens unit includes three lens units, and the positive lens is disposed on the image side of the third lens unit via the air space, the following condition (6a) is preferably satisfied:

$$2.7 \leq W\_L/fw \leq 10.0 \qquad (6a),$$

wherein W_L denotes a length from a lens surface closest to the object side in the first lens unit to an image forming surface in the wide-angle end, and fw denotes the focal length of the whole optical system in the wide-angle end.

The condition (6a) has a meaning similar to that of the above-described condition (6).

In addition, when the movable lens unit includes three lens units, and the positive lens is disposed on the image side of the third lens unit via the air space, the following condition (7) is preferably satisfied:

$$3.7 \leq |\Delta D12/\Delta D23| \qquad (7).$$

Moreover, when the movable lens unit includes three lens units, and the positive lens is disposed on the image side of the third lens unit via the air space, the first lens unit is preferably constituted of two lenses including a negative lens and a positive lens in order from the object side, and satisfies the following condition (8a):

$$0.6 \leq G1\Sigma d/IH \leq 1.3 \qquad (8a),$$

wherein G1Σd denotes a total thickness of the first lens unit, and IH denotes the maximum image height.

A meaning of the condition (8a) is similar to that of the above-described condition (8).

Furthermore, when the movable lens unit includes three lens units, and the positive lens is disposed on the image side of the third lens unit via the air space, the second lens unit is preferably constituted of one negative lens and at least one positive lens, and additionally at least one of the positive lenses preferably satisfies the above-described condition (9):

$$75.0 \leq PVd \qquad (9).$$

In addition, when the movable lens unit includes three lens units, the positive lens is disposed on the image side of the third lens unit via the air space, and the second lens unit includes one negative lens and at least one positive lens satisfying the above condition (9), the following condition (10a) is preferably further satisfied:

$$45.0 \leq PVd-NVd \qquad (10a).$$

Moreover, in a case where the movable lens unit includes three lens units, and the positive lens is disposed on the image side of the third lens unit via the air space, the first lens unit preferably moves during the zooming so that the whole length of the optical system is minimized between the wide-angle end and the telephoto end.

Furthermore, in a case where the movable lens unit includes three lens units, and the positive lens is disposed on the image side of the third lens unit via the air space, the above-described condition (11-1) is preferably satisfied:

$$7.0\% \leq |DTW\_ \times 1.0| \qquad (11-1).$$

In addition, at this time, distortion of a taken image is corrected using electric processing after the image is taken, whereby a satisfactory image can be obtained. In this case, the above-described conditions (11-2), (11-3), and (11-4) are preferably satisfied:

$$3.5\% \leq |DTW\_ \times 0.7| \leq 15.0\% \qquad (11-2);$$

$$7.0\% \leq |DTW\_ \times 1.0| \leq 25.0\% \qquad (11-3); \text{ and}$$

$$|\Delta DTW| \leq 15.0\% \qquad (11-4).$$

Moreover, in a case where the movable lens unit includes three lens units, and the positive lens is disposed on the image side of the third lens unit via the air space, the third lens unit is preferably moved in an optical-axis direction to thereby perform focusing.

Since the third lens unit is of the above-described three-unit type, the diameter can be reduced, and miniaturization and lightening are possible. Therefore, when the third lens unit is moved to thereby perform the focusing, it also becomes easy to miniaturize a driving actuator, and a lens barrel can be miniaturized.

It is to be noted that when the above condition (4a) is satisfied at this time, a space between the second lens unit and the third lens unit can be appropriately secured, and it is possible to sufficiently secure an allowance for focusing movement which is required as a result of manufacturing fluctuations. When the above condition (7) is satisfied, aberration change due to the focusing can be suppressed, and a satisfactory performance can be secured even in the shortest object distance.

Furthermore, in a case where the movable lens unit includes three lens units, and the positive lens is disposed on the image side of the third lens unit via the air space, preferably in order from the object side, the first lens unit is constituted of two lenses including negative and positive lenses, the second lens unit is constituted of three lenses including positive, negative, and positive lenses, or positive, negative, and negative lenses, and the third lens unit is constituted of one negative lens.

According to such constitution, a total thickness of the each lens units can be reduced, and a more satisfactory performance can be secured while further reducing the whole length of the lens barrel when collapsed. When aspherical surfaces are used in the surface closest to the object side and the surface closest to the image side in the second lens unit, the second lens unit can be constituted of two lenses including positive and negative lenses in order from the object side. In consequence, it is possible to further reduce the whole length of the lens barrel when collapsed.

EXAMPLE 9

Figure 17A:
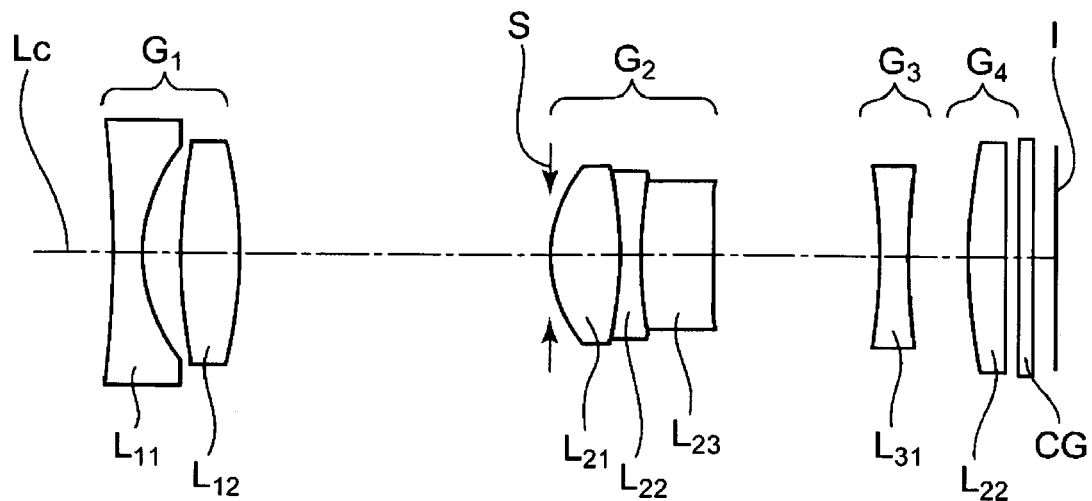
FIGS. 17A to 17C are sectional views along a plane including an optical axis in Example 9 of the present invention.
Figure 17B:
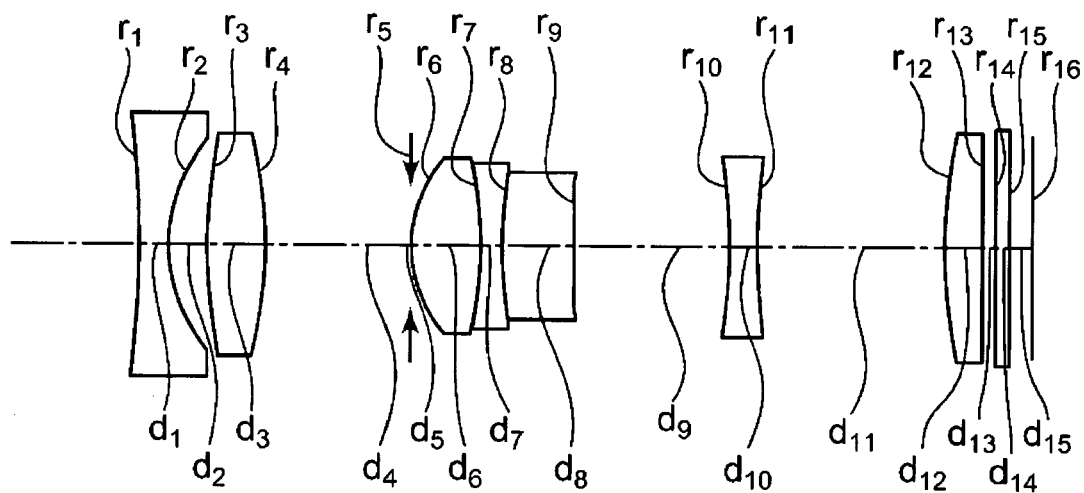
Figure 17C:
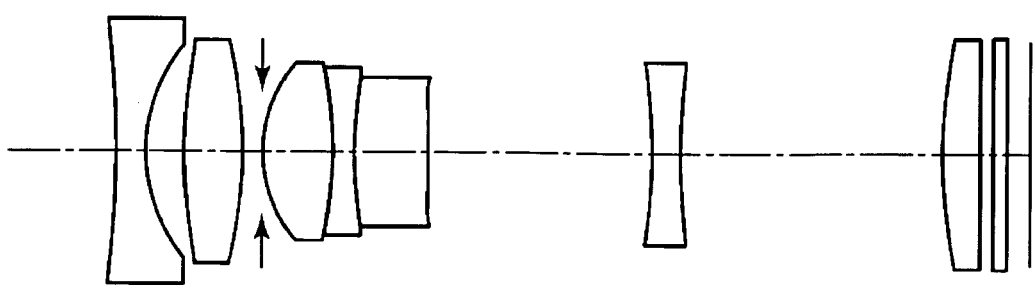

FIGS. 17A to 17C are sectional views along a plane including an optical axis in Example 9. FIG. 17A shows a state in the wide-angle end, FIG. 17B shows a state in the intermediate focal length, and FIG. 17C shows a state in the telephoto end, respectively. FIGS. 18A to 18C are aberration diagrams showing spherical aberration SA, astigmatism AS, distortion DT, and chromatic aberration CC of magnification at a time when optical system is focused on an infinite object in Example 9. FIG. 18A shows a state in the wide-angle end, FIG. 18B shows a state in the intermediate focal length, and FIG. 18C shows a state in the telephoto end.

The image taking optical system of Example 9 includes a movable lens unit, and a positive lens disposed on an image side of the movable lens unit. As shown in FIGS. 17A to 17C, the movable lens unit includes: a first lens unit G1 having a negative refractive power; an aperture stop S; a second lens unit G2 having a positive refractive power; and a third lens unit G3 having a negative refractive power. On the image side of the movable lens unit, there are arranged: a fourth lens unit G4 having a positive refractive power; and cover glass CG of an electronic image sensor such as a CCD. In the drawings, I denotes an image receiving surface (image forming surface of the image taking optical system) of the CCD.

Figure 19:
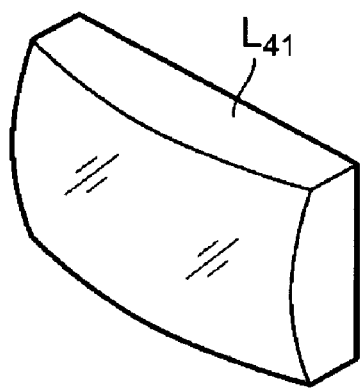
FIG. 19 is a perspective view showing a shape of a positive lens in Example 9.

The first lens unit G1 includes: a double-concave negative lens L11; and a double-convex positive lens L12 whose image-side surface is an aspherical surface. The second lens unit G2 includes, in order from the object side, a cemented lens of: a double-convex positive lens L21 whose object-side surface is an aspherical surface; a double-concave negative lens L22; and a positive lens L23 whose image-side surface is an aspherical surface and which has a double-convex shape in the vicinity of the optical axis. The third lens unit G3 includes an only double-concave negative lens L31 whose object-side surface is an aspherical surface. The fourth lens unit G4 includes an only plano-convex lens L41 which directs its convex surface on the object side. It is to be noted that the plano-convex lens L41 for use in the present example is a lens molded of plastic. This plano-convex lens L41 functions as a field lens. As shown in FIG. 19, the plano-convex lens L41 has a rectangular outer shape, and the image-side surface of the lens is coated with a conventional infrared cut coating in order to restrict a wavelength band.

When zooming is performed from the wide-angle end to the telephoto end, along the optical axis Lc, the first lens unit G1 once moves toward the image side, and thereafter moves toward the object side, the second lens unit G2 moves so as to come close to the first lens unit G1, and the third lens unit G3 moves toward the object side.

Next, there will be described numerical data of the lenses constituting the image taking optical system of Example 9.

TABLE 25

| Surface number | RDY | THI | Nd | Vd |
|---|---|---|---|---|
| 1 | −47.518 | 1.000 | 1.88300 | 40.76 |
| 2* | 5.169 | 1.376 | | |
| 3 | 23.251 | 1.900 | 1.79491 | 25.63 |
| 4* | −20.455 | D1 | | |
| 5 (Aperture stop) | ∞ | 0.000 | | |
| 6* | 4.172 | 2.300 | 1.58913 | 61.14 |
| 7 | −13.092 | 0.700 | 1.90366 | 31.31 |
| 8 | 13.883 | 2.400 | 1.49700 | 81.54 |
| 9* | −17.320 | D2 | | |
| 10* | −24.216 | 1.000 | 1.69350 | 53.21 |
| 11 | 26.122 | D3 | | |
| 12 | 20.000 | 1.200 | 1.52542 | 55.78 |
| 13 | ∞ | 0.400 | | |
| 14 | ∞ | 0.500 | 1.51633 | 64.14 |
| 15 | ∞ | 0.700 | | |
| 16 (Image forming surface) | ∞ | | | |

*: Aspherical surface

TABLE 26

Aspherical Coefficients

| Surface Number | RDY | K | A4 | A6 | A8 | A10 |
|---|---|---|---|---|---|---|
| 4 | −20.455 | 0.0000 | −5.6343e−4 | −3.2087e−5 | 2.2662e−6 | −1.4938e−7 |
| 6 | 4.172 | 0.0000 | −3.0725e−4 | 5.3126e−6 | 5.8987e−7 | 0 |
| 0 | −17.320 | 0.0000 | 3.6809e−3 | 4.1838e−4 | −6.7426e−5 | 1.2679e−5 |
| 10 | −24.216 | −9.3274 | −1.9976e−4 | 3.4609e−5 | −1.4306e−5 | 1.5505e−6 |

TABLE 27

Zoom Data

| | Wide-angle end | Intermediate focal length | Telephoto end |
|---|---|---|---|
| F | 6.388 | 11.022 | 18.400 |
| Fno | 3.160 | 4.326 | 5.800 |
| 2ω(°) | 63.1 | 36.5 | 21.9 |
| D1 | 10.078 | 4.714 | 0.612 |
| D2 | 5.349 | 5.022 | 7.310 |
| D3 | 1.946 | 6.164 | 8.572 |

Figure 20:
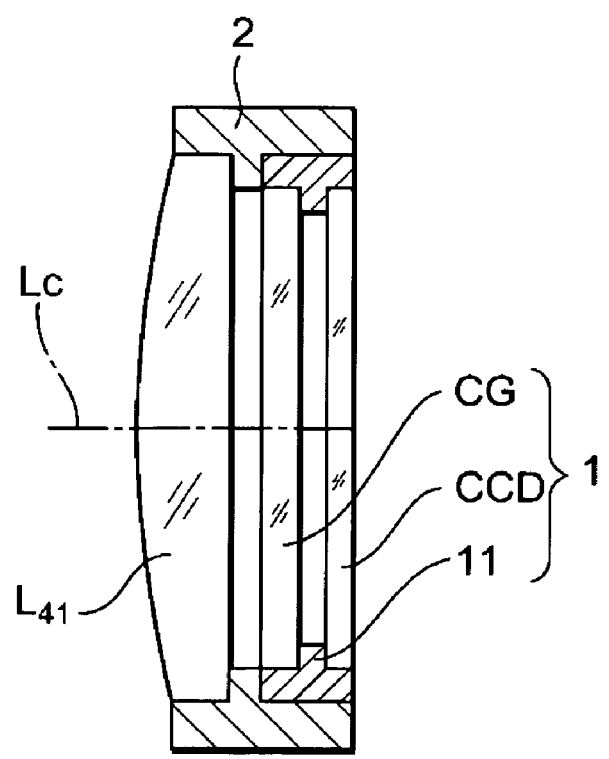
FIG. 20 is a sectional view showing an example of a sealed structure of the positive lens and an image sensor unit.

FIG. 20 is a sectional view of a sealed structure of the positive lens (fourth lens unit) and an image sensor unit in this example. In this example, as shown in FIG. 20, on the image side of the third lens unit, the plano-convex lens L41, the CCD cover glass CG, and the CCD as an electronic image sensor are arranged in order from the object side. Moreover, the CCD cover glass CG and the CCD are attached to a support frame 11 to thereby constitute an image sensor unit 1. The image sensor unit 1 and the plano-convex lens L41 are attached to a holding member 2 which is a part of members constituting the image taking apparatus, and a space between the image sensor unit 1 and the plano-convex lens L41 is sealed. According to such constitution, a foreign matter such as duct can be prevented from being attached to the surface of the CCD cover glass CG. Therefore, an image quality can be prevented from being degraded by the attached dust or the like.

Figure 21:
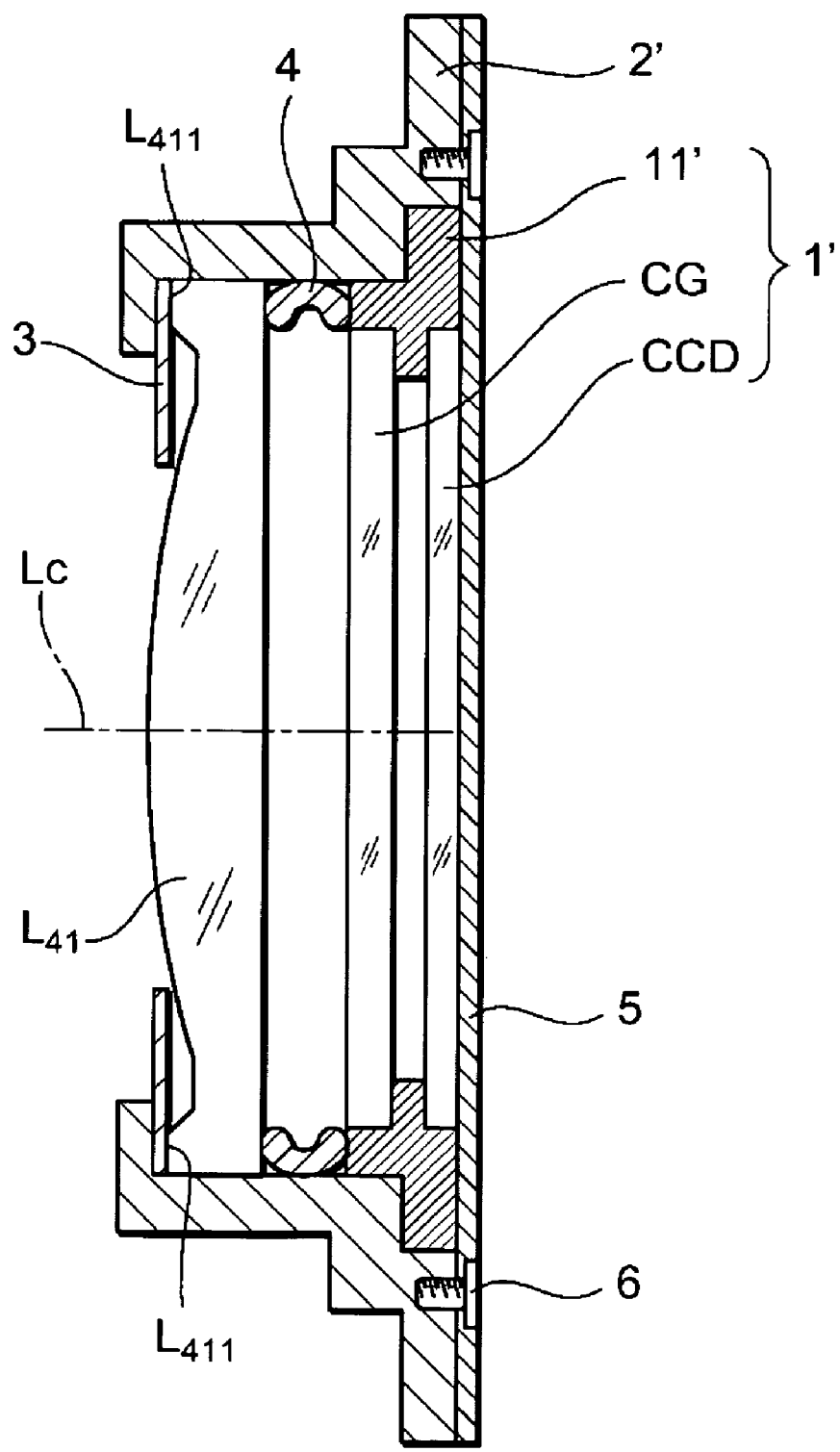
FIG. 21 is a sectional view showing another example of the sealed structure of the positive lens and the image sensor unit.

It is to be noted that a structure for sealing the space between the positive lens and the image sensor unit is not limited to the above constitution. FIG. 21 is a diagram showing another example. As shown in FIG. 21, in a holding member 21, there may be arranged in order from the object side, a field stop 3; a positive lens L41 provided with a planar contact portion L411 which comes into contact with the field stop 3 and which is formed in a lens peripheral portion, an annular frame 4 made of an elastic material such as rubber, and an image sensor unit 1, including cover glass CG, a solid-state image sensor CCD and a support frame 11'. A metal plate 5 electrically connected to the solid-state image sensor CCD may be attached to the holding member 2' via screws 6. When the field stop 3, the positive lens L41, and the image sensor unit 1' are integrated in this manner, entrance of the dust in the vicinity of the image forming surface is prevented. Moreover, if shaky hand movement is generated, the integrated part is simultaneously vibrated, and it is possible to easily correct and prevent the shaky hand movement by the image sensor. Since the integrated part can be simultaneously moved in the optical-axis direction, the focusing can be easily performed. Since the positive lens L41 is made of plastic in this example, the structure is also advantageous for cost reduction.

Figure 22:
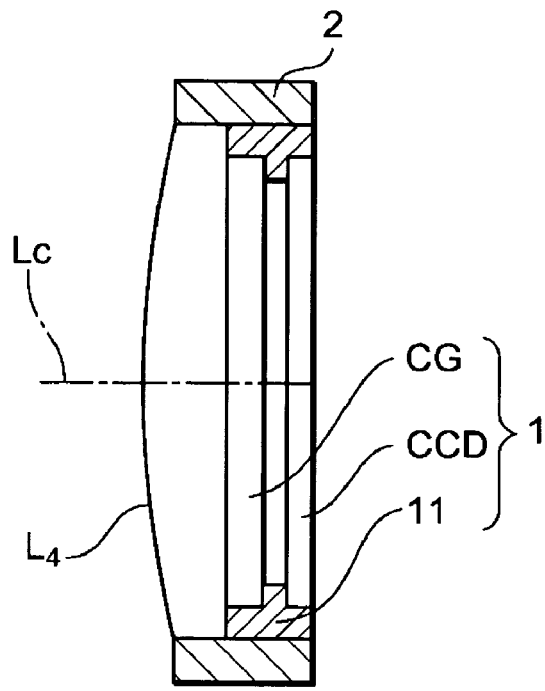
FIG. 22 is a sectional view showing still another example of the sealed structure of the positive lens and the image sensor unit.

FIG. 22 is a diagram showing still another example. In the example of FIG. 22, the whole flat surface of the positive lens L41 on the image side directly comes into contact with the image sensor unit 1. According to such constitution, a foreign matter such as dust can be effectively prevented from being attached.

Figure 23:
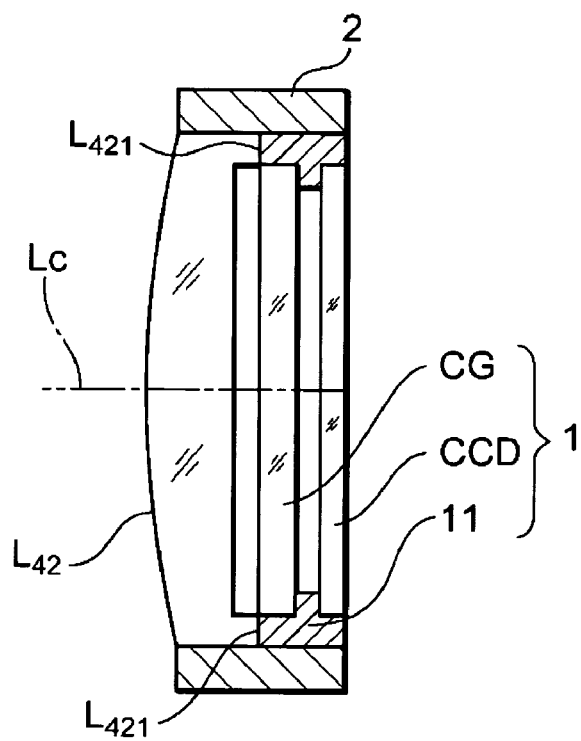
FIG. 23 is a sectional view showing a further example of the sealed structure of the positive lens and the image sensor unit.

FIG. 23 is a diagram showing a further example. In the example of FIG. 23, a portion protruding from a flat surface of a positive lens L42 is disposed in a peripheral portion of the positive lens, and contact portion L421 disposed at a distal end of the protruding portion comes into contact with the image sensor unit 1. When the positive lens L42 is formed into such shape, sealability between the positive lens and the image sensor unit can be secured. Moreover, the positive lens can be easily integrated with the image sensor unit 1 by use of an adhesive, and assembling is further facilitated.

EXAMPLE 10

Figure 24A:
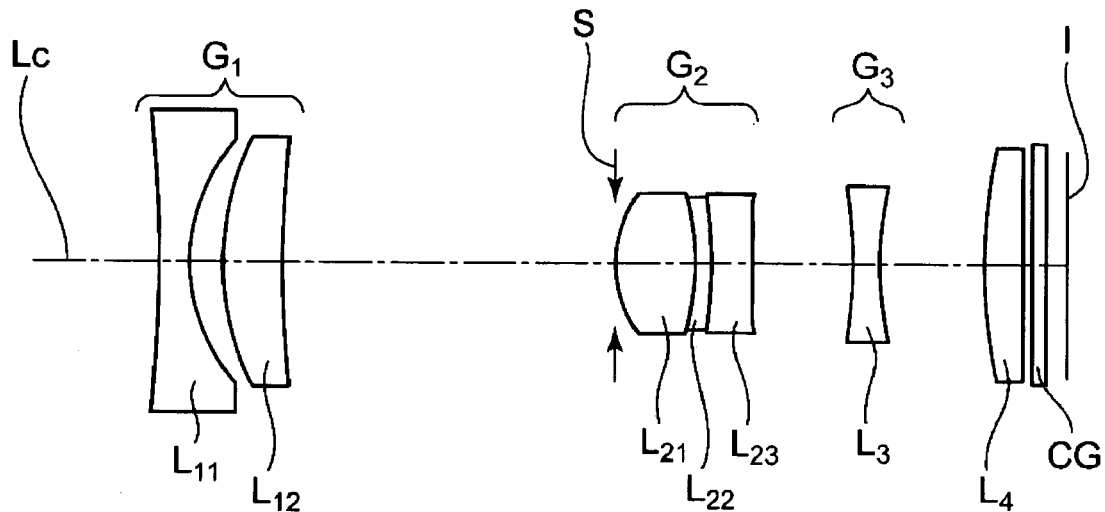
FIGS. 24A to 24C are sectional views along a plane including an optical axis in Example 10 of the present invention.
Figure 24B:
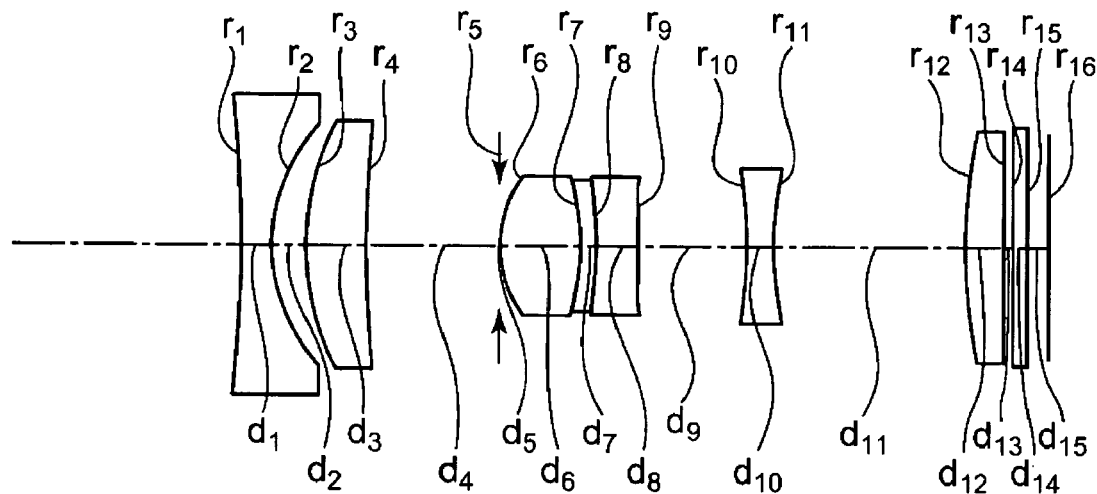
Figure 24C:
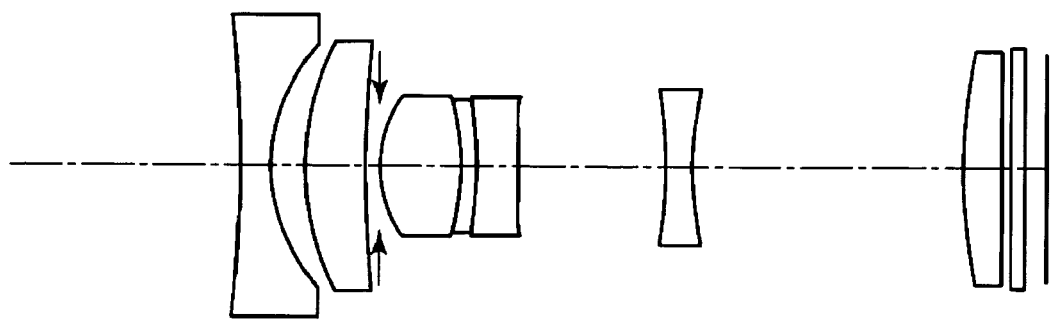
Figure 25A:
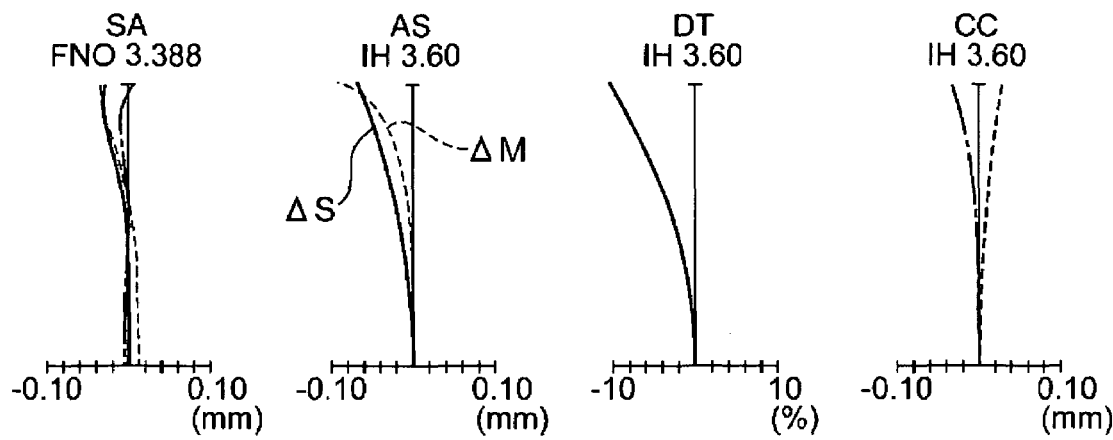
FIGS. 25A to 25C are aberration diagrams of Example 10.
Figure 25B:
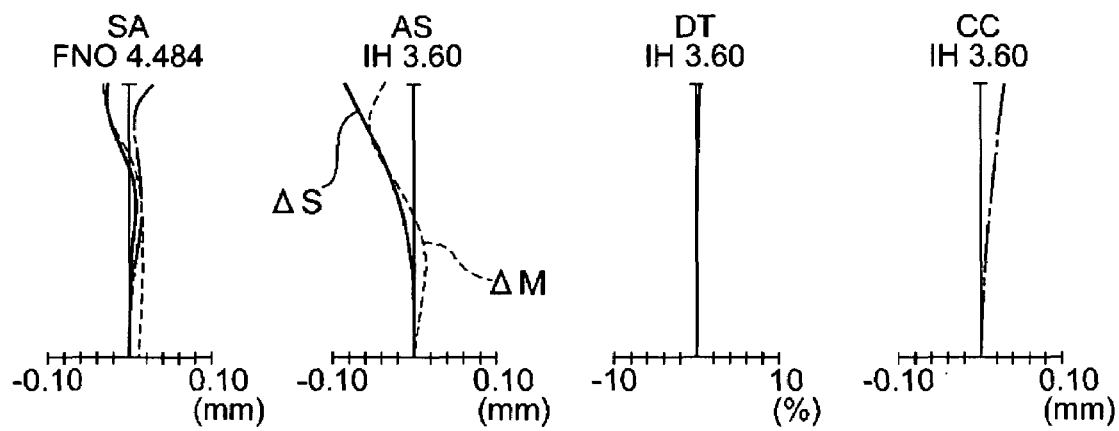
Figure 25C:
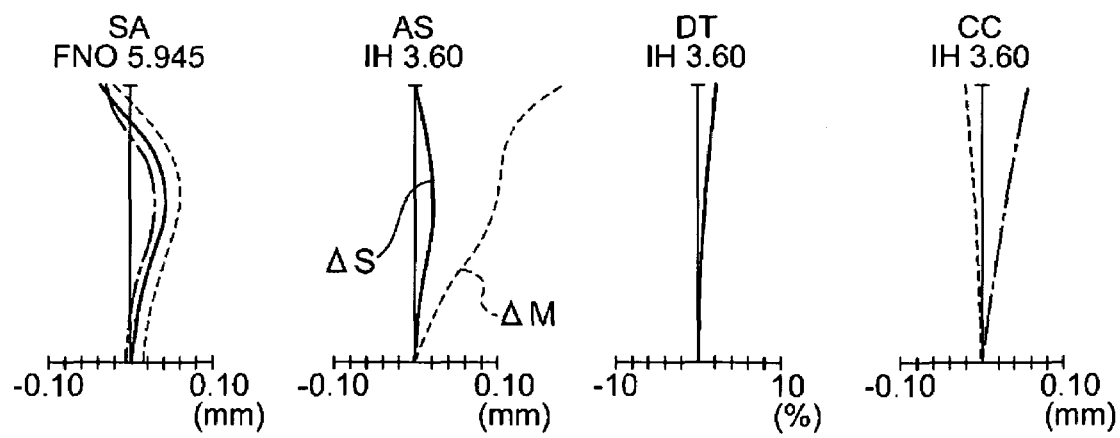

FIGS. 24A to 24C are sectional views along a plane including an optical axis in Example 10. FIG. 24A shows a state in the wide-angle end, FIG. 24B shows a state in the intermediate focal length, and FIG. 24C shows a state in the telephoto end, respectively. FIGS. 25A to 25C are aberration diagrams showing spherical aberration SA, astigmatism AS, distortion DT, and chromatic aberration CC of magnification at a time when optical system is focused on an infinite object in Example 10. FIG. 25A shows a state in the wide-angle end, FIG. 25B shows a state in the intermediate focal length, and FIG. 25C shows a state in the telephoto end.

As shown in FIGS. 24A to 24C, the image taking optical system of Example 10 is constituted of: a movable lens unit including a first lens unit G1 having a negative refractive power, a second lens unit G2 having a positive refractive power, and a third lens unit G3 having a negative refractive power; a positive lens LA as a field lens; cover glass CG; and a solid-state image sensor CCD as an electronic image sensor. An aperture stop S is disposed immediately before an object-side surface of the second lens unit G2. In the drawings, I denotes an image receiving surface (image forming surface of the image taking optical system) of the CCD.

Among the lens units constituting the movable lens unit, the first lens unit G1 includes: a double-concave negative lens L11 whose image-side surface is an aspherical surface; and a double-convex positive lens L12. The second lens unit G2 includes, in order from the object side, a cemented lens of: a double-convex positive lens L21 whose object-side surface is an aspherical surface; a negative meniscus lens L22 which directs its convex surface on the image side; and a negative meniscus lens L23 whose image-side surface is an aspherical surface and which directs its convex surface on the image side. The third lens unit G3 includes an only double-concave negative lens L3 whose opposite surfaces are aspherical surfaces. The positive lens L4 as the field lens is a plano-convex lens which has a rectangular outer shape and which directs its convex surface on the object side in the same manner as in Example 9. It is to be noted that the image-side surface of the positive lens L4 is provided with a low pass filter function and an IR cutting function by a method described in, for example, Japanese Patent Application Laid-Open No. 9-211206.

When zooming is performed from the wide-angle end to the telephoto end, along the optical axis Lc, the first lens unit G1 moves toward the image side, the second lens unit G2 moves so as to come close to the first lens unit G1, and the third lens unit G3 moves toward the object side.

In a case where a sealed structure is disposed between the positive lens L4 and the image sensor unit 1, a constitution described in Example 9 is usable.

Next, there will be described numerical data of the lenses constituting the image taking optical system of Example 10.

TABLE 28

| Surface number | RDY | THI | Nd | Vd |
| --- | --- | --- | --- | --- |
| 1 | −36.131 | 1.000 | 1.80610 | 40.92 |
| 2* | 4.971 | 1.063 | | |
| 3 | 8.286 | 1.900 | 2.00069 | 25.46 |
| 4 | 20.764 | D1 | | |
| 5 (Aperture stop) | ∞ | 0.000 | | |
| 6* | 3.551 | 2.500 | 1.49700 | 81.54 |
| 7 | −7.800 | 0.500 | 1.80810 | 22.76 |
| 8 | −16.330 | 1.350 | 1.49700 | 81.54 |
| 9* | −21.673 | D2 | | |
| 10* | −31.090 | 0.800 | 1.52542 | 55.78 |
| 11* | 9.948 | D3 | | |
| 12 | 16.945 | 1.200 | 1.52542 | 55.78 |
| 13 | ∞ | 0.270 | | |
| 14 | ∞ | 0.500 | 1.51633 | 64.14 |
| 15 | ∞ | 0.700 | | |
| 16 (Image forming surface) | ∞ | | | |

*: Aspherical surface

TABLE 29

Aspherical Coefficients

| Surface Number | RDY | K | A4 | A6 | A8 | A10 |
|---|---|---|---|---|---|---|
| 2 | 4.971 | 0.0000 | −6.4942e−4 | −9.0006e−6 | −1.3803e−6 | −4.5550e−9 |
| 6 | 3.551 | 0.0000 | −4.4733e−4 | 2.5140e−5 | 1.6854e−6 | 0 |
| 9 | −21.6730 | 0.0000 | 5.1327e−3 | 4.1441e−4 | 1.0422e−5 | 1.4336e−5 |
| 10 | −31.090 | 171.5492 | −2.2956e−3 | 9.2140e−4 | −1.8915e−4 | 2.0037e−5 |
| 11 | 9.948 | 0.0000 | −2.0877e−3 | 3.9956e−5 | −3.9926e−5 | 0 |

TABLE 30

Zoom Data

| | Wide-angle end | Intermediate focal length | Telephoto end |
|---|---|---|---|
| F | 6.093 | 10.637 | 17.596 |
| Fno | 3.384 | 4.484 | 5.958 |
| 2ω(°) | 66.7 | 37.3 | 22.6 |
| D1 | 10.450 | 4.272 | 0.440 |
| D2 | 3.094 | 3.400 | 4.735 |
| D3 | 3.211 | 5.997 | 8.474 |

In each example, values of parameters of the above conditions are shown in Tables 31-1 and 31-2. Values of ω and FL in the wide-angle end are used. Therefore, the values of the parameters shown in the conditions described in the same column are equal as in the conditions (1) and (1a). In the tables, for example, L21 indicates that the lens corresponding to the condition is the lens L21.

TABLE 31-1

| | EXAMPLE | | | | |
|---|---|---|---|---|---|
| Condition | 1 | 2 | 3 | 4 | 5 |
| (1), (1a) | 7.90 | 7.40 | 8.13 | 8.58 | 9.04 |
| (2), (2a) | 2.53 | 2.50 | 3.06 | 2.84 | 3.39 |
| (3) | 81.5(L21) | 59.84(L21) | 81.54(L21) | 81.54(L21) | 81.54(L21) |
| | 64.14(L23) | 59.38(L23) | | 81.54(L23) | 81.54(L23) |
| (4), (4a) | 1.32 | 1.10 | 1.63 | 1.65 | 1.16 |
| (5), (5a) | 0.64 | 0.60 | 0.64 | 0.72 | 0.74 |
| (6), (6a) | 4.43 | 4.21 | 4.53 | 4.78 | 5.05 |
| (7) | 10.58 | 87.51 | 1101.00 | 7.00 | 8.59 |
| (8), (8a) | 1.08 | 0.89 | 1.03 | 1.13 | 1.13 |
| (9) | 81.54(L21) | | 81.54(L21) | 81.54(L21) | 81.54(L21) |
| | | | | 81.54(L23) | 81.54(L23) |
| (10) | 50.23(L21) | | 50.23(L21) | 50.23(L21) | 46.23(L21) |
| | | | | 50.23(L23) | 46.23(L23) |
| (11-1) | 7.25 | 5.7 | 9.22 | 5.32 | 10.92 |
| (11-2) | 3.81 | 3.43 | 4.62 | 3.5 | 5.35 |
| (11-3) | 7.25 | 5.7 | 9.22 | 5.32 | 10.92 |
| (11-4) | 3.44 | 2.27 | 4.6 | 1.82 | 5.57 |
| (12), (12a) | 0.56 | 0.57 | 0.56 | 0.56 | 0.56 |
| (13) (14) | | | | | |
| (15) | | | | | |

TABLE 31-2

| | EXAMPLE | | | | |
|---|---|---|---|---|---|
| Condition | 6 | 7 | 8 | 9 | 10 |
| (1), (1a) | 8.55 | 8.42 | 8.63 | 8.57 | 7.93 |
| (2), (2a) | 2.79 | 2.54 | 2.85 | 2.63 | 2.78 |
| (3) | 61.14(L21) | 56.81(L21) | 61.14(L21) | 61.14(L21) | 81.54(L21) |
| | 81.54(L23) | 81.54(L23) | 81.54(L23) | 81.54(L23) | 81.54(L23) |
| (4), (4a) | 1.53 | 2.03 | 1.50 | 1.49 | 0.86 |
| (5), (5a) | 0.74 | 0.70 | 0.76 | 0.78 | 0.70 |
| (6), (6a) | 4.79 | 4.75 | 4.84 | 4.90 | 4.68 |
| (7) | 9.06 | 9.14 | 146.43 | 4.83 | 6.10 |
| (8), (8a) | 1.10 | 1.14 | 1.16 | 1.19 | 1.10 |
| (9) | 81.54(L23) | 81.54(L23) | 81.54(L23) | 81.54(L23) | 81.54(L21) |
| | | | | | 81.54(L23) |
| (10) | 50.23(L23) | 56.12(L23) | 50.23(L23) | 50.23(L23) | 58.78(L21) |
| | | | | | 58.78(L23) |

TABLE 31-2-continued

| | EXAMPLE | | | | |
|---|---|---|---|---|---|
| Condition | 6 | 7 | 8 | 9 | 10 |
| (11-1) | 10.98 | 5.11 | 10 | 8.17 | 10.164 |
| (11-2) | 5.6 | 3.1 | 4.59 | 4.27 | 4.92 |
| (11-3) | 10.98 | 5.11 | 10 | 8.17 | 10.164 |
| (11-4) | 5.38 | 2.01 | 5.41 | 3.9 | 5.244 |
| (12), (12a) | 0.56 | 0.56 | 0.56 | 0.57 | 0.59 |
| (13) (14) | | | | 0.78 | 0.74 |
| (15) | | | | −1.00004 | −1.00003389 |

It is to be noted that in Example 9 described above, the infrared cutting function is imparted to the positive lens L4. In Example 10, the infrared cutting function and the low pass filter function are imparted to the positive lens. However, the present invention is not limited to these examples, and the only low pass filter function may be imparted to the positive lens L4. The function may be appropriately changed in accordance with a required performance in this manner. A surface provided with these functions (infrared cutting function and/or low pass filter function) is not limited to the image-side surface of the positive lens L4, and the functions may be imparted to another lens surface.

Next, there will be described an embodiment of an image taking apparatus to which the present invention is applied.

The present invention is broadly applicable to image taking apparatuses such as a digital camera and a video camera in which an object image formed by an image taking optical system is received by an image sensor such as the CCD to thereby take an image of the object. Here, an example of the digital camera will be described with reference to FIGS. 26, 27, and 28.

Figure 26:
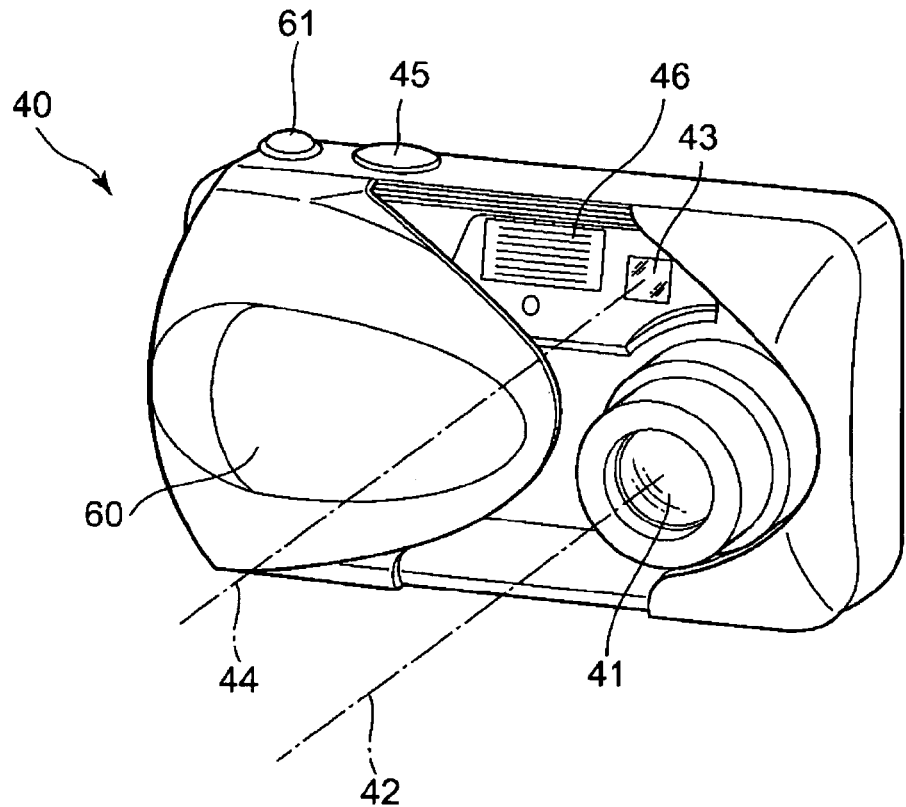
FIG. 26 is a front perspective view showing an appearance of an example of a digital camera to which the present invention is applied.
Figure 27:
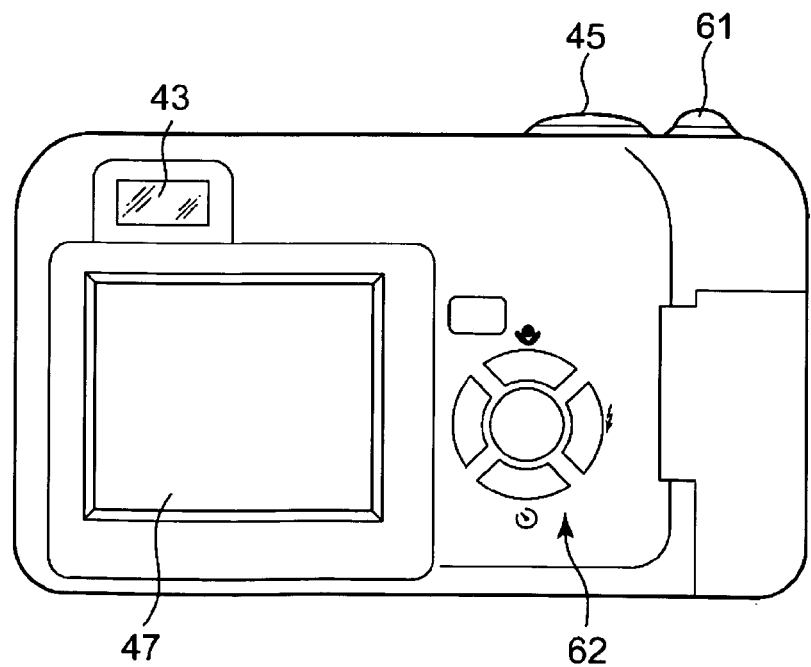
FIG. 27 is a rear perspective view of the digital camera of FIG. 26.
Figure 28:
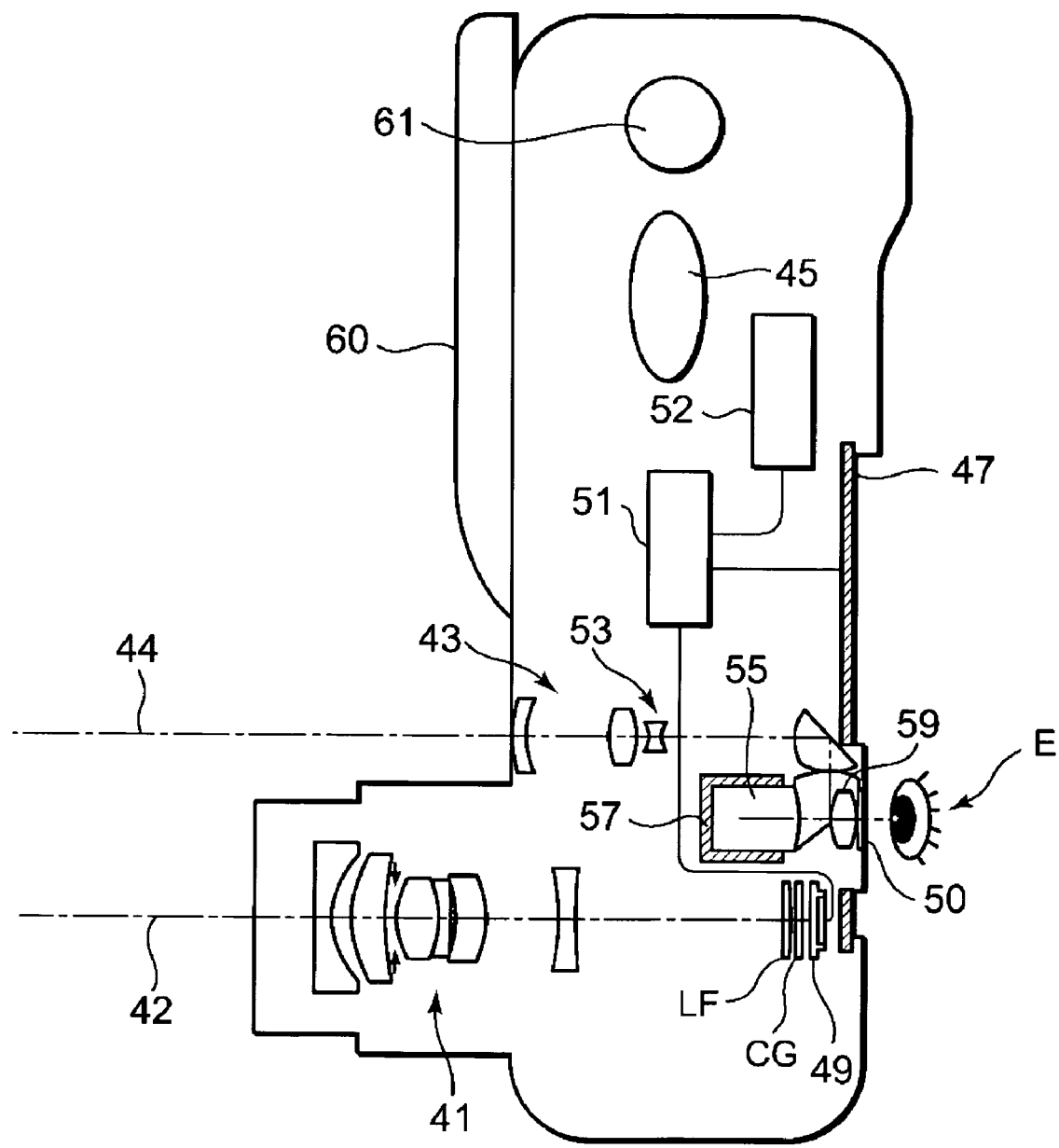
FIG. 28 is a schematic phantom view showing the internal structure of the digital camera of FIG. 26.

FIG. 26 is a front perspective view showing an appearance of a digital camera 40, FIG. 27 is a back view of the digital camera, and FIG. 28 is a schematic phantom view showing an internal structure of the digital camera 40. FIGS. 26 and 28 show a non-collapsed state of an image taking optical system 41.

In this example, the digital camera 40 includes: the image taking optical system 41 disposed along an optical path 42 for image taking; a finder optical system 43 disposed along an optical path 44 for a finder; a shutter button 45; a flash 46; a liquid crystal display monitor 47; a focal length change button 61; a setting change switch 62 and the like. In a collapsed state of the image taking optical system 41, when a cover 60 is slid, the image taking optical system 41 and the finder optical system 43 are covered.

When the cover 60 is opened to bring the digital camera 40 into an image taking state, the image taking optical system 41 becomes the non-collapsed state shown in FIG. 26. When the shutter button 45 disposed in the upper part of the digital camera 40 is pressed in this state, an image of an object is taken by the image taking optical system 41, for example, through the image taking optical system of Example 1 of the present invention. An object image formed by the image taking optical system 41 is formed on the image forming surface of the CCD 49 via the low pass filter LF coated with an IR cutting coating and cover glass CG. The object image received by the CCD 49 is displayed as an electronic image on the liquid crystal display monitor 47 disposed on the back surface of the camera via processing means 51. When this processing means 51 is connected to recording means 52, the formed electronic image can be recorded. It is to be noted that this recording means 52 may be disposed separately from the processing means 51, and data may be electronically recorded and reproduced by use of a floppy (registered trademark) disk, a memory card, a Magneto-optical disc or the like. The camera may be constituted as a silver salt camera in which a silver salt film is disposed instead of the CCD 49.

Furthermore, an objective optical system 53 for the finder is disposed along the optical path 44 for the finder. The objective optical system 53 for the finder includes a plurality of lens units (three units in the drawing) and two prisms, and the focal length thereof changes in conjunction with that of the image taking optical system 41. The object image formed by this objective optical system 53 for the finder is formed on a view field frame 57 of an erecting prism 55 which is an image erecting member. An eyepiece optical system 59 which guides an erected image into observer's eyeball E is disposed behind the erecting prism 55. It is to be noted that a cover member 50 is disposed on an emission side of the eyepiece optical system 59.

As to the digital camera 40 constituted in this manner, since the image taking optical system 41 has a high performance and a small size, and the system can be collapsed and stored, a satisfactory performance can be secured. Moreover, miniaturization can be realized.

The invention being thus described, it will be obvious that the same may be varied in many ways. Such variations are not to be regarded as a departure from the spirit and scope of the invention. Rather, the scope of the invention shall be defined as set forth in the following claims and their legal equivalents. All such modifications as would be obvious to one skilled in the art are intended to be included within the scope of the following claims.

What is claimed is:

1. An image taking optical system comprising, in order from an object side, a first lens unit having a negative refractive power, a second lens unit having a positive refractive power, and a third lens unit having a negative refractive power, wherein the second lens unit moves toward the object side so that a space between the first lens unit and the second lens unit decreases, and the third lens unit moves so that a space between the second lens unit and the third lens unit changes, in a case where zooming is performed from a wide-angle end to a telephoto end, the first lens unit includes at least one lens, among which there exists only one lens that has a negative refractive power, and the second lens unit includes at least one positive lens and at least one negative lens, the image taking optical system satisfying the following conditions:

$4.0 \leq W\_L/(\tan\omega \times FL) \leq 12.0$;

$1.7 \leq |\Delta D12|/(\tan\omega \times FL) \leq 4.6$; and $52.0 \leq PAVd$, wherein W_L denotes the whole length of the image taking optical system in the wide-angle end, ω denotes a half field angle of the image taking optical system at a time when the image taking optical system is in an arbitrary state, FL denotes a focal length of the image taking optical system in the arbitrary state, ΔD12 denotes a change amount of the space between the first lens unit and the second lens unit during the zooming from the wide-angle end to the telephoto end, and PAVd denotes the Abbe number of the positive lens of the second lens unit.

2. The system according to claim 1, further satisfying the following condition:

$$0.45 \leq D23W/(\tan\omega \times FL) \leq 3.0,$$

wherein D23W denotes a length from a lens surface closest to the image side in the second lens unit to a lens surface closest to the object side in the third lens unit in the wide-angle end.

3. The system according to claim 1, further satisfying the following condition:

$$0.38 \leq (f2/fw) \times (\tan\omega \times FL/fw) \leq 0.95,$$

wherein f2 denotes a focal length of the second lens unit, and fw denotes a focal length of the image taking optical system in the wide-angle end.

4. The system according to claim 1, further satisfying the following condition:

$$2.7 \leq W\_L/fw \leq 10.0,$$

wherein fw denotes a focal length of the image taking optical system in the wide-angle end.

5. The system according to claim 1, further satisfying the following condition:

$$3.7 \leq |\Delta D12/\Delta D23|,$$

wherein ΔD23 denotes a change amount of a space between the second lens unit and the third lens unit during the zooming from the wide-angle end to the telephoto end.

6. The system according to claim 1, wherein the first lens unit includes two lenses of a negative lens and a positive lens in order from the object side, and satisfies the following condition:

$$0.6 \leq G1\Sigma d/(\tan\omega \times FL) \leq 1.3,$$

wherein G1Σd denotes a length from a lens surface closest to the object side to a lens surface closest to the image side in the first lens unit.

7. The system according to claim 1, wherein the second lens unit includes one negative lens and at least one positive lens, and at least one of the positive lenses satisfies the following condition:

$$75.0 \leq PVd,$$

wherein PVd denotes the Abbe number of the positive lens of the second lens unit.

8. The system according to claim 7, further satisfying the following condition:

$$45.0 \leq PVd - NVd,$$

wherein NVd denotes the Abbe number of the negative lens of the second lens unit.

9. The system according to claim 1, wherein the third lens unit includes two lenses at most.

10. The system according to claim 1, wherein the first lens unit includes two lenses of a negative lens and a positive lens in order from the object side, the second lens unit includes three lenses of a positive lens, a negative lens, and a positive lens, or two lenses of a positive lens and a negative lens in order from the object side, and the third lens unit includes a negative lens.

11. The system according to claim 1, wherein the first lens unit moves during the zooming so that the whole length of the optical system is minimized between the wide-angle end and the telephoto end.

12. The system according to claim 1, further satisfying the following condition in the wide-angle end:

$$7.0\% \leq |DTW\_x1.0|,$$

wherein DTW_x1.0 denotes a value indicated in % of distortion in a position corresponding to a maximum image height in the wide-angle end at a time when the system is focused on an infinite object, and the value is represented by the following in a case where it is assumed that Y'0 is a paraxial image height and Y' is an actual image height:

$$\text{distortion} = [(Y'-Y'0)/Y'0] \times 100\ (\%).$$

13. The system according to claim 12, further satisfying the following condition in the wide-angle end:

$$3.5\% \leq |DTW\_x0.7| \leq 15.0\%;$$

$$7.0\% \leq |DTW\_x1.0| \leq 25.0\%;\ \text{and}$$

$$|\Delta DTW| \leq 15.0\%,$$

wherein DTW_x0.7 denotes a value indicated in % of the distortion in a position corresponding to a height 0.7 time the maximum image height in the wide-angle end at a time when the system is focused on an infinite object, and ΔDTW denotes a difference between the values indicated in % of the distortion in positions corresponding to heights 0.7 time and 1.0 time the maximum image height in the wide-angle end at a time when the optical system is focused on the infinite object.

14. The system according to claim 1, wherein the third lens unit is moved in an optical-axis direction to thereby perform focusing.

15. The system according to claim 1, further satisfying the following condition:

$$0.53 \leq \tan\omega \times FL/fw,$$

wherein fw is a focal length of the image taking optical system in the wide-angle end.

16. The system according to claim 1, which comprises only the first lens unit, the second lens unit, and the third lens unit as lens units.

17. The system according to claim 1, wherein a fourth lens unit having a positive power and fixed during the zooming is disposed on the image side of the third lens unit.

18. The system according to claim 17, wherein the fourth lens unit includes one positive lens.

19. An image taking apparatus comprising: the image taking optical system according to any one of claims 1, 7, 12 and 17; and an image sensor disposed on the image side of the image taking optical system.

20. The system according to claim 19, wherein a low pass filter is disposed between the image taking optical system and the image sensor.

* * * * *